US008086101B2

(12) United States Patent
Alaimo et al.

(10) Patent No.: US 8,086,101 B2
(45) Date of Patent: *Dec. 27, 2011

(54) MULTI-CITY DWDM WAVELENGTH LINK ARCHITECTURES AND METHODS FOR UPGRADING

(75) Inventors: S. Christopher Alaimo, Boulder, CO (US); Dirk Barthel, Westminster, CO (US); George David Morley, Calgary (CA); Edward J. Bortolini, Nederland, CO (US); Richard W. Urie, Arvada, CO (US)

(73) Assignee: Altera Corporation, San Jose, CA (US)

(*) Notice: Subject to any disclaimer, the term of this patent is extended or adjusted under 35 U.S.C. 154(b) by 2456 days.

This patent is subject to a terminal disclaimer.

(21) Appl. No.: 10/126,189

(22) Filed: Apr. 19, 2002

(65) Prior Publication Data

US 2004/0208546 A1    Oct. 21, 2004

Related U.S. Application Data

(63) Continuation-in-part of application No. 10/093,844, filed on Mar. 8, 2002, now Pat. No. 7,079,723, and a continuation-in-part of application No. 10/093,843, filed on Mar. 8, 2002, now Pat. No. 6,813,408.

(51) Int. Cl.
*H04J 14/02* (2006.01)
(52) U.S. Cl. .......................................... 398/49; 398/48
(58) Field of Classification Search ............... 398/45–57
See application file for complete search history.

(56) References Cited

U.S. PATENT DOCUMENTS

| | | | | |
|---|---|---|---|---|
| 5,191,626 | A | * | 3/1993 | Stern ................................ 385/24 |
| 5,414,540 | A | | 5/1995 | Patel et al. |
| 5,471,332 | A | | 11/1995 | Shiragaki et al. |
| 5,739,935 | A | * | 4/1998 | Sabella ............................ 398/50 |
| 5,838,848 | A | | 11/1998 | Laude |
| 5,878,177 | A | | 3/1999 | Karasan et al. |
| 5,917,625 | A | | 6/1999 | Ogusu et al. |
| 5,960,133 | A | | 9/1999 | Tomlinson |
| 5,999,672 | A | | 12/1999 | Hunter et al. |
| 6,097,519 | A | | 8/2000 | Ford et al. |
| 6,097,859 | A | | 8/2000 | Solgaard et al. |
| 6,108,471 | A | | 8/2000 | Zhang et al. |
| 6,307,653 | B1 | | 10/2001 | Bala et al. |
| 6,307,657 | B1 | | 10/2001 | Ford |
| 6,449,073 | B1 | | 9/2002 | Huber |
| 6,535,664 | B1 | * | 3/2003 | Anderson ........................ 385/18 |
| 6,782,203 | B2 | * | 8/2004 | Lin et al. ........................... 398/82 |

(Continued)

OTHER PUBLICATIONS

U.S. Appl. No. 10/093,844, filed Mar. 8, 2002, Bortolini, et al.

(Continued)

*Primary Examiner* — Nathan Curs
(74) *Attorney, Agent, or Firm* — Ropes & Gray LLP

(57) ABSTRACT

A multi-city wavelength link architecture is used to distribute spectral bands received on input optical signals among output optical signals. Such an architecture may include an optical wavelength cross connect having multiple input ports, multiple output ports, and a wavelength routing element that selectively routes wavelength components between one optical signal and multiple optical signal. Such an optical wavelength cross connect will generally receive cross-connect-input optical signals at the input ports and transmit cross-connect-output optical signals from the output ports. Methods are used to increase the number of cities that may be accommodated by the architecture without disrupting through traffic between the existing cities.

69 Claims, 37 Drawing Sheets

U.S. PATENT DOCUMENTS

| | | | |
|---|---|---|---|
| 6,868,205 B2 * | 3/2005 | Weverka et al. | 385/31 |
| 6,892,032 B2 * | 5/2005 | Milton et al. | 398/79 |
| 2001/0050790 A1 * | 12/2001 | Graves et al. | 359/110 |
| 2003/0170025 A1 * | 9/2003 | Bortolini et al. | 398/50 |
| 2003/0215178 A1 * | 11/2003 | Bortolini et al. | 385/24 |
| 2004/0208551 A1 * | 10/2004 | Weverka | 398/50 |

OTHER PUBLICATIONS

U.S. Appl. No. 10/093,843, filed Mar. 8, 2002, Bortolini, et al.

U.S. Appl. No. 09/422,061, filed Nov. 16, 1999, Weverka et al.

Ford, Joseph E., et al., "Wavelength Add-Drop Switching Using Tilting Micromirrors," Journal of Lightwave Technology, vol. 17, No. 5, May 1999.

Grade, John D., et al., "A Large-Deflection Electrostatic Actuator for Optical Switching Applications," Solid-State Sensor and Actuator Workshop, Hilton Head, SC, Jun. 4-8, 2000.

Nishi, I., et al., "Broad-Passband-Width Optical Filter for Multi/Demultiplexer Using a Diffraction Grating and a Retroreflector Prism," Electronics Letters, vol. 21, No. 10, May 9, 1985.

Phillippe, P., et al., "Wavelength demultiplexer: using echelette gratings on silicon substrate," Applied Optics, vol. 24, No. 7, Apr. 1, 1985.

Rallison, R.D., "Dense Wavelength Division Multiplexing (DWDM) and the Dickson Grating," White Paper, Jan. 6, 2001.

Sun, Z. J., et al. "Demultiplexer with 120 Channels and 0.29-nm Channel Spacing," IEEE Photonics Technology Letters, vol. 10, No. 1, Jan. 1998.

* cited by examiner

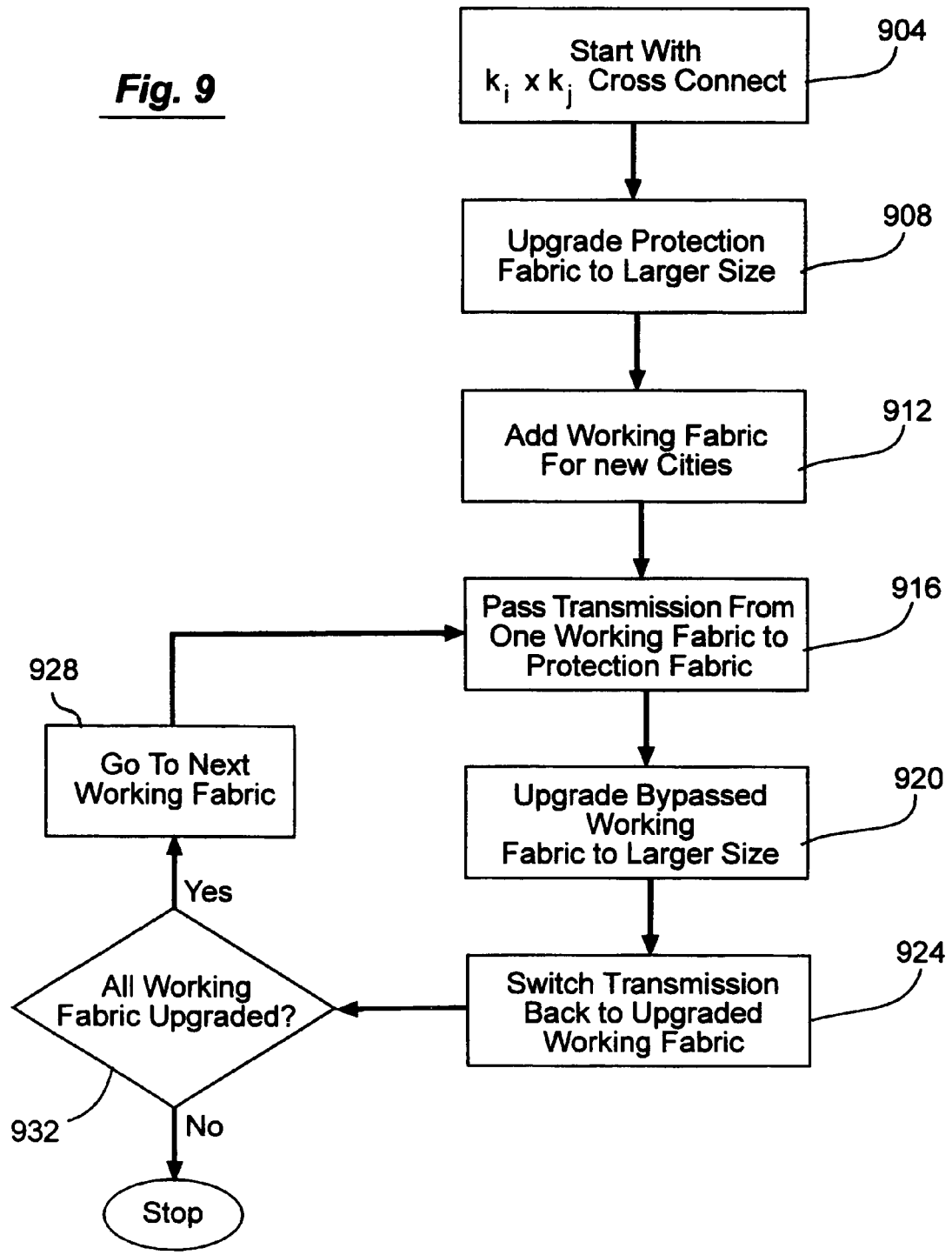

MULTI-CITY DWDM WAVELENGTH LINK ARCHITECTURES AND METHODS FOR UPGRADING

CROSS-REFERENCE TO RELATED APPLICATIONS

This application is a continuation-in-part of U.S. patent application Ser. No. 10/093,844, entitled "OPTICAL WAVELENGTH CROSS CONNECT ARCHITECTURES USING WAVELENGTH ROUTING ELEMENTS," filed Mar. 8, 2002 by Edward J. Bortolini et al., the entire disclosure of which is herein incorporated by reference for all purposes. This application is also a continuation-in-part of U.S. patent application Ser. No. 10/093,843, entitled "METHODS FOR PERFORMING IN-SERVICE UPGRADES OF OPTICAL WAVELENGTH CROSS CONNECTS," filed Mar. 8, 2002 by Edward J. Bortolini, the entire disclosure of which is herein incorporated by reference for all purposes. These two applications are sometimes referred to collectively herein as "the Bortolini applications".

BACKGROUND OF THE INVENTION

This application relates generally to fiber-optic communications. This application relates more specifically to optical DWDM wavelength link architectures used in fiber-optics applications to route optical traffic among multiple separated optical transmission systems.

The Internet and data communications are causing an explosion in the global demand for bandwidth. Fiber optic telecommunications systems are currently deploying a relatively new technology called dense wavelength division multiplexing (DWDM) to expand the capacity of new and existing optical fiber systems to help satisfy this demand. In DWDM, multiple wavelengths of light simultaneously transport information through a single optical fiber. Each wavelength operates as an individual channel carrying a stream of data. The carrying capacity of a fiber is multiplied by the number of DWDM channels used. Today DWDM systems employing up to 80 channels are available from multiple manufacturers, with more promised in the future.

In all telecommunication networks, there is the need to connect individual channels (or circuits) to individual destination points, such as an end customer or to another network. Systems that perform these functions are called cross-connects. Additionally, there is the need to add or drop particular channels at an intermediate point. Systems that perform these functions are called add-drop multiplexers (ADMs). All of these networking functions are currently performed by electronics—typically an electronic SONET/SDH system. However, multi-wavelength systems generally require multiple SONET/SDH systems operating in parallel to process the many optical channels. This makes it difficult and expensive to scale DWDM networks using SONET/SDH technology. The alternative is an all-optical network. Optical networks designed to operate at the wavelength level are commonly called "wavelength routing networks" or "optical transport networks" (OTN). In a wavelength routing network, the individual wavelengths in a DWDM fiber must be manageable.

Optical wavelength cross connects are configured generally to redirect the individual optical channels on a plurality of input optical fibers to a plurality of output optical fibers. Each incoming channel may be directed to any of the output optical fibers depending on a state of the cross connect. Thus, where there are P input fibers and Q output fibers, the optical wavelength cross connect between them may be considered to be a "PN×QN optical switch". Sometimes herein, the terminology "P×Q optical wavelength cross connect" is used to refer to such a cross connect by referring to the numbers of input and output optical fibers, each of which is understood to have the capacity for carrying N channels. As such the "P×Q optical wavelength cross connect" terminology may be considered to be a shorthand for describing a arbitrarily configurable PN×QN optical device.

FIG. 1 provides an example of a prior-art 4×4 optical wavelength cross connect 100 for a DWDM system carrying N individual wavelength channels. Each of the N channels on the four input signals 104 may be redistributed in accordance with a state of the cross connect 100 among the four output signals 116. The cross connect 100 functions by splitting each of the input signals 104($i$) with an optical demultiplexer 108($i$) into N signals 120(1 . . . N, i) that carry only a single wavelength channel $\lambda_{1...N}$. From each of the optical demultiplexers 108, the signal corresponding to a particular one of the 120(j, 1 . . . 4) is directed to a respective one of N 4×4 optical space switches 110($j$). Each optical space switch 110 may be configured as desired to redirect the four received signals 120 to four transmitted signals 124. The transmitted signals 124 are transmitted to optical multiplexers 112 that recombine the reordered individual-wavelength signals onto the four output signals 116.

While arrangements such as shown in FIG. 1 could be used to provide optical connections between cities for routing traffic, their efficiency is limited because they adopt a brute-force-type approach of demultiplexing the incoming signals into their individual wavelength components in order to reroute them. There is a general need in the art for more efficient optical DWDM wavelength link architectures that may be used to connect cities without compromising complete routing flexibility. Furthermore, it is desirable to use such architectures to accommodate growth of an optical infrastructure by upgrading the architectures to accommodate additional cities with minimal disruption of the existing traffic.

BRIEF SUMMARY OF THE INVENTION

Embodiments of the invention thus provide multi-city DWDM wavelength link architectures and methods for upgrading such architectures to accommodate optical traffic from additional cities. Generally, the additional traffic is integrated into the architecture without affecting through traffic being exchanged among cities that are already part of the architecture. In addition, some architectures make provision for including add and drop terminals from or to which certain spectral-band components may be received or directed. In some embodiments, such add and drop traffic may permissibly be disrupted during an upgrade while maintaining propagation of the through traffic. Also, in different embodiments of the multi-city architecture, loopback traffic may be permitted or not; such loopback traffic includes spectral bands on signals that are directed from a given city back to the same city. For many applications, it is acceptable for loopback traffic to be prohibited, thereby permitting certain simplifications in the structure of the architecture discussed below.

Thus, in some embodiments a wavelength link architecture is used to distribute spectral bands received on a first plurality of input optical signals among a first plurality of output optical signals. Such an architecture may, for example, include an optical wavelength cross connect having a plurality of input ports, a plurality of output ports, and at least one wavelength routing element adapted for selectively routing wavelength components between a first optical signal and a plurality of second optical signals according to a configurable state of such wavelength routing element. Such an optical wavelength cross connect will generally be adapted to receive cross-connect-input optical signals at the input ports and to transmit cross-connect-output optical signals from the output ports. The cross-connect input and output signals may correspond to signals received from and sent to cities, or may be modified by exchanging some spectral bands with drop and/or add signals. In other embodiments, the wavelength link architecture may be configured without an optical wavelength cross connect.

In either case, a capacity of the wavelength link architecture is upgraded to distribute spectral bands received from a second plurality of input optical signals among a second plurality of output optical signals. Each such input optical signal is received from one of a plurality of separated optical transmission systems and a corresponding output optical signal is directed to such one of the plurality of separated optical transmission systems. The second plurality of input optical signals includes the first plurality of input optical signals and the second plurality of output optical signals includes the first plurality of output optical signals. Such upgrading is performed without disrupting distribution of the spectral bands received on the first plurality of input optical signals among the first plurality of output optical signals. The upgraded wavelength link architecture may then be used to distribute the spectral bands received on the second plurality of input optical signals among the second plurality of output optical signals.

In one embodiment, the wavelength link architecture may include a protection fabric. Such a protection fabric permits the upgrade to proceed by sequentially bypassing each of a plurality of working fabrics of the wavelength link architecture onto the protection fabric and upgrading the bypassed working fabric during the upgrade. The protection fabric itself is also upgraded, and additional working fabric to accommodate the additional city is added to the working fabric of the wavelength link architecture.

In another embodiment, the wavelength link architecture comprises a first plurality of wavelength routing elements, with a mapping of the spectral bands comprised by the first plurality of input optical signals to the first plurality of output optical signals being determined by the states of the wavelength routing elements. The wavelength link architecture may additionally comprise a plurality of optical couplers each disposed to couple one of the first plurality of input optical signals with equivalents to such one of the first plurality of input optical signals. Each of the first plurality of wavelength routing elements is then disposed to receive (transmit) equivalents corresponding to each of the first plurality of input optical signals and to transmit (receive) the respective one of the first plurality of output optical signals depending on the state of such wavelength routing element. Alternatively, the wavelength link architecture may further comprise a second plurality of wavelength routing elements disposed to transmit or receive the first plurality of output optical signals, wherein outputs of each of the first plurality of wavelength routing elements are in optical communication with an input to at least one of the second plurality of wavelength routing elements. Pairs of the first plurality of wavelength routing elements and pairs of the second plurality of wavelength routing elements may be provided by optical add/drop multiplexers. In any such cases, the wavelength link architecture may be configured in no-loopback embodiments so that no spectral band received from any one of the separated optical transmission systems is routed back to that optical transmission system.

In a further embodiment, the wavelength link architecture is used to distribute at least one spectral band received on at least one add signal among at least one of the output optical signals. In addition, the wavelength link architecture may be used to distribute at least one spectral band received on at least one of the input optical signals onto at least one drop signal. The at least one add signal may comprise a plurality of add signals and the at least one drop signal may comprise a plurality of drop signals; moreover, in such cases each add signal and each drop signal may be associated with one of the plurality of separated optical transmission systems. Such add and drop signals may be managed in one embodiment with a plurality of optical add/drop multiplexers, each disposed to exchange spectral bands between the input optical signal received from a respective one of the separated optical transmission systems and the add and drop signals associated with the respective one of the separated optical transmission systems.

Alternatively, for each separated optical transmission system, spectral bands from the input optical signal received from that optical transmission system are dropped directly onto the drop signals associated with that optical transmission system and spectral bands from the add signal associated with that optical transmission system are added directly to the output optical signal directed to that optical transmission system. The direct dropping may be achieved by using a wavelength routing element and the direct adding may be achieved by using an optical coupler.

As a further alternative, for each separated optical transmission system, the drop signal associated with that optical transmission system may comprise an equivalent to the input signal received from that optical transmission system. The output optical signal directed to that optical transmission system may itself comprise spectral bands selected from the add signal associated with that optical transmission system and from equivalents to input optical signals received from the other optical transmission systems.

In certain alternative embodiments, the wavelength link architecture need not necessarily include an optical wavelength cross connect, but includes a first plurality of optical add/drop multiplexers. In one embodiment, upgrading the capacity of the wavelength link architecture may then comprise adding an optical wavelength cross connect in optical communication with add and drop ports on at least one of the first plurality of optical add/drop multiplexers.

In another embodiment, however, upgrading the capacity of the wavelength link architecture comprises removing links to add and drop signals from the wavelength link architecture. Wavelength routing capacity is then added to the wavelength link architecture to accommodate at least one additional separated optical transmission system. The wavelength routing capacity for each of the plurality of separated optical transmission systems is also increased. Input and output optical signals are connected to the upgraded wavelength link architecture for the at least one additional separated optical transmission system, and links to the add and drop signals are restored. Additional wavelength routing capacity may be provided to the wavelength link architecture by adding a second plurality of optical add/drop multiplexers in a cascaded arrangement and placing add ports of the first plurality of optical add/drop multiplexers in optical communication with outputs of the second plurality of optical add/drop multiplexers. The wavelength routing capacity for each of the optical transmission systems may be provided in a somewhat similar fashion by adding a second plurality of optical add/drop multiplexers to the wavelength link architecture with each of the second plurality of optical add/drop multiplexers being added in a cascaded arrangement with one of the first plurality of optical add/drop multiplexers. The outputs of the second plurality of optical add/drop multiplexers is placed in optical communication with add ports of the second plurality of optical add/drop multiplexers.

In still a further embodiment, a combination of optical add/drop multiplexers and a wavelength cross connect are used. In one such embodiment, the optical add/drop multiplexers are all optically connected with the wavelength cross connect. Each of the input optical signals is in optical communication with an input port of one of the optical add/drop multiplexers. Each of the output optical signals is in optical communication with an output port of one of the optical add/drop multiplexers. An add port of each of the optical add/drop multiplexers is in optical communication with one of the cross-connect-output signals. A drop port of each of the optical add/drop multiplexers is in optical communication with one of the cross-connect-input signals. Such an arrangement may permit architectures in which spectral bands on input optical signals received from a subset of the optical transmission systems are not included on output optical signals directed another optical transmission system within that subset.

In such an embodiment, the capacity of the wavelength link architecture may be upgraded by removing links to add and drop signals from the wavelength link architecture. At least one additional optical add/drop multiplexer is added to the architecture and the capacity of the wavelength cross connect is increased. Subsequently, links to the add and drop signals from the wavelength link architecture are restored.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral and is enclosed in parentheses to denote one of multiple similar components. When reference is made to a reference numeral without specification to an existing sublabel, it is intended to refer to all such multiple similar components.

FIG. 9 is a flow diagram summarizing one embodiment of a method for increasing the routing capacity of a multi-city architecture;

DETAILED DESCRIPTION OF THE INVENTION

1. Introduction

Figure 1:
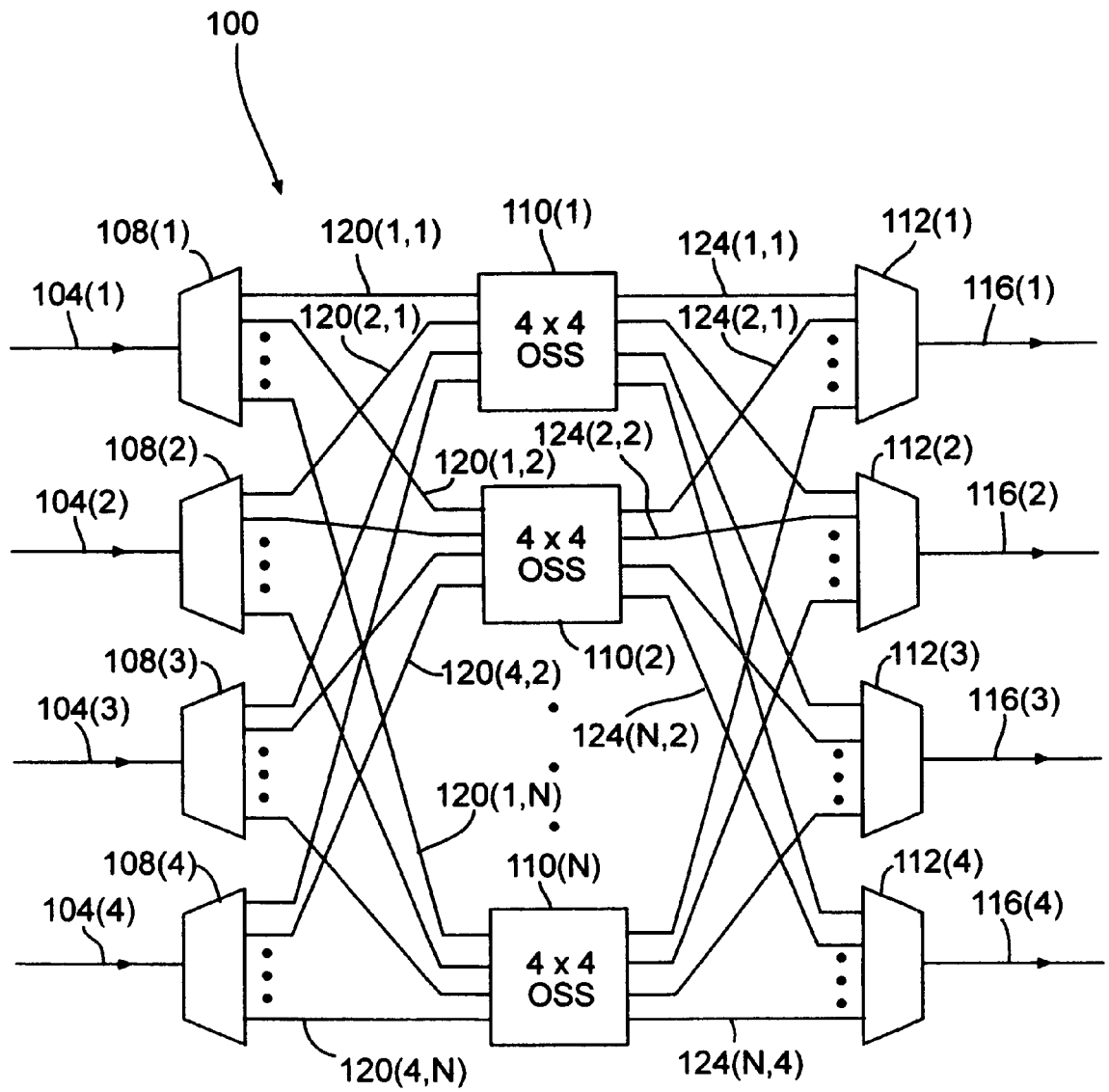
FIG. 1 is a schematic diagram illustrating a prior-art cross connect used in DWDM applications.

The following description sets forth embodiments of optical DWDM wavelength link architectures suitable for routing optical traffic among multiple cities according to the invention. The general operation of such architectures is to receive P input optical signals at respective input ports and transmit Q output optical signals at respective output ports. Each of the input optical signals is received from a city and each of the output optical signals is transmitted to a city. The optical signals comprise a plurality of spectral bands, with the architecture capable of achieving a configuration that results in a desired redistribution of input spectral bands corresponding to equivalent channels among the output signals. Although the signals could each have a continuous spectrum, adjacent segments of which could be considered different spectral bands, it is generally contemplated that the spectrum of the incoming light will have a plurality of spaced bands, denoted as corresponding to channels $1, 2, 3, \ldots N$.

The terms "input port" and "output port" are intended to have broad meanings and are used in referring to various optical components in the architectures described. At the broadest, a port is defined by a point where light enters or leaves the optical component. For example, the input (or output) port could be the location of a light source (or detector) or the location of the downstream end of an input fiber (or the upstream end of an output fiber). In specific embodiments, the structure at the port location could include a fiber connector to receive the fiber, or could include the end of a fiber pigtail, the other end of which is connected to outside components. It is also noted that the optical character of the architectures described herein also permits the input optical signals and output optical signals to be interchanged functionally, permitting light to be propagated through each architecture in the direction opposite to that shown in the figures.

The International Telecommunications Union (ITU) has defined a standard wavelength grid having a frequency band centered at 194,100 GHz, and another band at every 50 GHz interval around 194,100 GHz. This corresponds to a wavelength spacing of approximately 0.4 nm around a center wavelength of approximately 1550 nm, it being understood that the grid is uniform in frequency and only approximately uniform in wavelength. Embodiments of the invention are preferably designed for the ITU grid, but finer frequency intervals of 25 GHz and 100 GHz (corresponding to wavelength spacings of approximately 0.2 nm and 0.8 nm) are also of interest.

2. Wavelength Routing Element

Embodiments of the invention for DWDM wavelength link architectures generally include one or more wavelength routing elements ("WRE"). As used herein, a "1×L WRE" refers to an optical device that receives multiplexed light at a WRE input port and redirects subsets of the spectral bands comprised by the multiplexed light to respective ones of a plurality L of WRE output ports. Such a 1×L WRE may be operated as an L×1 WRE by interchanging the functions of the input and output ports. Specifically, a plurality L of optical signals, each multiplexed according to the same wavelength grid are provided at the L output ports (functioning as input ports). A single optical signal is output at the input port (functioning as an output port) and includes spectral bands selected from the L multiplexed optical signals according to the wavelength grid. Thus, the single output optical signal has, at each position on the wavelength grid, no more than one spectral band received at the same position on the wavelength grid from the L multiplexed optical signals. Accordingly, reference herein to a WRE adapted for routing wavelength components "between" a first optical signal and a plurality of second optical signals is intended to include a WRE configured to operate as a 1×L WRE or a WRE configured to operate as an L×1 WRE.

Architecture embodiments that use a WRE may generally use any configuration for routing subsets of a plurality of spectral bands that achieve these functions. In some instances, a particular WRE may be provided in a one-pass, two-pass, four-pass, or other configuration. Some examples of suitable WREs are described in detail below, and additional examples of WREs that may be comprised by certain embodiments are described in the copending, commonly assigned U.S. patent application, filed Nov. 16, 1999 and assigned Ser. No. 09/442,061 ("the '061 application"), entitled "Wavelength Router," by Robert T. Weverka et al., which is herein incorporated by reference in its entirety, including the Appendix, for all purposes.

In some embodiments, wavelength routing functions within the WRE may be performed optically with a free-space optical train disposed between the WRE input port and the WRE output ports, and a routing mechanism. The free-space optical train can include air-spaced elements or can be of generally monolithic construction. The optical train includes a dispersive element such as a diffraction grating. The routing mechanism includes one or more routing elements and cooperates with the other elements in the optical train to provide optical paths that couple desired subsets of the spectral bands to desired WRE output ports. The routing elements are disposed to intercept the different spectral bands after they have been spatially separated by their first encounter with the dispersive element.

Figure 2A:
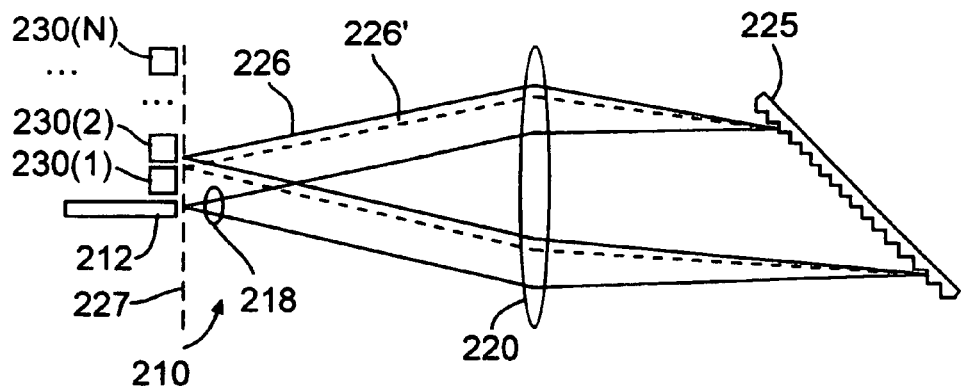
FIGS. 2A, 2B, and 2C are schematic top, side, and end views, respectively, of an optical wavelength routing element used in certain embodiments of the invention.
Figure 2B:
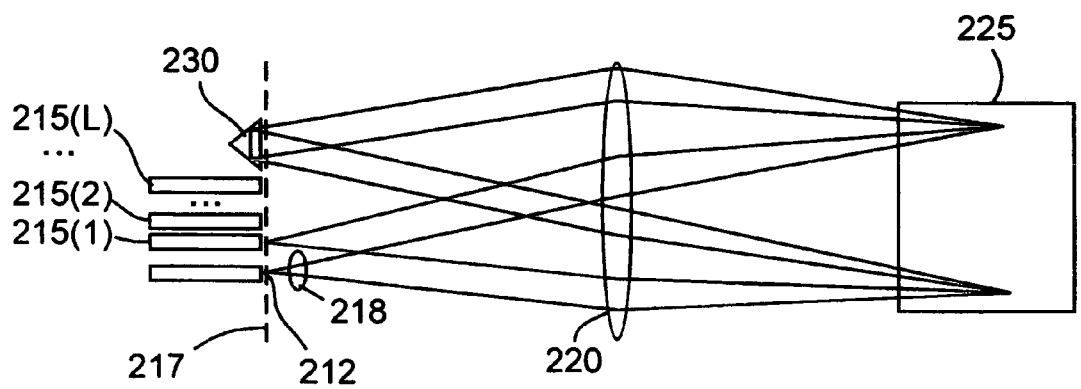
Figure 2C:
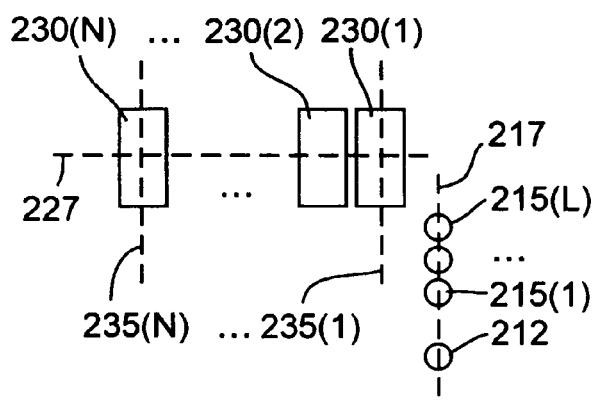

FIGS. 2A, 2B, and 2C are schematic top, side, and end views, respectively, of one embodiment of a 1×L (or, equivalently, L×1) WRE 210. This embodiment may be considered to be a four-pass WRE. Its general functionality is to accept light having a plurality N of spectral bands at a WRE input port 212, and to direct subsets of the spectral bands to desired ones of a plurality L of WRE output ports, designated 215(1) . . . 215(L). The output ports are shown in the end view of FIG. 2C as disposed along a line 217 that extends generally perpendicular to the top view of FIG. 2A. Light entering the WRE 10 from WRE input port 212 forms a diverging beam 218, which includes the different spectral bands. Beam 218 encounters a lens 220 that collimates the light and directs it to a reflective diffraction grating 225. The grating 225 disperses the light so that collimated beams at different wavelengths are directed at different angles back towards the lens 220.

Two such beams are shown explicitly and denoted 226 and 226', the latter drawn in dashed lines. Since these collimated beams encounter the lens 220 at different angles, they are focused towards different points along a line 227 in a transverse plane extending in the plane of the top view of FIG. 2A. The focused beams encounter respective ones of a plurality of retroreflectors, designated 230(1) . . . 230(N), located near the transverse plane. Various examples of micromirror configurations that may be used as part of the retroreflectors, among others, are described in the following copending, commonly assigned applications, each of which is herein incorporated by reference in its entirety for all purposes: U.S. patent application Ser. No. 09/898,988, entitled "SYSTEMS AND METHODS FOR OVERCOMING STICTION USING A LEVER," filed Jul. 3, 2001 by Bevan Staple et al.; U.S. patent application Ser. No. 09/899,000, entitled "FREE-SPACE OPTICAL WAVELENGTH ROUTER BASED ON STEPWISE CONTROLLED TILTING MIRRORS," filed Jul. 3, 2001 by Victor Buzzetta et al.; U.S. patent application Ser. No. 09/899,001, entitled "TWO-DIMENSIONAL FREE-SPACE OPTICAL WAVELENGTH ROUTER BASED ON STEPWISE CONTROLLED TILTING MIRRORS," filed Jul. 3, 2001by Victor Buzzetta; U.S. patent application Ser. No. 09/899,002, entitled "MEMS-BASED, NONCONTACTING, FREE-SPACE OPTICAL SWITCH," filed Jul. 3, 2001 by Bevan Staple and Richard Roth; U.S. patent application Ser. No. 09/899,004, entitled "BISTABLE MICROMIRROR WITH CONTACTLESS STOPS," filed Jul. 3, 2001 by Lilac Muller; U.S. patent application Ser. No. 09/899,014, entitled "METHODS AND APPARATUS FOR PROVIDING A MULTI-STOP MICROMIRROR," filed Jul. 3, 2001 by David Paul Anderson; and U.S. patent application Ser. No. 09/941,998, entitled "MULTIMIRROR STACK FOR VERTICAL INTEGRATION OF MEMS DEVICES IN TWO-POSITION RETROREFLECTORS," filed Aug. 28, 2001 by Frederick Kent Copeland.

The beams are directed back, as diverging beams, to the lens 220 where they are collimated, and directed again to the grating 225. On the second encounter with the grating 225, the angular separation between the different beams is removed and they are directed back to the lens 220, which focuses them. The retroreflectors 230 may be configured to send their intercepted beams along a reverse path displaced along respective lines 235(1) ... 235(N) that extend generally parallel to line 217 in the plane of the side view of FIG. 2B and the end view of FIG. 2C, thereby directing each beam to one or another of WRE output ports 215.

Figure 3A:
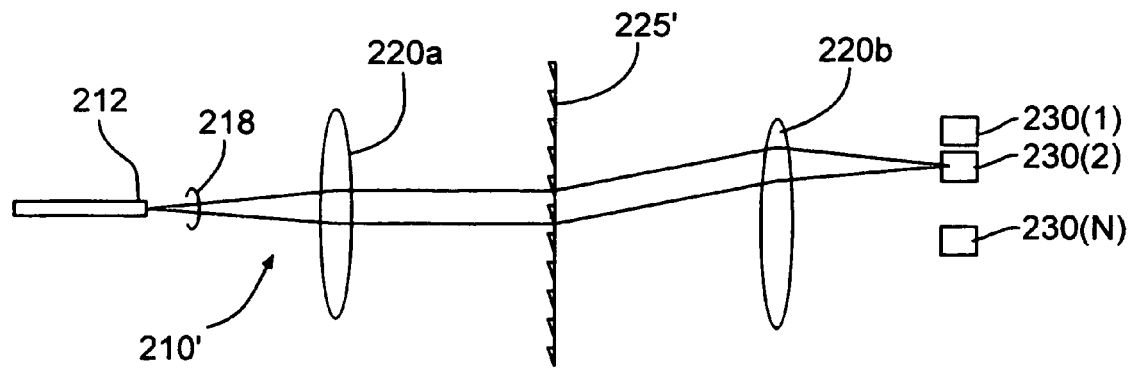
FIGS. 3A and 3B are schematic top and side views, respectively, of an optical wavelength routing element used in certain embodiments of the invention.
Figure 3B:
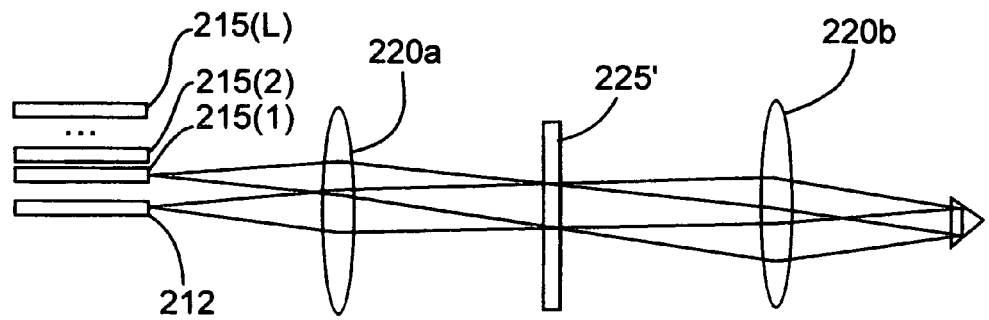

Another embodiment of a WRE, designated 210', is illustrated with schematic top and side views in FIGS. 3A and 3B, respectively. This embodiment may be considered an unfolded version of the embodiment of FIGS. 2A-2C and operates as a two-pass WRE. Light entering the WRE 10' from WRE input port 212 forms diverging beam 218, which includes the different spectral bands. Beam 218 encounters a first lens 220a, which collimates the light and directs it to a transmissive grating 225'. The grating 225' disperses the light so that collimated beams at different wavelengths encounter a second lens 220b, which focuses the beams. The focused beams are reflected by respective ones of plurality of retroreflectors 230, which may also be configured as described above, as diverging beams, back to lens 220b, which collimates them and directs them to grating 225'. On the second encounter, the grating 225' removes the angular separation between the different beams, which are then focused in the plane of WRE output ports 215 by lens 220a.

Figure 4:
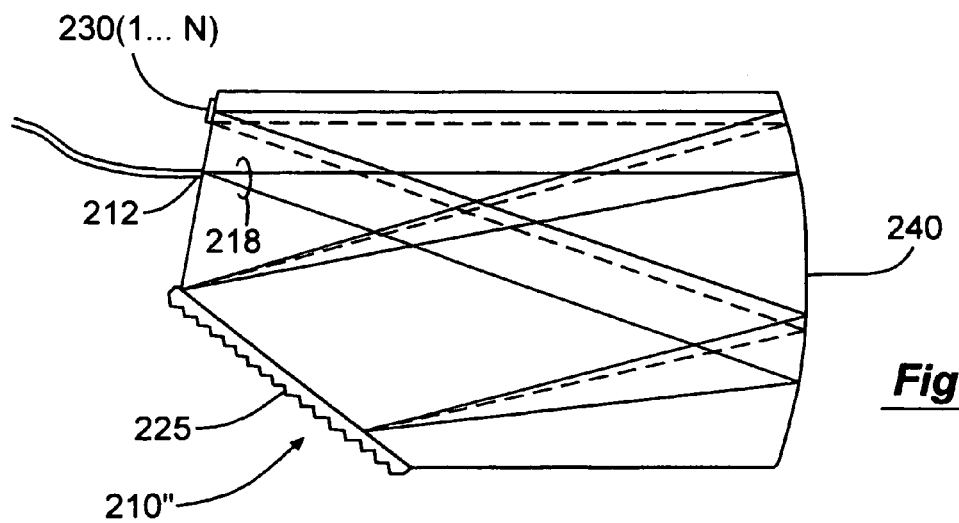
FIG. 4 is a schematic top view of an optical routing element according to a third embodiment of the invention.

A third embodiment of a WRE, designated 210", is illustrated with the schematic top view shown in FIG. 4. This embodiment is a further folded version of the embodiment of FIGS. 2A-2C, shown as a solid glass embodiment that uses a concave reflector 240 in place of lens 220 of FIGS. 2A-2C or lenses 220a and 220b of FIGS. 3A-3B. Light entering the WRE 210" from input port 212 forms diverging beam 218, which includes the different spectral bands. Beam 218 encounters concave reflector 240, which collimates the light and directs it to reflective diffraction grating 225, where it is dispersed so that collimated beams at different wavelengths are directed at different angles back towards concave reflector 240. Two such beams are shown explicitly, one in solid lines and one in dashed lines. The beams then encounter retroreflectors 230 and proceed on a return path, encountering concave reflector 240, reflective grating 225', and concave reflector 240, the final encounter with which focuses the beams to the desired WRE output ports. Again, the retroreflectors 230 may be configured as described above.

3. Cross-Connect Building Blocks

Some of the multi-city DWDM wavelength link architectures described herein use optical wavelength cross connects. Such optical cross connects may be made in accordance with certain embodiments of the invention with L×1 optical elements that may include one or more WREs. Such an element is referred to generically herein as an "L×1 WRE," including arrangements that have more than one WRE, provided at least one WRE is comprised by the element. Thus, one example of an embodiment of an L×1 WRE that may be used in an optical cross connect according to the invention is a single structure that has one input (output) port and L output (input) ports. Other embodiments of an L×1 WRE comprised of smaller WREs are illustrated in FIGS. 5A-5D.

Figure 5A:
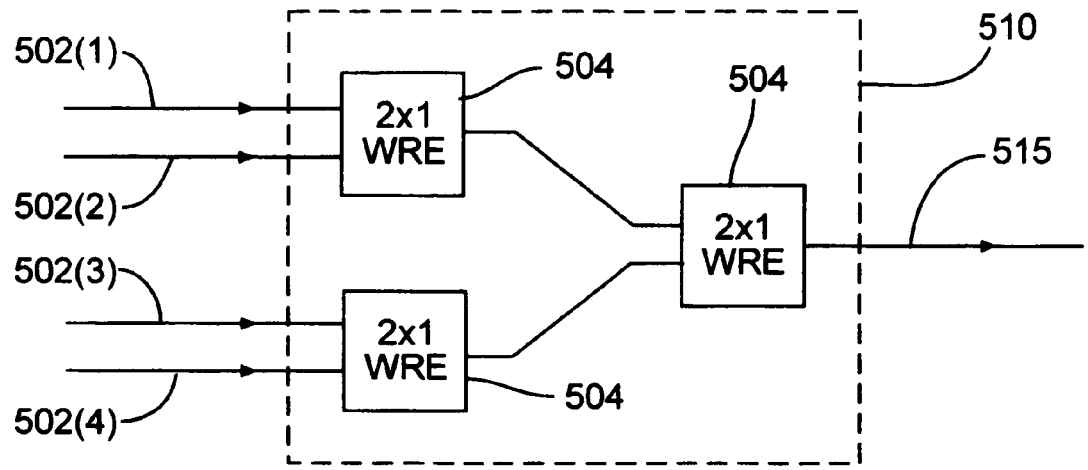
FIGS. 5A-5D are schematic diagrams showing examples of P×1 cross-connect building blocks that include wavelength routing elements in accordance with embodiments of the invention.

For example, FIG. 5A shows how a 4×1 WRE 510 may be configured with three 2×1 WREs. Each of the 2×1 WREs used in any of these embodiments may be configured as one of the WREs described in the '061 application or may be configured according to another WRE design. The 4×1 WRE 510 accepts four input signals 502 and outputs a single output signal 515. The four input signals 502 are received in pairs by two of the 2×1 WREs 504. The outputs from the 2×1 WREs 504 are used as inputs to the third 2×1 WRE, which output the output signal 515.

This arrangement of 2×1 WREs may thus be considered to be a tree arrangement. At each level of the tree, the number of distinct spectral bands across all optical signals at that level is reduced by the action of the 2×1 WREs 504 until, at the final level, only the desired spectral bands remain on the output signal 535. The resulting 4×1 WRE 510 thus functions according to the definition provided above for the operation of a WRE by mapping selected spectral bands from each of the input signals 502 according to a wavelength grid. Such a tree arrangement is an example of a more general class of WREs referred to herein as "cascaded arrangements".

The embodiment of FIG. 5A may also be used as a 1×4 WRE to perform the reverse mapping according to the wavelength grid by interchanging the functions of the input and output ports. In such an instance, spectral bands originating on the single input signal are progressively directed to the desired ones of the plurality of output signals by separating them with the 2×1 WREs 504 at each level of the tree. It is thus evident for a 1×4 WRE (and more generally for a 1×L WRE) that certain wavelength-grid positions of at least some of the output signals will be inactive by carrying no spectral bands.

Figure 5B:
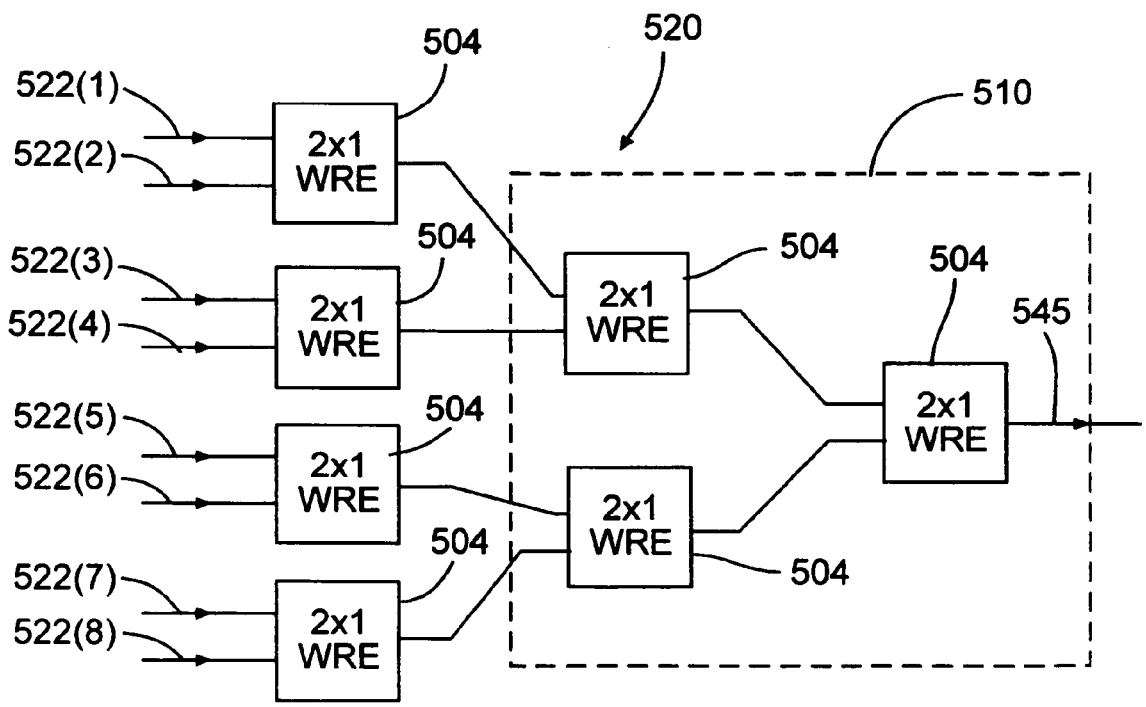

FIG. 5B shows an extension of the tree arrangement of 2×1 WREs 504 to an architecture that provides an 8×1 WRE 520. Spectral bands from eight input signals 522 are routed according to a unique wavelength-grid assignment to a single output signal 525. The eight input signals 522 are received in pairs by four 2×1 WREs 504, and the four outputs from those 2×1 WREs are received by the 4×1 WRE 510 shown in FIG. 5A. The resulting 8×1 WRE 520 functions according to the definition provided above for the operation of a WRE by mapping selected spectral bands from each of the input signals 522 according to a wavelength grid. It may also be used as a 1×8 WRE to perform the reverse mapping according to the wavelength grid by interchanging the functions of the input and output ports.

It is evident that larger WREs may be configured by including more layers in the tree. Adding still another layer of 2×1 WREs to the 8×1 WRE of FIG. 5B results in a 16×1 WRE. More generally, for a tree having p full layers of 2×1 WREs, the resulting element functions as a $2^p \times 1$ WRE, mapping spectral bands from $2^p$ input signals according to a wavelength grid onto a single output port. Such an element may alternatively be used as a $1 \times 2^p$ WRE to perform the reverse mapping according to the wavelength grid by interchanging the functions of the input and output ports.

Figure 5C:
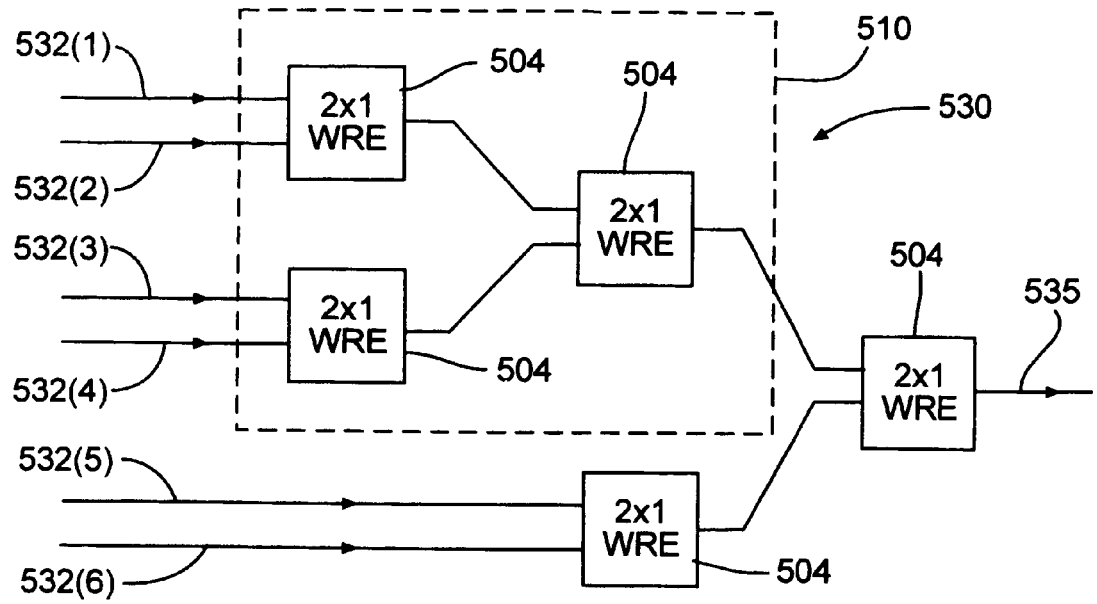

The more general class of cascaded arrangements may be understood by noting that it is not necessary for every level of the tree be completely filled with 2×1 WREs. For example, FIG. 5C provides a schematic illustration of an embodiment similar to that of FIG. 5B except that two of the 2×1 WREs 504 at the widest level of the tree have been removed. Accordingly, this embodiment functions as a 6×1 WRE 530 that maps selected spectral bands from each of six input signals 532 according to a wavelength grid onto a single output signal 535. Interchanging the functions of input and ports results in a reverse mapping according to the wavelength grid so that element 530 functions as a 1×6 WRE. It is noted by showing the component 4×1 WRE 510 with the dashed line that this embodiment may alternatively be considered as a configuration having a complete tree, but with different sizes of WREs on a given level. The 6×1 WRE 530 shown comprises a tree having a 4×1 WRE 510 and a 2×1 WRE 504 on its widest level, these WREs feeding into a 2×1 WRE 504 at the top level.

Figure 5D:
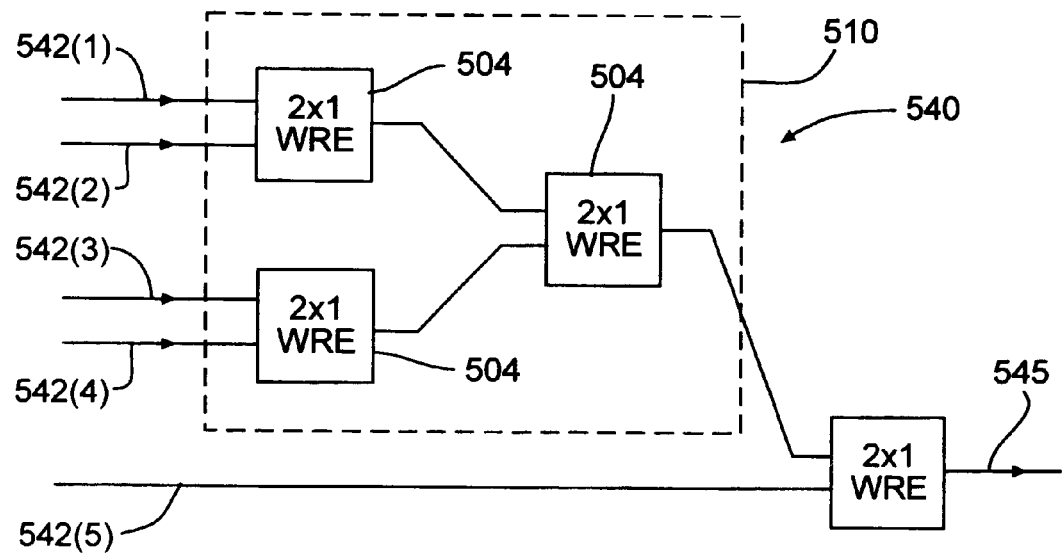

Similarly, FIG. 5D eliminates some 2×1 WREs 504 from two levels of the tree when compared with FIG. 5B. The illustrated embodiment functions as a 5×1 WRE 540 by mapping selected spectral bands from each of five input signals 542 according to a wavelength grid onto a single output signal 545. As for the other embodiments, element 540 may function as a 1×5 WRE by interchanging the functions of the input and output ports. Also, like the embodiment shown in FIG. 5C, element 540 may be considered as having WREs of different sizes, specifically in this example of comprising a 4×1 WRE 510 and a 2×1 WRE 504.

Figure 6A:
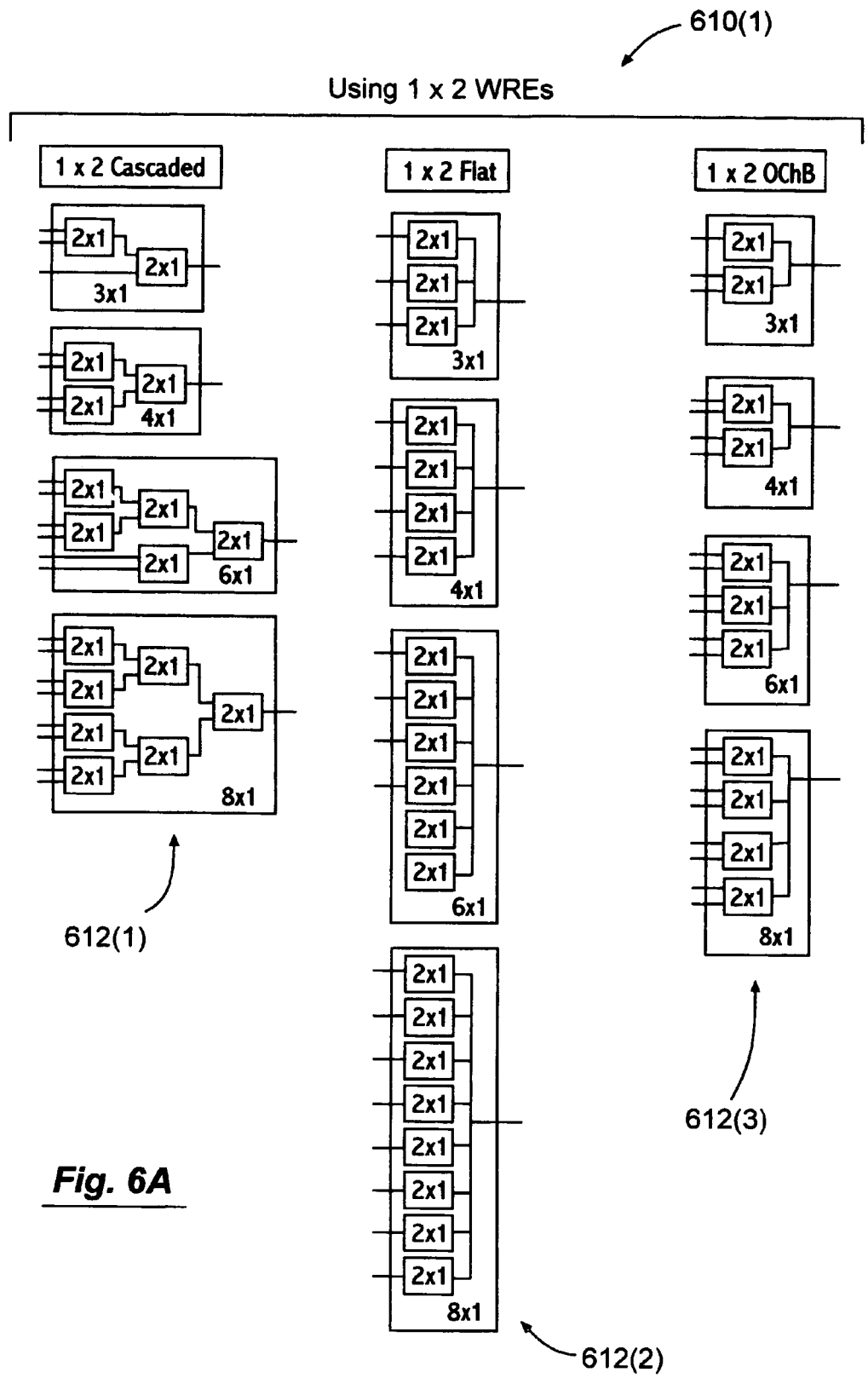
FIGS. 6A-6C schematically summarize various categories of P×1 cross-connect building blocks that include wavelength routing elements in accordance with embodiments of the invention.
Figure 6B:
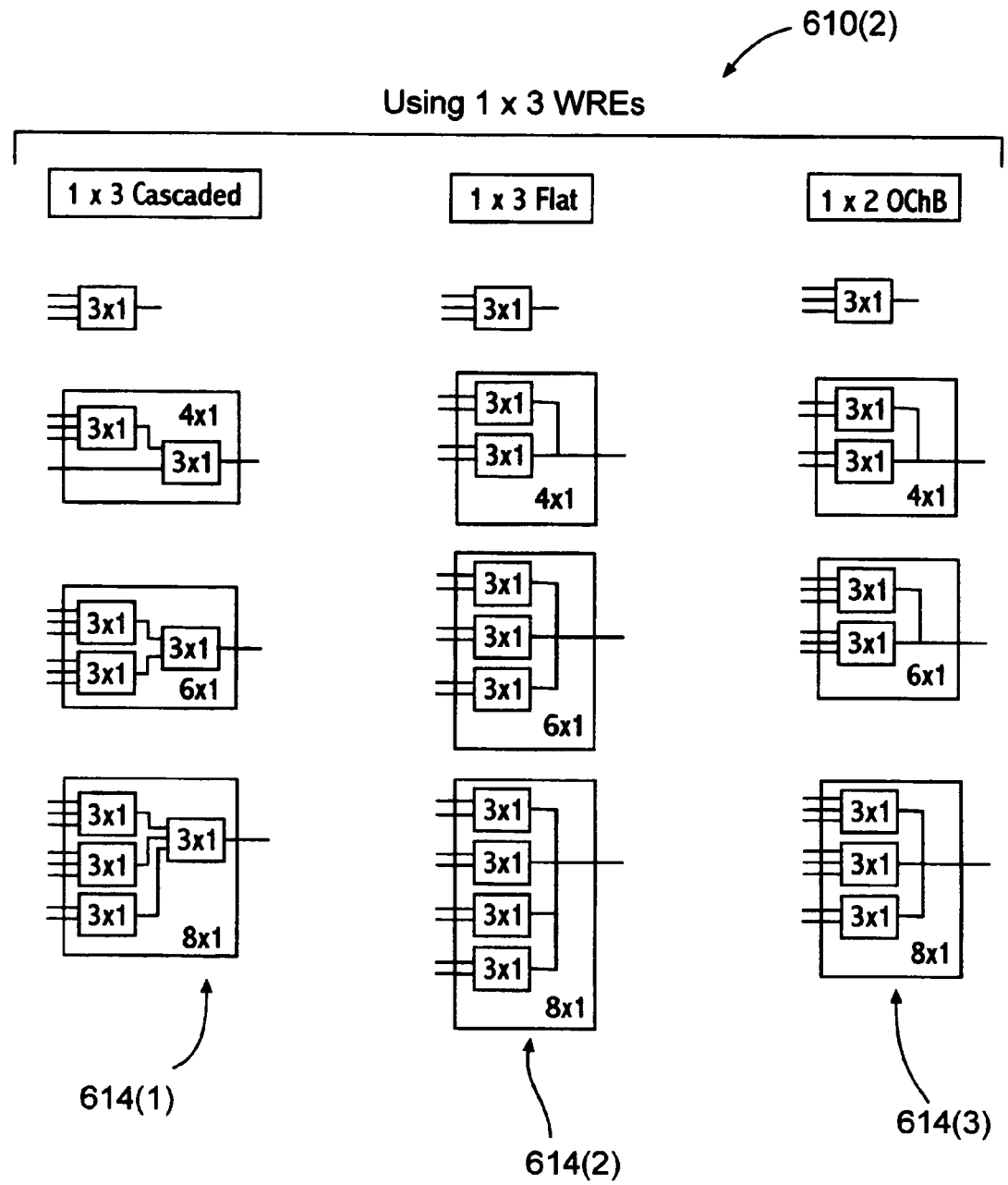
Figure 6C:
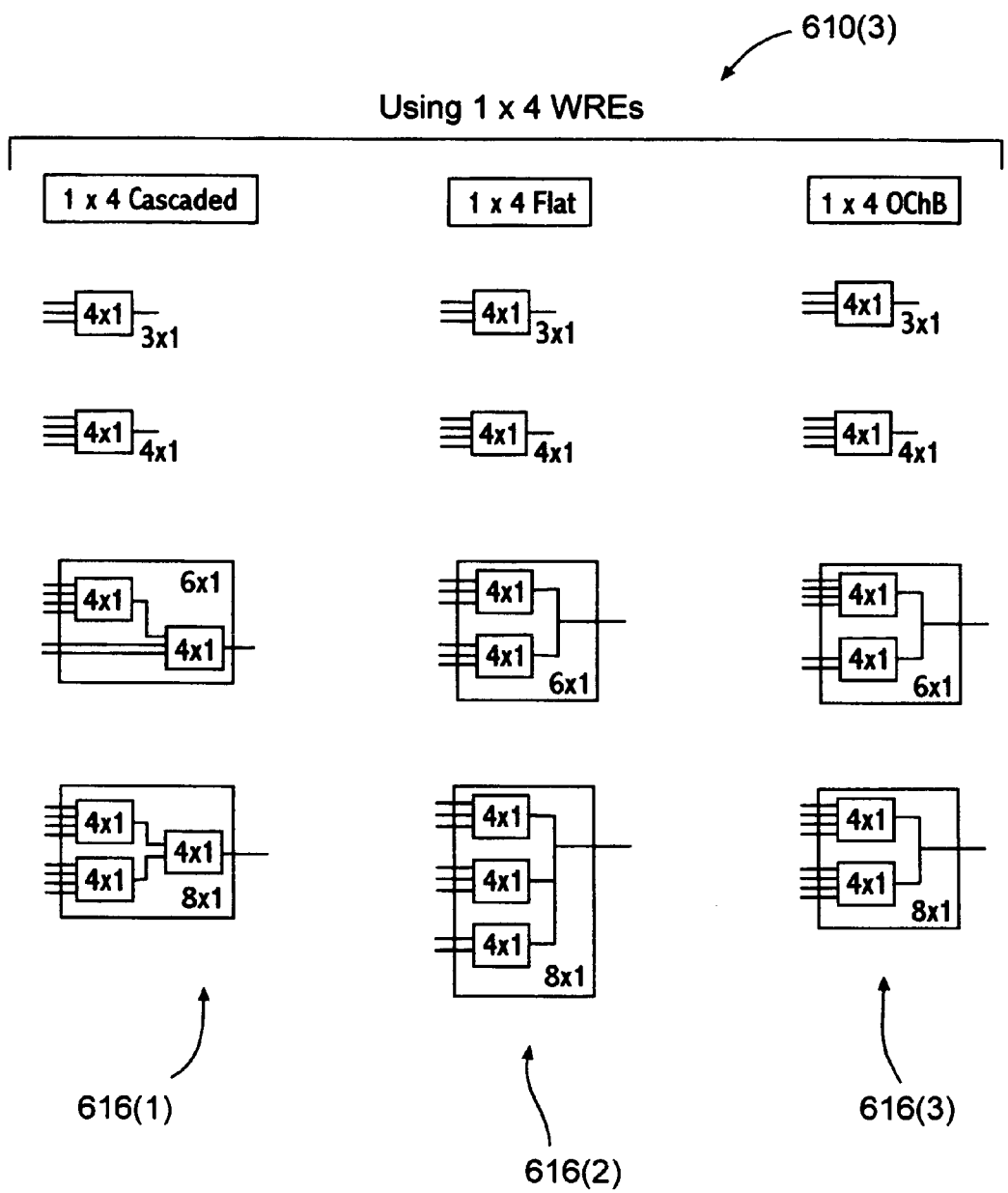

The cascaded arrangements of WREs described with respect to FIGS. 5A-5D are themselves subsets of a more general classification of L×1 WREs that is summarized more comprehensively in FIGS. 6A-6C. The cascaded arrangements are configured so that the output of one component WRE is in optical communication with the input of another component WRE. In addition to such cascaded arrangements, the tabulation shown in FIGS. 6A-6C also provides examples of "flat WRE" embodiments and optical-channel-blocking ("OChB WRE") embodiments. In addition to the other capabilities of WREs, the OChB WREs have the ability to selectively block a spectral band present on the input from appearing at the output. Both the flat and OChB embodiments are characterized by the fact that no component WRE has its output in optical communication with the input of another component WRE. Furthermore, in the flat WRE embodiments, each of the component WREs has an unused port while in the OChB WRE embodiments, at least one of the component WREs has all of its ports used. In particular OChB embodiments, the minimum number of WREs possible of a particular L are used. Such embodiments have advantages of reduced insertion loss, greater reliability, and more modest space requirements than do some other embodiments.

The tabulation in FIGS. 6A-6C illustrates certain examples of 3×1, 4×1, 6×1, and 8×1 WREs that may be made using component 1×2, 1×3, or 1×4 WREs. Such component WREs in this illustration are configured as single structures having one input (output) port and two, three, or four output (input) ports respectively. The three columns of FIG. 6A, denoted collectively by reference numeral 610(1) use component 1×2 WREs, with each of columns 612(1), 612(2), and 612(3) corresponding to cascaded, flat, and OChB configurations respectively. Similarly, the three columns of FIG. 6B, denoted collectively by reference numeral 610(2) use component 1×3 WREs, with each of columns 614(1), 614(2), and 614(3) corresponding to cascaded, flat, and OChB configurations respectively. Further arrangements using 1×4 WREs are shown in the three columns of FIG. 6C 610(3), also for the cascaded 616(1), flat 616(2), and OChB 616(3) configurations. The tabulation may clearly be extended both in terms of the size of the L×1 WREs and in terms of the component 1×M WREs for arbitrary M and L. Moreover, the tabulation shown is not exhaustive since other configurations that may be grouped according to the classifications are possible, even for those examples of specific L×1 WREs and component 1×M WREs already shown in FIGS. 6A-6C.

In addition, other component WREs may be provided as described in copending, commonly assigned U.S. patent application Ser. No. 10/099,392, entitled "ONE-TO-M WAVELENGTH ROUTING ELEMENT," filed Mar. 13, 2002 by Nicholas Charles Cizek and Samuel Paul Weaver and U.S. patent application Ser. No. 10/098,805, entitled "TWO-BY-TWO WAVELENGTH ROUTING ELEMENT USING TWO-POSITION MEMS MIRRORS," filed Mar. 13, 2002 by Nicholas Charles Cizek, the entire disclosures of both of which are herein incorporated by reference for all purposes.

4. Multi-City DWDM Wavelength Link Architectures

Embodiments of the invention not only provide certain wavelength link architectures suitable for multi-city applications that may use the building blocks discussed above, but in certain embodiments also permit upgrades of the architecture to accommodate one or more additional cities. As used herein, the term "city" is intended only to refer generally to specific separated optical transmission systems to and from which traffic is to be routed. While in many specific applications, such traffic will be directed to a population center, use of the term "city" is not intended to limit embodiments of the invention to population centers nor to any geographical regions defined by political and/or governmental boundaries. In some embodiments, the optical transmission systems will be separated on the scale of population-center separations even if the city locations do not correspond to population centers. In other embodiments, however, the optical transmission systems may be as close as separate locations within a single building.

Figure 7:
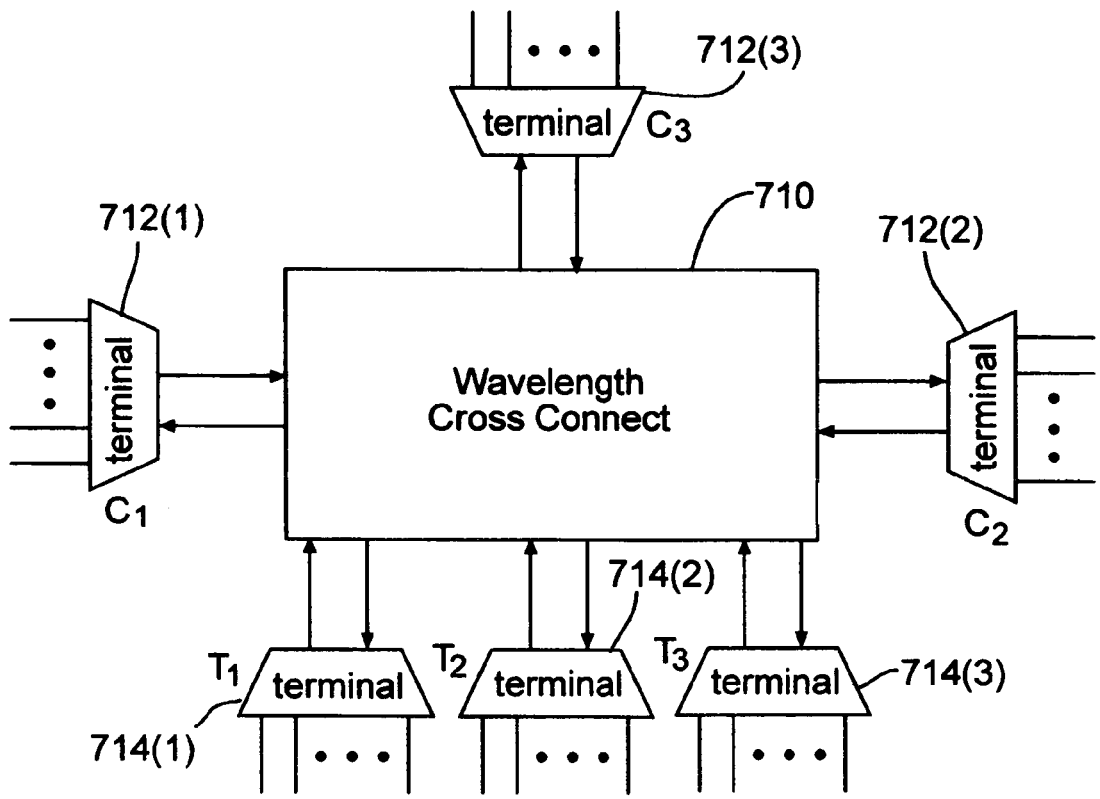
FIG. 7 provides a schematic illustration of a multi-city architecture that uses a wavelength cross connect.

A schematic illustration is provided in FIG. 7 to show the general operation of a multi-city configuration. The illustration in FIG. 7, and for portions of the discussion below, focuses specifically on a three-city configuration, although it is evident how the principles for three cities may be extended to greater numbers of cities. In FIG. 7, a wavelength cross connect 710 is used to coordinate traffic between three city terminals 712, with the cities denoted $C_i$ (i=1, 2, or 3). In addition, traffic may be added and/or dropped at local terminals denoted $T_i$.

The functionality of the system may differ in certain respects between the city terminal 712 and the local add/drop terminals 714. For example, it is generally desired that the system be capable of routing any signals from a particular city terminal 712 to at least all the other city terminals; in some embodiments, it may additionally be possible for traffic to be looped back to the particular city. Fewer constraints are generally applied to local add/drop traffic so that in some embodiments, each local add/drop terminal 714(i) is capable only of exchanging traffic with one of the city terminals 712(i). In other embodiments, greater functionality may be supplied so that add/drop traffic for a particular local terminal 714 may be exchanged between multiple city terminals 712, even with all of the city terminals 712. Still greater functionality is available in further embodiments by also permitting the exchange of traffic between local terminals 714. In different instances, the specific embodiments discussed below accommodate different such constraints.

a. Broadcast and Select with Protection

In some embodiments, the broadcast-and-select architectures described in the Bortolini applications may be used to accommodate multi-city applications such as those described with respect to FIG. 7. For example, a multi-city architecture in which traffic may be routed from each city and local add/drop terminal to any other city or add/drop terminal may be provided by associating each of the input signals and each of the output signals in FIG. 7A of the Bortolini applications with one of the city or local add/drop terminals.

Figure 8A:
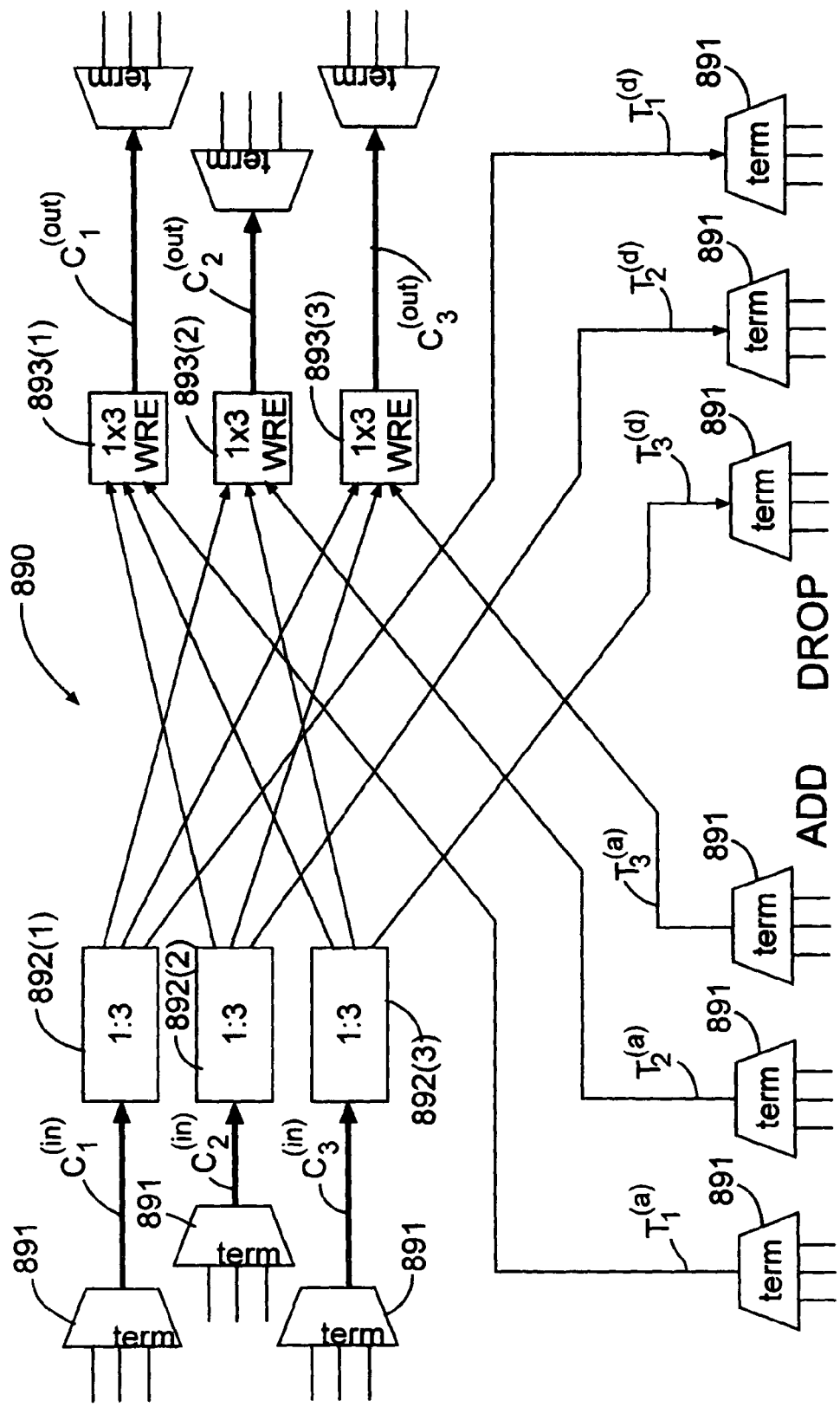
FIG. 8A provides a schematic illustration of a three-city architecture using a no-loopback broadcast-and-select wavelength cross connect without protection.

Another embodiment of a multi-city cross connect that uses the principles of a broadcast-and-select scheme is shown for three cities in FIG. 8A. In this embodiment, signals are routed among city and local add/drop terminals 891 with an architecture denoted generally by reference numeral 890. The signals to be routed from particular cities are denoted by $C_i^{(in)}$ and the signals received by particular cities after routing by the architecture 890 are denoted $C_i^{(out)}$. In the illustrated embodiment, no loop back is provided so that there is no path available for a specific signal from a particular city to be routed back to that particular city (i.e., $C_k^{(in)} \not\to C_k^{(out)}$ for a specific k). In addition, the architecture 900 shown in FIG. 8A is configured to accommodate signals that may be dropped, denoted $T_i^{(d)}$, and signals that may be added, denoted $T_i^{(a)}$. The cross-connect-input signals correspond to the city input signals $C_i^{(in)}$ and the cross-connect-output signals correspond to the city output signals $C_i^{(out)}$.

The architecture 890 includes a plurality of 1:3 optical couplers 892 and a plurality of 1×3 WREs 893. Each optical coupler 892(i) receives one of the city signals $C_i^{(in)}$ and transmits a plurality of signals equivalent to that city signal. One of the equivalent signals is directed as a drop signal $T_i^{(d)}$ and the other equivalent signals are directed to WREs 893(j≠i) that correspond to the other cities. With such an arrangement, the drop signal $T_i^{(d)}$ thus includes all the spectral bands of the corresponding city signal and there is no provision for loopbacks. Each WRE 893(i) receives a corresponding add signal $T_i^{(a)}$ and an equivalent to each of the other city signals $C_{j(\neq i)}^{(in)}$, from which it selects the desired spectral bands for the city output signals $C_i^{(out)}$.

It will be evident to those of skill in the art how the architecture may be configured for an arbitrary number of cities in multi-city applications. For an $N_C$-city application, a plurality $N_C$ of 1:$N_C$ optical couplers are configured o transmit equivalents to the $N_C$ input signals. For each optical coupler, one such equivalent is dropped. A plurality $N_C$ of 1×$N_C$ WREs are provided to receive equivalents from an add signal and from $N_C$−1 distinct equivalent signals to select desired spectral bands for the $N_C$ output signals.

The ability to accommodate loopbacks may be included in the architecture by increasing the splitting capacity of the couplers 892, increasing the capacity of the WREs 893, and adding additional optical communication between corresponding couplers 892 and WREs 893. Thus, for an $N_C$-city application, a plurality $N_C$ of 1:($N_C$+1) optical couplers are configured to receive and propagate equivalents to the $N_C$ input signals. For each optical coupler, one such equivalent is dropped so that each of a plurality $N_C$ of 1×$N_C$ WREs receive an equivalent to each input signal and receive an add signal. Each WRE thereby selects desired spectral bands from the signals it receives, including spectral bands from the corresponding city input signal.

Figure 8B:
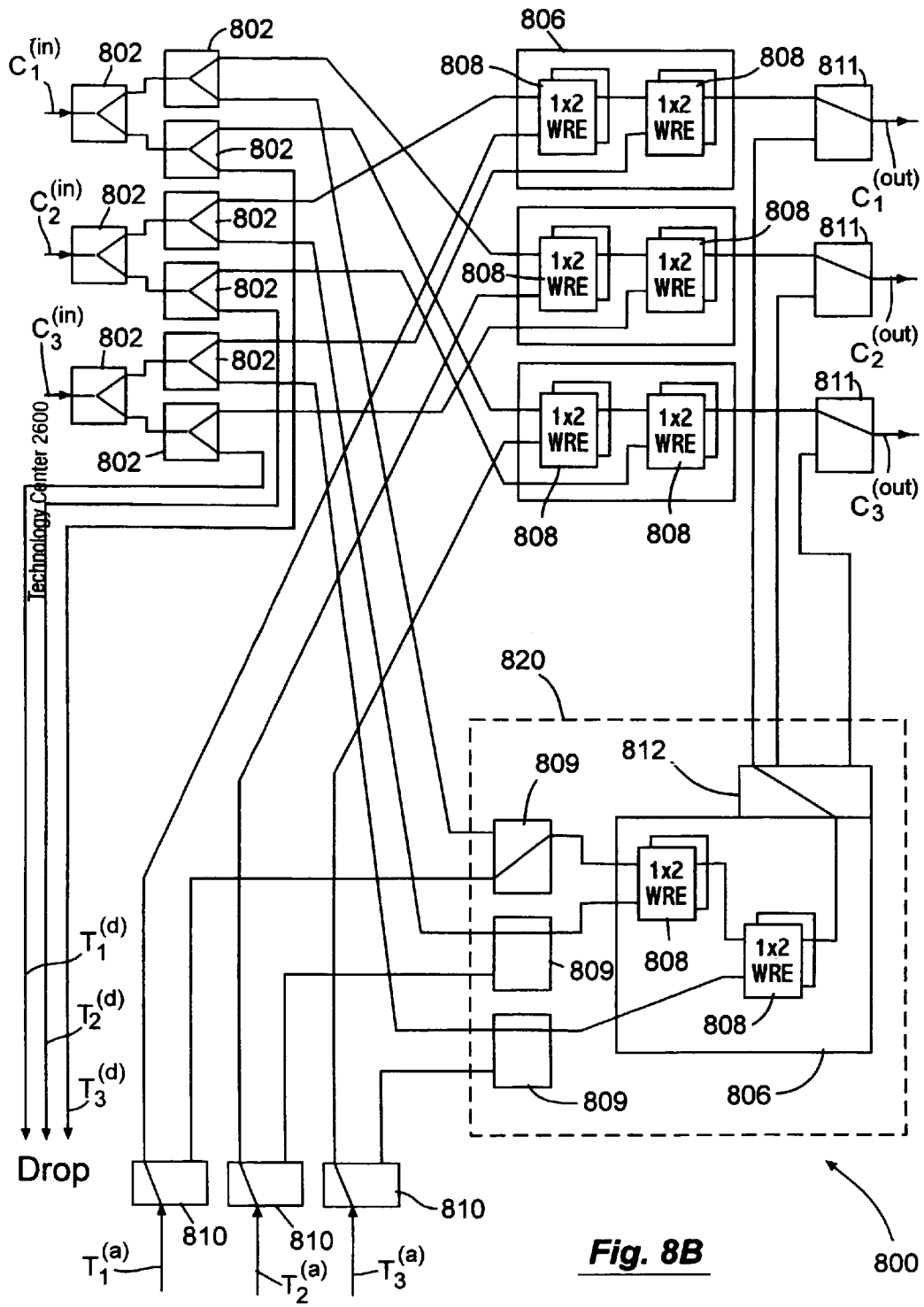
FIG. 8B provides a schematic illustration of a three-city architecture using a no-loopback broadcast-and-select wavelength cross connect with protection.

The architecture 890 shown in FIG. 8A does not include a mechanism for protecting against a failure of one of the WREs 893. FIG. 8B therefore shows a corresponding cross connect 800 in which protection capability is included. The terminals are not shown explicitly in FIG. 8B. The architecture 890 of FIG. 8A essentially corresponds to a working fabric provided on the cross connect 800 through which traffic is normally routed. For each of the three cities in the illustration, a 3×1 WRE 806 is provided to accept signals from the other two cites and from the corresponding add signal, and to route the desired traffic to that city. In the illustration, each 3×1 WRE 806 is shown as consisting of two 1×2 WREs 808 in a cascaded arrangement, although other configurations may be used, including those tabulated in FIGS. 6A-6C.

In addition to the working fabric, a protection fabric 820 is provided so that signals may still be routed as desired even in the event of a failure of a component on the working fabric. As shown, the protection fabric includes a 3×1 WRE 806 that may substitute for one of the working 3×1 WREs in responding to a failure. In addition, the protection fabric includes a plurality of 2×1 fiber switches 809 that may be configured to accept traffic either from the add signals $T_i^{(a)}$ or from the city signals $C_i^{(in)}$. Three such 2×1 fiber switches 809 are provided on the protection fabric 820 so that, unlike the working fabric, traffic may be received from all of the city signals $C_i^{(in)}$. The protection fabric 820 also comprises a 3×1 fiber switch 812 so that the output from the protection 3×1 WRE 806 may be directed to the appropriate city signal $C_i^{(out)}$. Each city signal $C_i^{(out)}$ is thus selected by a 2×1 fiber switch 811 either from the working fabric or from the protection fabric 820. Similarly, each of the add signals $T_i^{(a)}$ is directed either to the working fabric or to the protection fabric 820 depending on the state of additional 2×1 fiber switches 810 associated with the add signals $T_i^{(a)}$.

To accommodate the various signals that are needed for these different components of the protected cross connect 800, the city input signals $C_i^{(in)}$ are divided into four equivalent signals by an arrangement of optical couplers associated with each city input signal $C_i^{(in)}$. In the illustration, an arrangement of 1:2 optical couplers 802 is used in a tree arrangement that functions effectively as a 1:4 optical coupler to provide the four equivalents to each city input signal $C_i^{(in)}$. In alternative embodiments, different configurations of optical couplers may be used to provide the desired number of equivalent signals. For the three-city illustration, the four equivalent signals correspond to two for each of the other cities to which traffic may be routed, one for the protection fabric 820, and one for the drop signal $T_i^{(d)}$. Different numbers of signals may be appropriate in alternative embodiments, such as those in which duplicate protection is provided; an illustration of duplicate protection is provided in the Bortolini applications and may be adapted in certain embodiments to the configuration shown in FIG. 8A.

In a manner similar to that described for the unprotected architecture 890 with respect to FIG. 8A, it will be evident to those of skill in the art how the protected cross connect 800 may be configured generally for an $N_C$-city system. Each of the WREs 806 on the working and protection fabric should at least be an $N_C$×1 WRE to accommodate one add signal and ($N_C$−1) signals from the other cities. The couplers associated with each of the city input signals should provide ($N_C$+1) equivalents to accommodate a drop signal, a protection signal, and ($N_C$−1) signals to the working fabric. It is noted that in the illustrated embodiment, the drop-signal traffic is not routed through the protection fabric 820 because even in the absence of a fault, it is not routed through any of the working WREs 806.

The broadcast-and-select-with-protection configuration may be upgraded while in service without affecting through traffic between the cities. An illustration of such an upgrade is provided in FIGS. 8C-8G, with the basic steps being summarized in FIG. 9. For simplicity, the upgrade illustration shows how a two-city configuration may be upgraded without disturbing through traffic to a three-city configuration. It is possible to apply the basic technique to upgrade any $N_C$-city configuration, and may sometimes be used to add a plurality of new cities to the configuration substantially simultaneously. Moreover, it is noted that while the upgrade illustration is provided for a symmetric K×K cross connect, which is particularly suitable for the multi-city applications described, the upgrade may be performed more generally on an asymmetric $K_i×K_{j\neq i}$ cross connect.

Figure 8C:
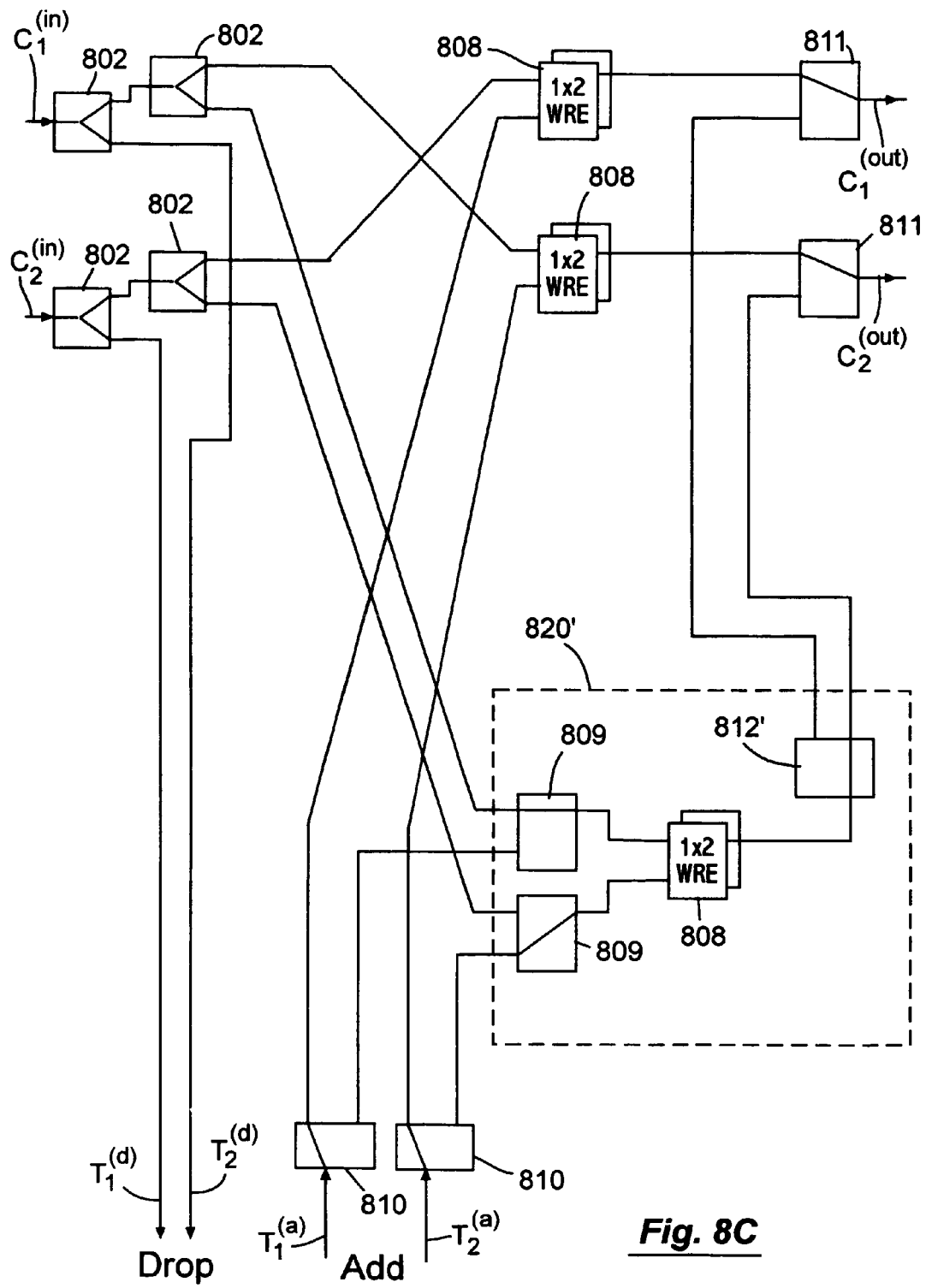
FIGS. 8C-8G provide schematic illustrations of intermediate stages in an upgrade from a two-city to a three-city architecture using a no-loopback broadcast-and-select wavelength cross connect with protection.
Figure 8D:
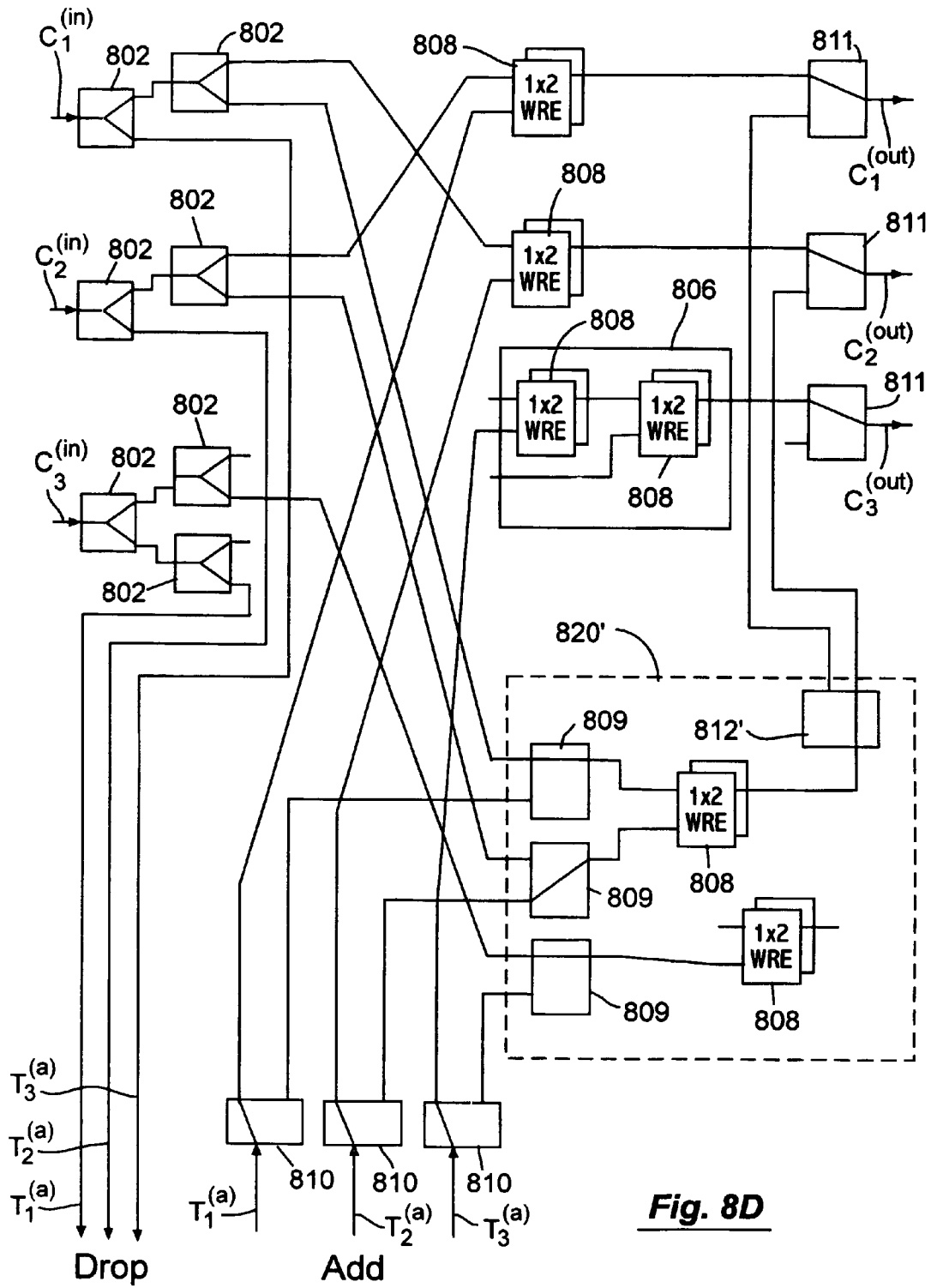

The initial configuration of the two-city broadcast-and-select architecture with protection shown in FIG. 8C is similar to the three-city architecture shown in FIG. 8B, except that the working-fabric and protection-fabric 820' WRE comprise a 1×2 WRE 808 and the optical couplers are configured to provide three equivalent signals. FIG. 8D shows an intermediate configuration that results from (1) adding third city signals $C_3^{(in)}$ and $C_3^{(out)}$, together with a coupler arrangement that produces four equivalents to $C_3^{(in)}$ and a 1×3 WRE 806 associated with $C_3^{(out)}$; (2) adding third drop and add signals $T_3^{(d)}$ and $T_3^{(a)}$, together with a 1×2 fiber switch 810 associated with $T_3^{(a)}$; and (3) adding additional structure to the protection fabric 820', including an additional 1×2 fiber switch 809 to select between $T_3^{(a)}$ and an equivalent to $C_3^{(in)}$ and additional WRE capacity ultimately to be used in forming a protection 1×3 WRE. At this stage in the upgrade, there has been no disruption of any traffic preexisting on the two-city architecture.

Figure 8E:
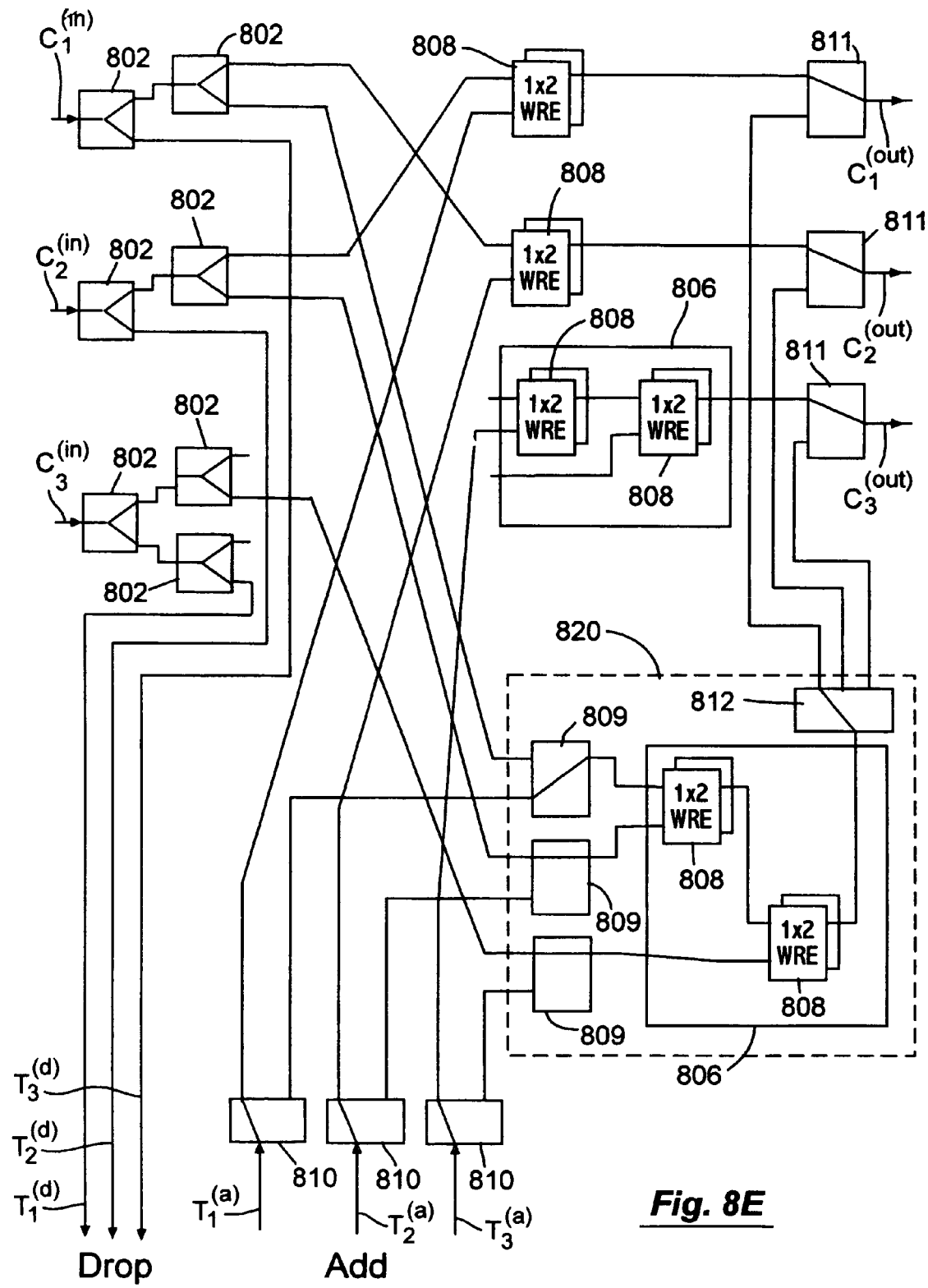

FIG. 8E shows the results of further upgrades, particularly to the protection fabric. The 1×2 fiber switch 812' used for directing protection traffic to $C_i^{(out)}$ has been upgraded to a 1×3 fiber switch 812 for accommodating the three-city architecture. In addition, connections are completed for the protection 1×3 WRE. During this upgrade of the protection fabric, there is no disruption of the operation of the two-city architecture, although it may be unable to compensate for a fault in the working fabric because the protection fabric is unavailable.

Figure 8F:
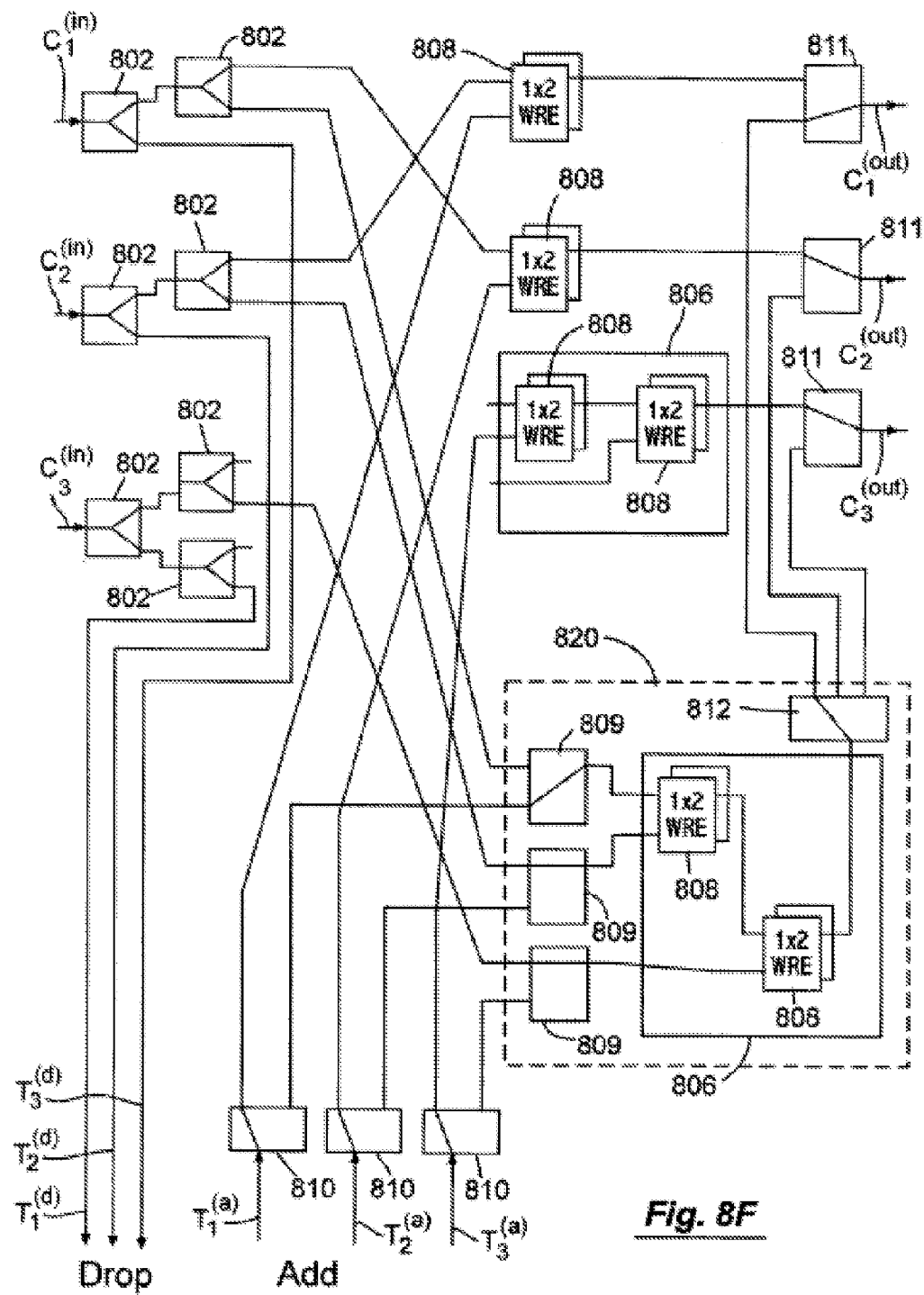
Figure 8G:
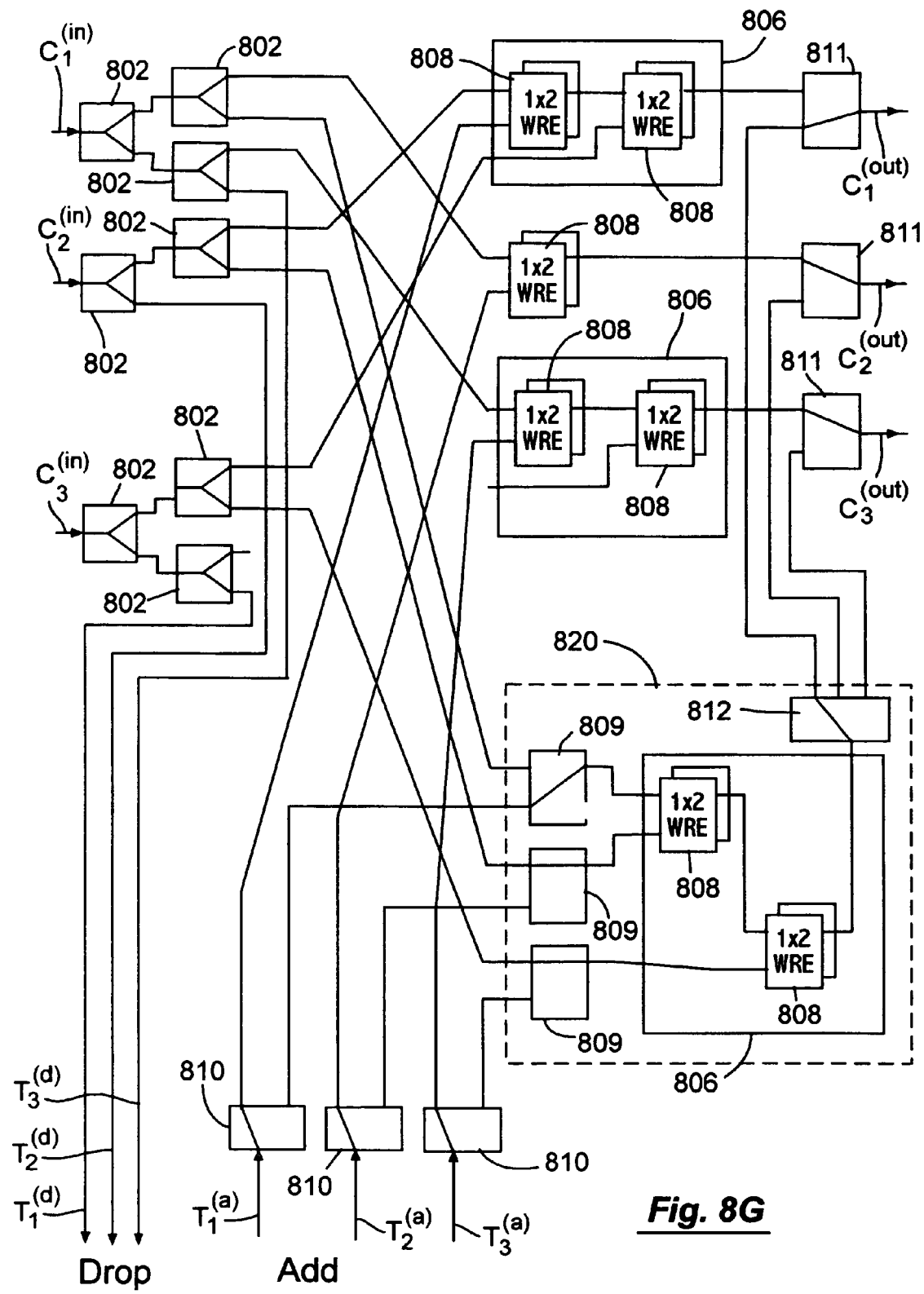

FIG. 8F shows the results of diverting traffic away from the first working fabric through the upgraded protection fabric in preparation for upgrading the first working fabric. In particular, the 1×2 fiber switches 810 are positioned to divert the $T_1^{(a)}$ signal to the protection fabric 820 and to receive traffic for the $C_1^{(out)}$ signal from the protection fabric 820, with the routing of traffic from $C_2^{(in)}$ also being handled by the protection fabric. While the traffic is being rerouted from the first working fabric, it is upgraded to accommodate the three-city configuration, producing the architecture shown in FIG. 8G. The diverted traffic is then routed back again to the working fabric, freeing the protection fabric to be used for an upgrade of additional working fabric. This process of rerouting traffic from the working fabric to the protection fabric to perform an upgrade of the working fabric is carried out systematically for all of the working fabric until the architecture shown in FIG. 8B is achieved.

It will readily be apparent that the same procedure may be applied to upgrade the three-city architecture to a four-city architecture, etc. The upgrade method is summarized with the flow diagram of FIG. 9. After starting with a general, perhaps asymmetric, $K_i \times K_j$ cross connect at block 904, the protection fabric is upgraded to the larger size at block 908. Working fabric to accommodate the new cities to be added is performed at block 912. At block 916, the transmission is passed from one of the working fabrics to the protection fabric so that the bypassed working fabric may be upgraded at block 920. The transmission is switched back to the upgraded working fabric at block 924 and, if the result of the check at block 932 is that not all the working fabric has yet been upgraded, the method proceeds to the next working fabric at block 928. The method thus iterates in this fashion until all of the working fabric has been upgraded. It is noted that this illustrates merely one embodiment for the in-service upgrade, with the protection fabric being upgraded before the working fabric. Such an order is not necessary. More generally, the upgrade of the protection fabric may be performed at any point in the method, i.e. before, after, or even during the upgrade of the working fabric. With respect to the flow diagram of FIG. 9, the position of blocks 908 and/or 912 may thus be freely moved within the method without exceeding the scope of the invention.

In addition, while the method of FIG. 9 has been noted particularly with respect to an architecture having a broadcast and select wavelength cross connect, it may be used more generally in any architecture that has a protection fabric. The protection fabric permits traffic to successive working fabrics to be rerouted during upgrade of the capacity of each working fabric. In particular, the method illustrated in FIG. 9 may be used with architectures that accommodate a variety of add and drop subarchitectures, some of which are discussed explicitly below.

b. Wavelength Cross Connect with Full Add/Drop

Figure 10:
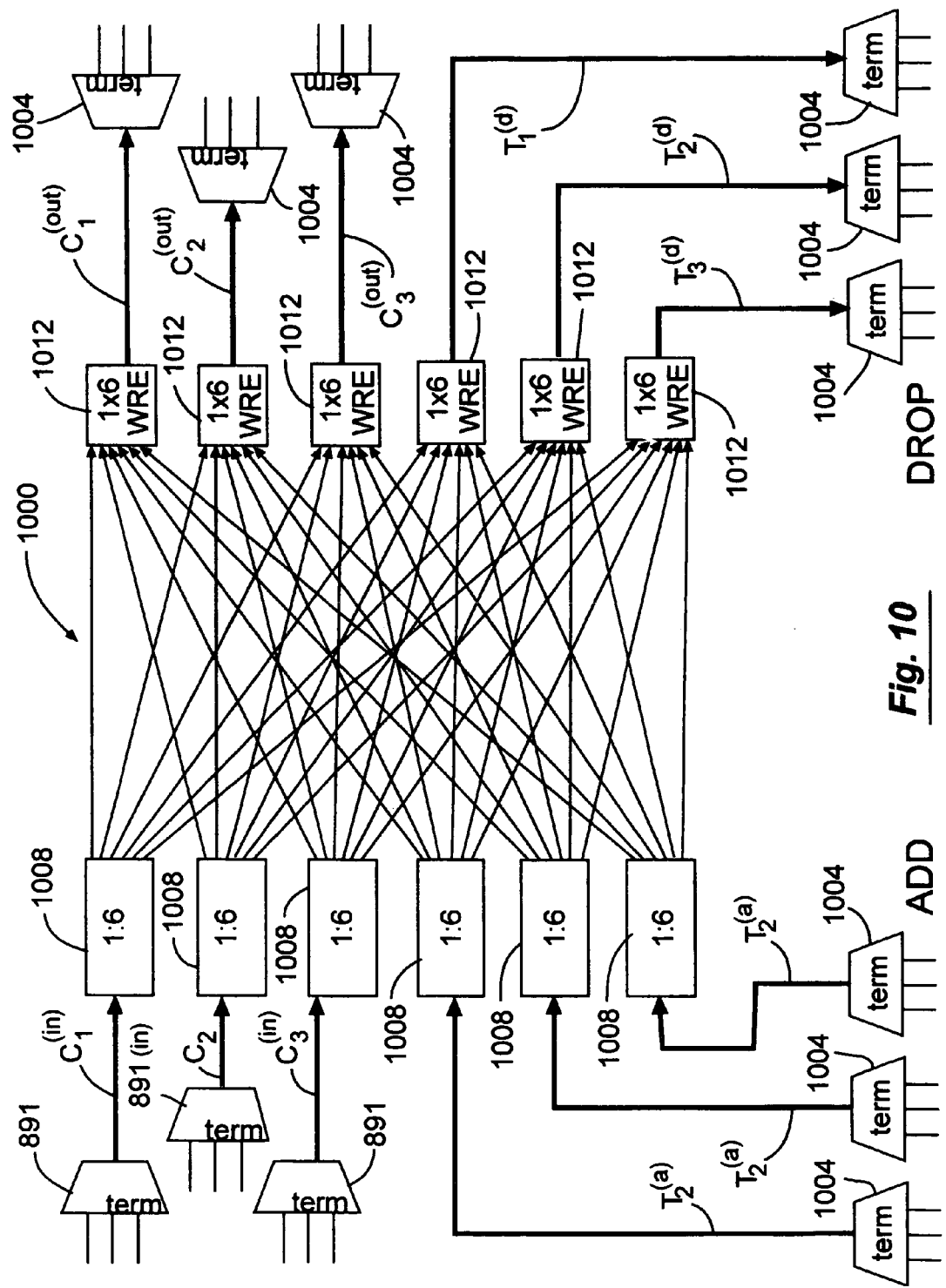
FIG. 10 provides a schematic illustration of a three-city architecture with full add/drop capability using a broadcast-and-select wavelength cross connect.

A three-city application using a wavelength cross connect with full add/drop capability is shown in FIG. 10. While the illustration uses a broadcast-and-select architecture for the wavelength cross connect, it will be evident that alternative architectures, including those described in the Bortolini applications, may alternatively be used. For simplicity, the architecture is shown without a protection fabric, although such a protection fabric may be included in alternative embodiments using the principles discussed above for the broadcast-and-select architectures; the Bortolini applications provide additional examples of protection schemes that may be used where the wavelength cross connect is configured with a different architecture.

In this embodiment, there is complete flexibility in routing signals among both the city and local add/drop terminals 1004. This is achieved by treating signals from the cities $C_i^{(in)}$ on an equal footing with add signals $T_i^{(a)}$, and by treating signals to the cities $C_i^{(out)}$ on an equal footing with drop signals $T_i^{(d)}$. Each of those signals is provided from a terminal 1004 to a $1:(N_C+N_{A/D})$ coupler 1008, where $N_C$ is the number of cities accommodated by the architecture and $N_{A/D}$ is the number of local add/drop terminals accommodated by the architecture. In the illustrated three-city architecture with three add/drop terminals, $N_C=N_{A/D}=3$. The couplers 1008 thereby produce equivalents to all of the signals so that each one is directed to a $1 \times (N_C+N_{A/D})$ WRE 1012 for selection of the desired signals. The resulting architecture 1000 may thus be considered to be equivalent to a $(N_C+N_{A/D}) \times (N_C+N_{A/D})$ optical wavelength cross connect, with the cross-connect-input signals comprising both the city input signals $C_i^{(in)}$ and the add signals $T_i^{(a)}$, and the cross-connect-output signals comprising both the city output signals $C_i^{(out)}$ and the drop signals $T_i^{(d)}$.

In embodiments where a protection fabric is included, the architecture 1000 may be upgraded without affecting through traffic. Such an upgrade proceeds analogously to the upgrade technique described with respect to FIG. 9. In particular, the inclusion of a protection fabric permits traffic to be systemically rerouted onto the protection fabric, thereby bypassing components of the working fabric so that they may be upgraded. In addition, the protection fabric itself is upgraded before, during, or after the progressive upgrading of the individual working fabrics.

c. Wavelength Cross Connect with In-Line Add Drop

Figure 11:
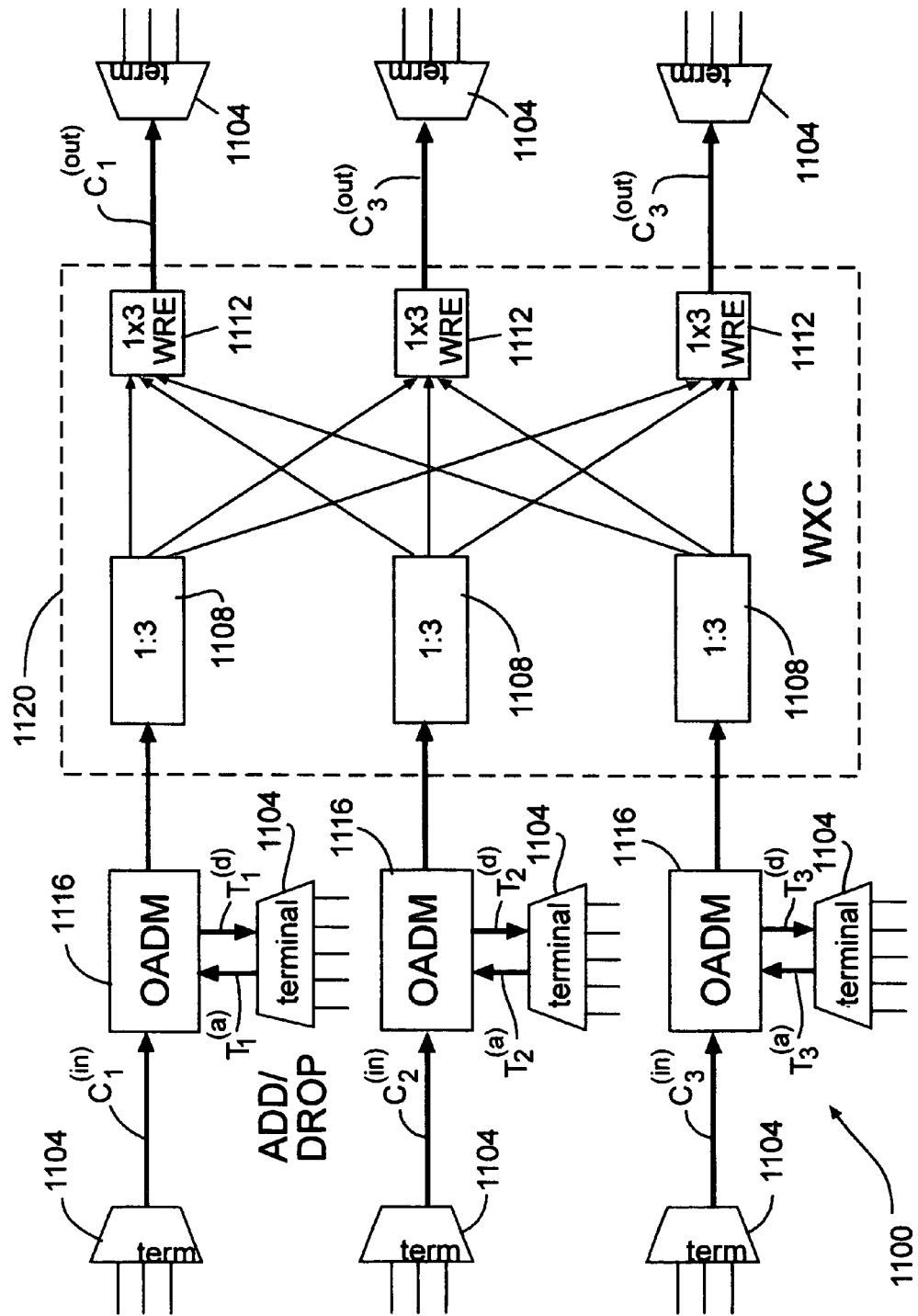
FIG. 11 provides a schematic illustration of a three-city architecture with in-line add/drop capability using a broadcast-and-select wavelength cross connect.

FIG. 11 provides an example of a further embodiment of a multi-city architecture 1100 illustrated for a three-city configuration in which traffic is exchanged among terminals 1104 associated with cities and/or with local add/drop sites. In this embodiment, optical add/drop multiplexers ("OADMs") 1116 are used to handle the traffic being added and/or dropped. There are various ways in which such OADMs 1116 may be configured. For example, in one embodiment, the OADMs 1116 each comprise a 1:2 optical coupler in optical communication with a 1×2 WRE, the dropped signal corresponding to one equivalent provided by the optical coupler and the WRE configured to receive the other equivalent and the add signal. In alternative embodiments, the OADMs 1116 comprise 2×2 optical wavelength cross connects, which may be configured using any of the arrangements described in the Bortolini patents. In still other embodiments, the OADMs 1116 may be configured as 2×2 WREs, such as those described in copending, commonly assigned U.S. patent application Ser. No. 10/098,805, entitled "TWO-BY-TWO OPTICAL ROUTING ELEMENT USING TWO-POSITION MEMS MIRRORS," filed Mar. 13, 2002 by Nicholas Charles Cizek, the entire disclosure of which has been incorporated by reference. In still other embodiments, the OADMs 1116 may use structures described in copending, commonly assigned U.S. patent application Ser. No. 09/745,760, entitled "BINARY SWITCH FOR AN OPTICAL WAVELENGTH ROUTER," filed Dec. 20, 2000 by Robert Anderson, the entire disclosure of which is herein incorporated by reference for all purposes. The OADMs 1116 function by receiving signals $C_i^{(in)}$ and $T_i^{(a)}$ as inputs; depending on the configuration of the OADM 1116, some spectral bands on the added signal $T_i^{(a)}$ may be added to the through signal and some spectral bands from $C_i^{(in)}$ may be dropped onto $T_1^{(d)}$.

Each of the city signals $C_i^{(in)}$ may thus have components added or dropped by respective OADMs 1116 before encountering an optical wavelength cross connect 1120. The signals output from the OADMs 1116 correspond to the cross-connect-input signals; the cross-connect-output signals in this embodiment still correspond to the city output signals $C_i^{(out)}$. The cross connect 1120 may thus function independently from the add/drop features of the architecture 1100 since those features are handled outside the cross connect 1120. Thus, in one embodiment, the size of the cross connect is $N_C \times N_C$, where $N_C$ is the number of cities. The $N_C \times N_C$ cross connect 1120 is shown in the illustration having a broadcast-and-select architecture, although this is not required and alternative architectures may be used. The broadcast-and-select architecture that is shown uses a set of optical couplers 1108 to receive the signals from the OADMs 1116 and to provide equivalents to those signals to each of $N_C$ elements configured as $1 \times N_C$ WREs 1112. The WREs 1112 may be configured to select desired spectral bands from each of the equivalent signals and direct them as city output signals $C_i^{(out)}$ to the terminals 1104.

The illustration does not explicitly show a protection fabric, although such a protection fabric may readily be included. For example, for the broadcast-and-select architecture used for the cross connect 1120 in FIG. 11, the principles described above may be used to incorporate the protection fabric. Examples of protection schemes that may be implemented in embodiments where the cross connect 1120 is configured differently, such as with a distribute-and-select architecture, are provided in the Bortolini applications. Moreover, the architecture 1100 lends itself to various other alternatives and equivalents, in addition to the alternatives provided by the use of different architectures for the optical wavelength cross connect 1120. For example, while the discussion has focused on an embodiment in which all of the OADMs 1116 are in optical communication with the input side of the optical wavelength cross connect 1120, this is not a requirement. Indeed, the same functionality is achieved when all of the OADMs 1116 are in optical communication with the output side the optical wavelength cross connect 1120, an architecture that corresponds simply to an interchange of signal labels $C_i^{(in)} \leftrightarrow C_i^{(out)}$. Such an interchange simply reflects the fact that there is nothing in the architecture itself that requires transmission of light in a particular direction. Furthermore, it is possible for some of the OADMs 1116 to be in optical communication with one side of the optical wavelength cross connect 1120 and the remainder to be in optical communication with the other side.

In embodiments where a protection fabric is included in the architecture, in-service upgrades may be performed without affecting through traffic. Such upgrades proceed similarly to the upgrades previously described. The protection fabric is upgraded to accommodate the additional city and is used in turn for maintaining the flow of through traffic while upgrades of components associated with each of the existing cities is performed. Such individual upgrades include upgrading the capacity of the OADM 1116 that is bypassed and upgrading the working fabric on the cross connect 1120 that is bypassed until upgrades have been performed for all of the working fabric and for all of the OADMs 1116. The upgrade of the protection fabric may generally be performed before, during, or after the upgrade of the OADMs 1116 and cross connect 1120.

d. Wavelength Cross Connect with Shared Add/Drop

Figure 12:
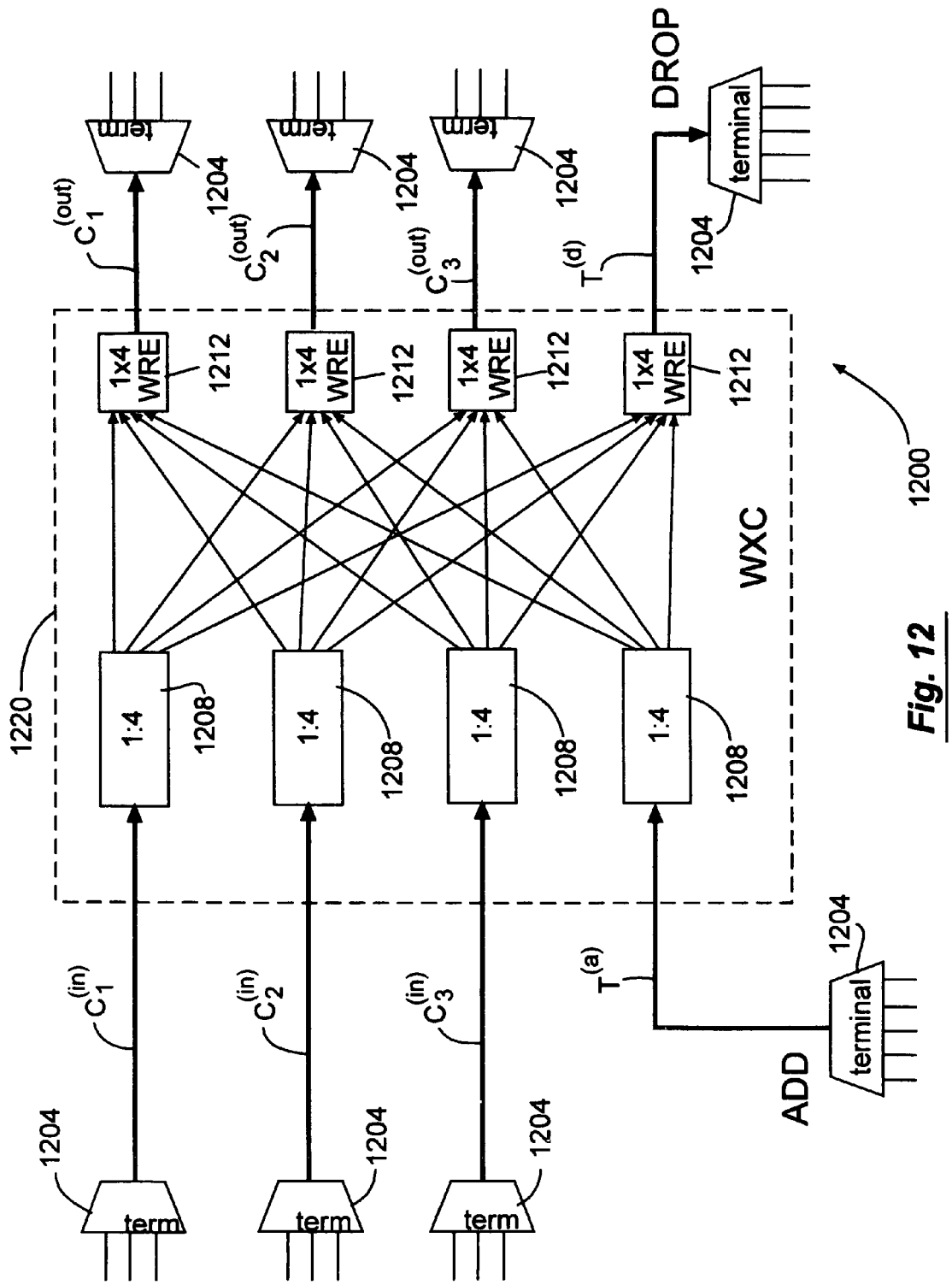
FIG. 12 provides a schematic illustration of a three-city architecture with shared add/drop capability using a broadcast-and-select wavelength cross connect.

Another embodiment for a multi-city architecture using a wavelength cross connect is shown in FIG. 12. This embodiment is similar in some respects to the embodiment described with respect to FIG. 10 in which a wavelength cross connect was used with full add/drop capability. In the embodiment shown in FIG. 12, the add/drop capability is shared. In a fashion similar to the illustrations of other embodiments above, FIG. 12 shows an architecture suitable for routing signals among three cities, signals coming from the cities being denoted $C_i^{(in)}$ and signals being directed to the cities being denoted $C_i^{(out)}$. Rather than have local add/drop terminals that may be associated with each of the cities, however, only single shared add/drop terminals are provided, with the shared add signal being denoted $T^{(a)}$ and the shared drop signal being denoted $T^{(d)}$.

The architecture 1200 functions by routing the city signals $C_i^{(in)}$ and the add signal $T^{(a)}$ from terminals 1204 to the wavelength cross connect 1220, which acts to redistribute spectral bands comprised by the signals. The resulting city signals $C_i^{(out)}$ and drop signal $T^{(d)}$ are transmitted from the wavelength cross connect 1220 and are directed to terminals 1204. In the specific embodiment shown, the wavelength cross connect 1220 is configured using a broadcast-and-select architecture, including provision for loopbacks, but this is not a requirement. Such a broadcast-and-select architecture functions by using optical couplers 1208 to provide equivalents to all of the signals input into the cross connect 1220 and using WREs 1212 to select the desired spectral bands from those equivalents for the output signals. In alternative embodiments, the wavelength cross connect may use other architectures, including those described in the Bortolini applications. It is noted that in the embodiment shown, the add and drop functions are split in that they are performed with structure on opposite sides of the cross connect. Similar to FIG. 10, the cross-connect-input signals comprise the city input signals $C_i^{(in)}$ and the shared add signal $T^{(a)}$, and the cross-connect-output signals comprise the city output signals $C_i^{(out)}$ and the shared drop signal $T^{(d)}$.

In addition, while the illustrated embodiment does not include a protection fabric, such a protection fabric may be included in alternative embodiments. An example of a protection arrangement suitable for a broadcast-and-select architecture was described above, and further examples of protection arrangements for both broadcast-and-select and other wavelength cross-connect architectures are provided in the Bortolini applications. The inclusion of a protection fabric permits upgrades to be made to the architecture 1200 to accommodate additional cities. Such upgrades may proceed similarly to those described above for other embodiments, with the protection fabric being used progressively to bypass traffic from working portions of the architecture to upgrade them individually in turn. The protection fabric itself may be upgraded before, during, or after such upgrades in the working portions.

While the illustration in FIG. 12 is for a three-city application having only a single shared add/drop terminal, such an architecture may be used more generally for any number $N_C$ of cities and any number of shared add/drop terminals $N_{A/D}$. In such instances, the wavelength cross connect 1200 will be at least an $(N_C+N_{A/D})\times(N_C+N_{A/D})$ wavelength cross connect. In the specific case where only a single shared add/drop terminal is provided, the wavelength cross connect 1200 is at least an $(N_C+1)\times(N_C+1)$ wavelength cross connect.

e. Wavelength Cross Connect with Split In-Line Add/Drop

Figure 13A:
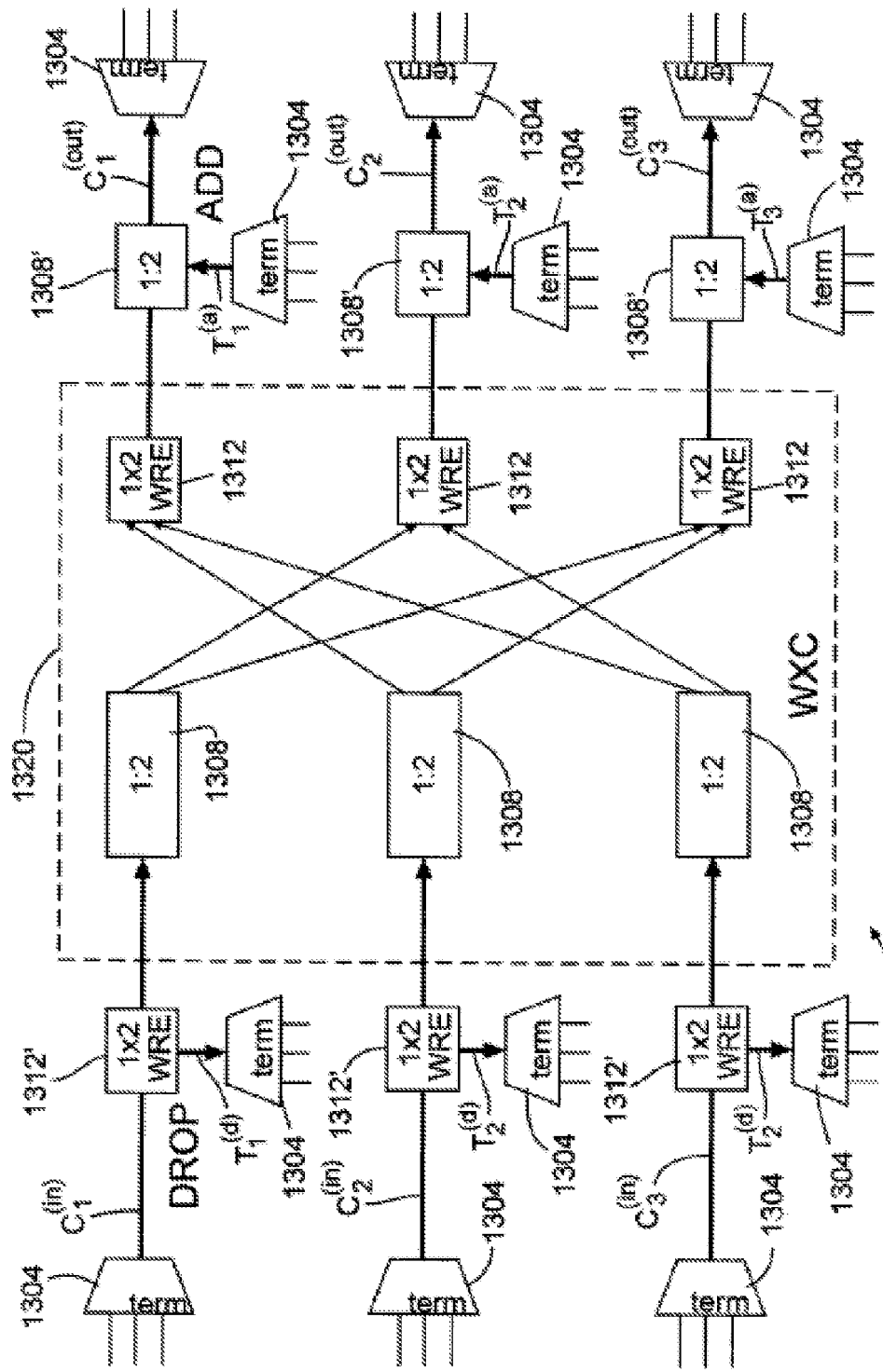
FIG. 13A provides a schematic illustration of a three-city architecture with split in-line add/drop capability using a broadcast-and-select wavelength cross connect.

A further embodiment that uses a wavelength cross connect as part of a multi-city architecture is shown in FIG. 13A. In this embodiment, the add and drop functions are performed in a manner that shares both the in-line add/drop functionality of the embodiment of FIG. 11 and the split add/drop functionality of the embodiment of FIG. 12. In particular, the architecture 1300 comprises a wavelength cross connect 1320 that is used to redistribute spectral bands. Each input of the wavelength cross connect 1320 is in optical communication with elements adapted to drop spectral-band components from the city signals $C_i^{(in)}$. In one embodiment, such elements comprise 1×2 WREs 1312'. This allows a particular city signal $C_i^{(in)}$ received from a terminal 1304 to be divided into two signals: a first signal (corresponding to a cross-connect-input signal) that includes through traffic to be directed to the wavelength cross connect 1320 and a second signal $T_i^{(d)}$ that includes the dropped spectral bands for direction to a terminal 1304. In a similar fashion, each output of the wavelength cross connect 1320 is in optical communication with elements adapted to add spectral-band components to produce city output signals $C_i^{(out)}$, which are then directed to a terminal 1304. The specific spectral bands to be added are included in the corresponding signal $T_i^{(a)}$, which may also be received from a terminal 1304. One suitable element that may be used to combine the cross-connect output signal with $T_i^{(a)}$ to form $C_i^{(out)}$ is a 1:2 optical combiner 1308'. This embodiment thus provides an example in which both the cross-connect-input signals may differ from the city input signals $C_i^{(in)}$ and the cross-connect-output signals may differ from the city output signals $C_i^{(out)}$.

In addition to the split add/drop and in-line add/drop characteristics of the embodiment shown in FIG. 13A, it acts also to illustrate that the wavelength cross connect 1320 may be configured with restrictions that prohibit loopbacks. Generally, such restrictions will embody simplifications in the structure, as shown for the no-loopback 3×3 wavelength cross connect 1320 in FIG. 13A. The simplification achieved by prohibiting loopbacks may be seen through a direct comparison of cross connect 1320 with the 3×3 cross connect 1120 shown in FIG. 11. Both cross connects are configured so that an equivalent to each input signal is directed a plurality of WREs for selection of desired spectral bands. The equivalent signals are provided in both illustrated embodiments using couplers. The principal difference between the two structures is that cross connect 1320, unlike cross connect 1120, does not include optical connections between the kth optical coupler and the kth WRE for each specific k. Thus, instead of using 1:3 optical couplers 1108 and 1×3 WREs 1112 as in FIG. 11, the desired functionality may be achieved with 1:2 optical couplers 1308 and 1×2 WREs 1312. More generally, a no-loopback N×N broadcast and select cross connect may be configured with a plurality N of 1:(N−1) optical couplers and a plurality N of 1×(N−1) WREs.

Figure 13B:
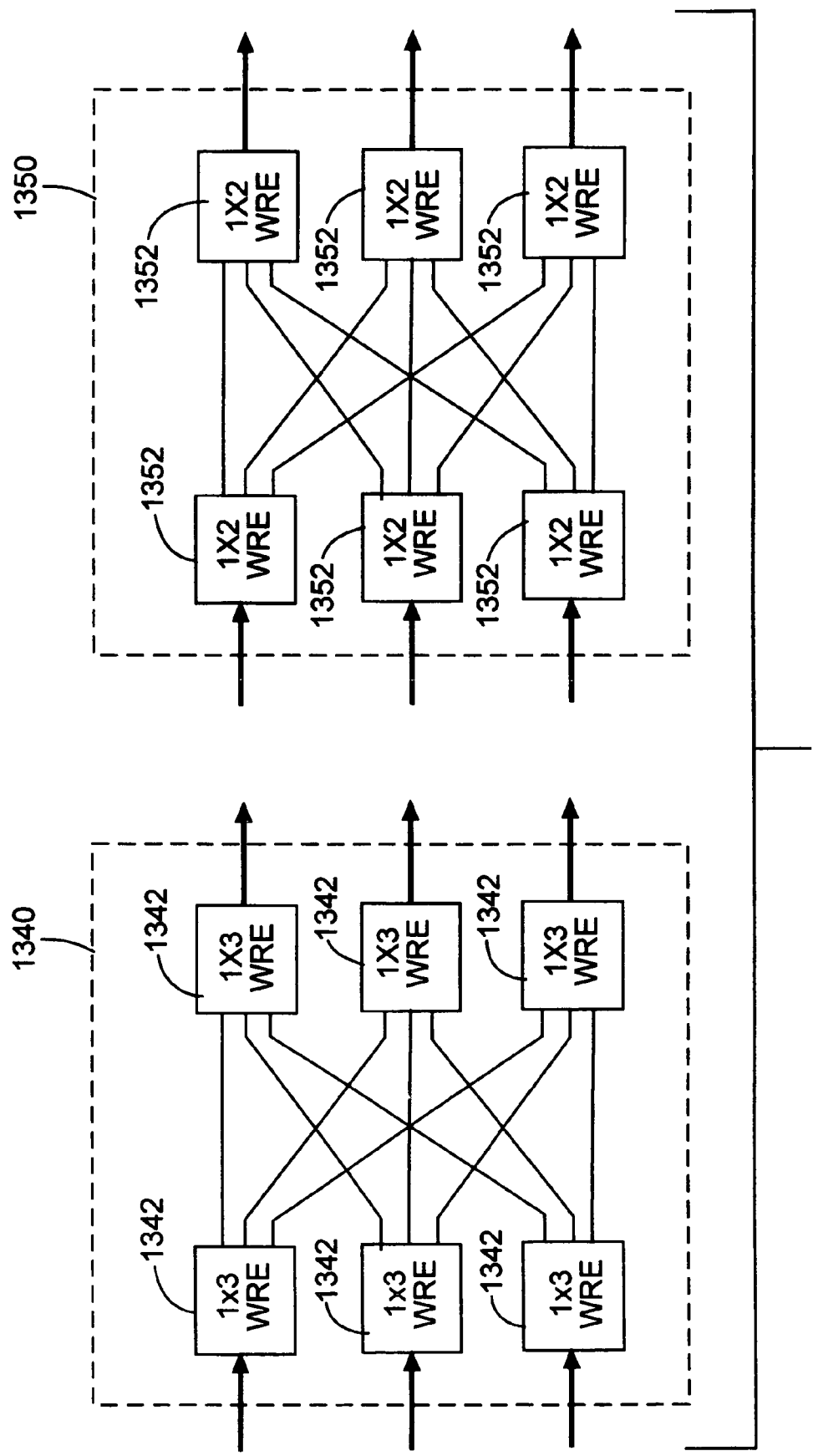
FIG. 13B provides a comparison of distribute-and-select wavelength cross connects with and without loopback capability.

While the illustration in FIG. 13A demonstrates principles of this embodiment using a broadcast-and-select architecture for the wavelength cross connect 1320, it may be alternatively be configured with other wavelength cross-connect architectures. Structural simplifications may also be realized for such alternatives when configured without loopback. For example, FIG. 13B illustrates how such simplifications may be manifested when the wavelength cross connect uses a distribute-and-select architecture, a more detailed discussion of which is provided in the Bortolini applications, including a description of suitable protection schemes. The left panel of FIG. 13B shows a 3×3 distribute-and-select cross connect 1340 that may be used in an architecture that permits loopbacks. It comprises six 1×3 WREs 1342 arranged so that each 1×3 WRE 1342 in a first set of three is in optical communication with each 1×3 WRE 1342 in a second set of three. For comparison, a 3×3 distribute-and-select cross connect 1350 that may be used in applications without loopbacks is shown in the right panel. In this instance, only 1×2 WREs 1352 are used, with each of three 1×2 WREs 1352 in a first set in optical communication with a distinct pair selected from three 1×2 WREs 1352 in a second set.

It will also be appreciated that although the embodiment shown in FIG. 13A is illustrated specifically for a three-city application, it may be used more generally in an $N_C$-city application. In such applications, the basic structure of the architecture is not significantly changed, with the add and drop functions still being performed respectively by 1:2 couplers 1308' and by 1×2 WREs 1312'. The wavelength cross connect, however, is preferably at least an $N_C \times N_C$ cross connect to accommodate $N_C$ input signals and $N_C$ output signals, but may either permit or prohibit loopbacks in different embodiments. Furthermore, while the description of FIG. 13A has focused on an embodiment in which spectral bands are dropped before encountering the wavelength cross connect and added after encountering it, this is not a requirement. The architecture may alternatively be configured so that spectral bands are added before encountering the wavelength cross connect and dropped afterwards, as evident from a relabeling $C_i^{(in)} \leftrightarrow C_i^{(out)}$ with light being propagated through the architecture in the opposite direction. Moreover, a feature that results from the in-line character of the add/drop is that embodiments are possible in which some cities have the drop (add) occurring before (after) encountering the wavelength cross connect while other cities have the drop (add) occurring after (before) such an encounter.

For clarity, the illustrated embodiment has also not explicitly shown a protection fabric, although such protection may be included in other embodiments, both for the broadcast-and-select cross-connect architecture shown in FIG. 13A and for other cross-connect architectures, examples of which are described in the Bortolini applications. The inclusion of a protection fabric permits in-service upgrades to be performed without affecting through traffic. Such upgrades proceed as previously described in connection with other embodiments, by sequentially upgrading bypassed working components and by upgrading the protection fabric before, during, or after upgrade of the working components.

f. Distribute-and-Select Architecture with Add/Drop Using OADMs

Figure 14:
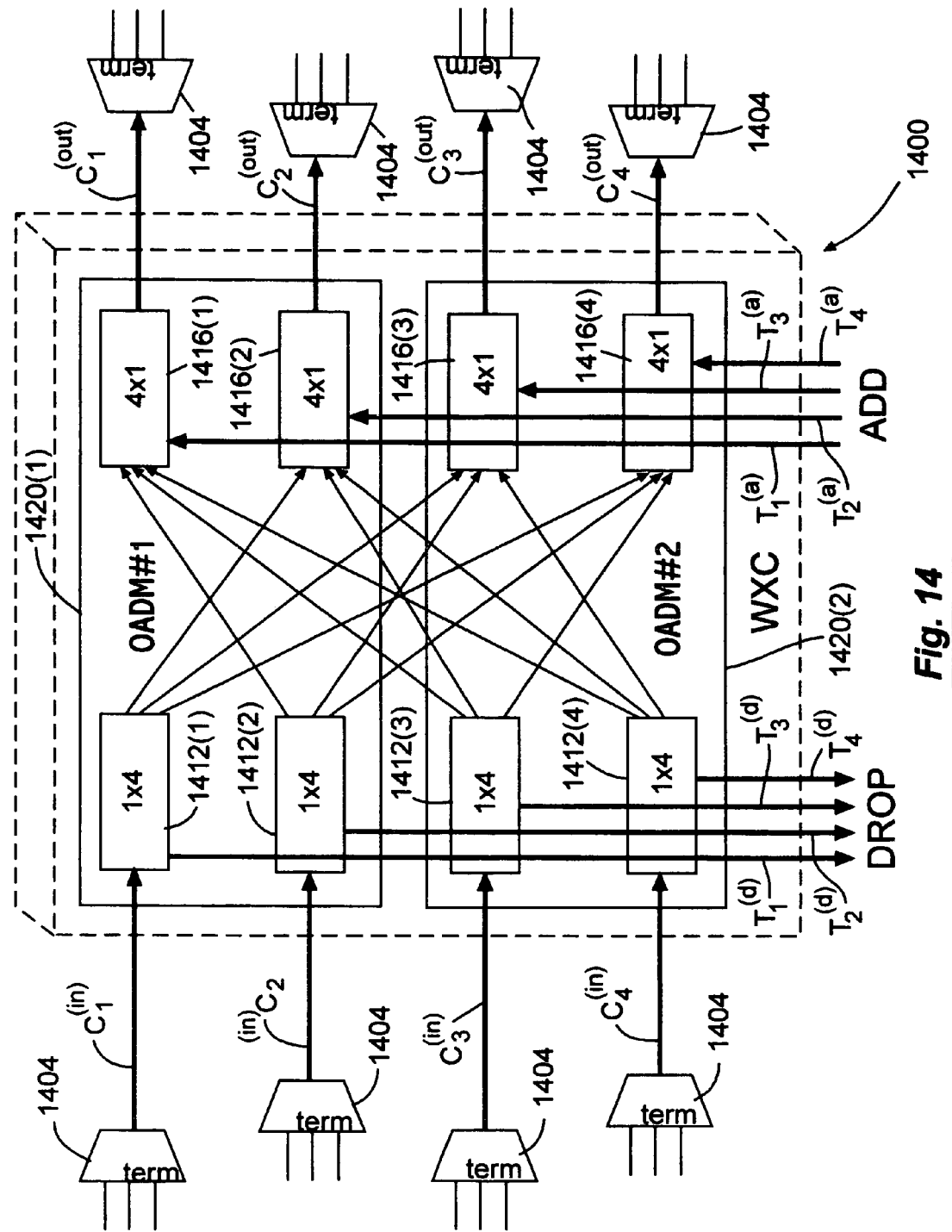
FIG. 14 provides a schematic illustration of a four-city architecture with add/drop capability that uses OADMs.

The distribute-and-select architecture shown in FIG. 13B may be configured to accommodate add/drop capability and, in some embodiments, may use structures that correspond to OADMs. An exemplary cross-connect architecture 1400 is shown in FIG. 14 that uses a distribute-and-combine arrangement without loopback. The architecture acts to exchange spectral bands among signals between terminals 1404, including input signals $C_i^{(in)}$, output signals $C_i^{(out)}$, add signals $T_i^{(a)}$, and drop signals $T_i^{(d)}$. In the illustration, the architecture is shown for an even number of cities, i.e. for four cities, to illustrate that certain components of the architecture may be viewed as component OADMs.

Each of the input signals $C_i^{(in)}$ is received by a 1×4 WRE 1412(i) and each of the output signals $C_i^{(out)}$ is transmitted from a 4×1 WRE 1416(i). Each 1×4 WRE 1412(i) distributes the spectral bands from input signal $C_i^{(in)}$ among a corresponding drop signal $T_i^{(d)}$ and to noncorresponding 4×1 WREs 1416(j≠i). Each 4×1 WRE 1416(i) similarly receives spectral bands from a corresponding add signal $T_i^{(a)}$ and from noncorresponding 1×4 WREs 1412 (j≠i). As noted in FIG. 14, combinations of pairs of 1×4 WREs 1412 and corresponding pairs of 4×1 WREs 1416 may be considered to be OADMs 1420. Thus, in alternative embodiments, the architecture may comprise a plurality of OADMs, even if such OADMs are not configured using the specific WRE arrangements shown, and still achieve the same functionality. Moreover, it is evident that the direction in which the architecture is shown as being used is not essential and it may alternatively be used in the opposite direction. Such usage corresponds to the interchange $C_i^{(in)} \leftrightarrow C_i^{(out)}$ and $T_i^{(a)} \leftrightarrow T_i^{(d)}$.

The basic architecture of FIG. 14 may be used for arbitrary numbers of cities. In terms of WREs, $N_C$ cities may be accommodated with a first plurality $N_C$ of $1 \times N_C$ WREs that receive the input signals and a second plurality $N_C$ of $N_C \times 1$ WREs that transmit the output signals. Viewed alternatively in terms of OADMs, an even number $N_C$ of cities may be accommodate with $N_C/2$ OADMs, each disposed to receive pairs of the input signals and to transmit pairs of the output signals.

Furthermore, as discussed in connection with other embodiments, the additional inclusion of a protection fabric in the architecture 1400 may permit in-service upgrades to be made to accommodate additional cities. An example of a protection fabric that may be used with a distribute-and-select architecture is provided in the Bortolini applications. The protection fabric is used to achieve such upgrades by handling traffic that is rerouted to bypass working elements as they are upgraded. The protection fabric itself is upgraded before, during, or after upgrades of the working elements.

g. Unidirectional Architecture with Shared Add/Drop

Description of further multi-city embodiments is made with respect to FIGS. 15A-17D. These further embodiments make use of OADM structures 1512, shown specifically in FIG. 15A as elementally consisting of a 1:2 coupler 1508 and a 1×2 WRE 1510, although other OADM configurations may alternatively be used. While showing the elemental structure of the OADM in a particular embodiment is helpful in discussing certain operational principles of the architecture, the more general nature of the embodiments is emphasized by labeling the add and drop ports to the OADM 1512 respectively with "A" and "D"; alternative embodiments simply substitute the particular OADM 1512 shown for illustrative purposes with another OADM configuration permitting spectral bands to be added and dropped through the "A" and "D" ports.

Figure 15A:
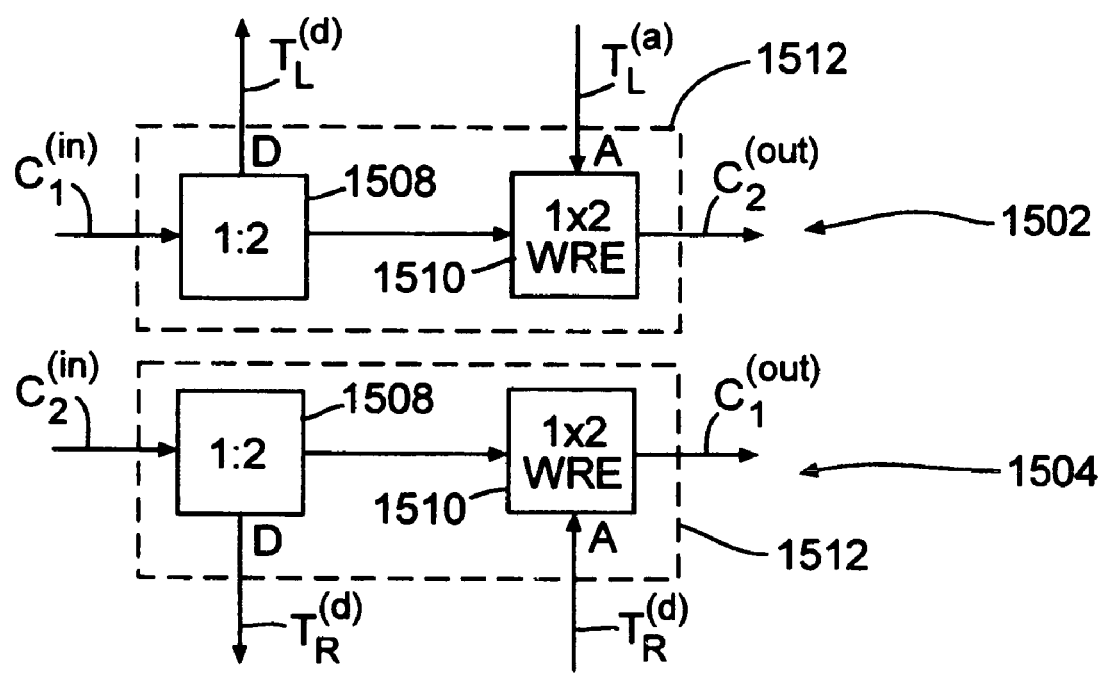
FIGS. 15A and 15B provide schematic illustrations of two- and three-city unidirectional architectures with shared add/drop capability that use OADMs.

The basic configuration shown in FIG. 15A is for a two-city connection and illustrates the unidirectional nature of the architecture. Specifically, the transmission of signals from the first city to the second city is achieved with a first unidirectional architecture 1502 and reverse transmission from the second city to the first city is achieved with a separate second unidirectional architecture 1504. Individual spectral bands may be added and/or dropped separately for each unidirectional architecture. For convenience, the first and second unidirectional architectures 1502 and 1504 are designated conventionally by "L" and "R" respectively. Thus, for the first unidirectional architecture 1502, a signal incoming from the first city $C_1^{(in)}$ may be routed as through traffic to a signal outgoing to the second city $C_2^{(out)}$. Within the first unidirectional architecture 1502, spectral bands may be dropped onto signal $T_L^{(d)}$ or may be added from signal $T_L^{(a)}$ by operation of the OADM 1512. Similarly, for the second unidirectional architecture 1504, a signal incoming from the second city $C_2^{(in)}$ may be routed as through traffic to a signal outgoing to the first city $C_1^{(in)}$. Spectral bands may be dropped onto signal $T_R^{(d)}$ and added from signal $T_R^{(a)}$ by operation of the OADM 1512 within the second unidirectional architecture.

Figure 15B:
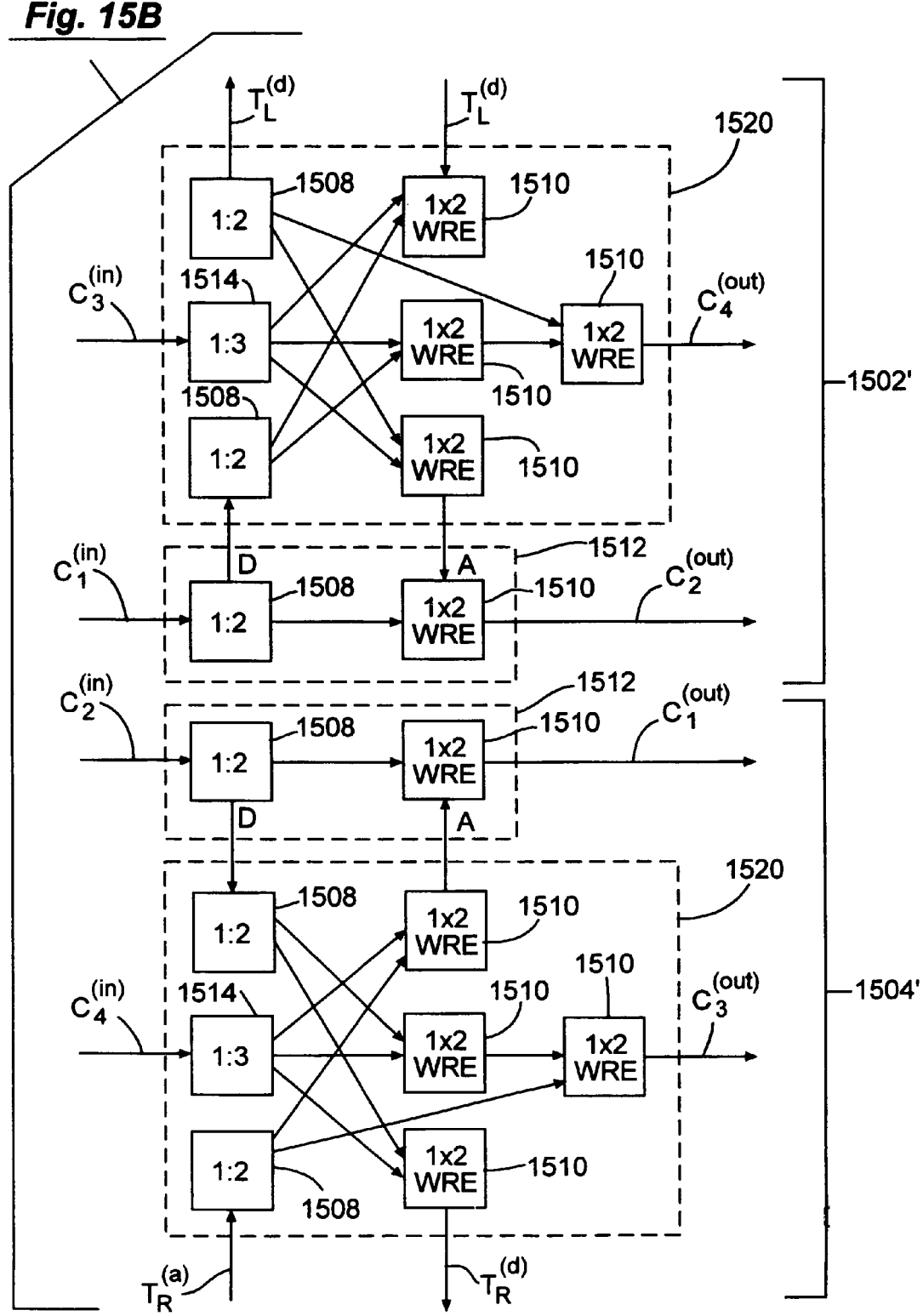

An illustration is provided in FIG. 15B for an upgrade of the architecture of FIG. 15A suitable for accommodating traffic among four cities. Because of the unidirectional nature of the individual architectures, upgrades in this embodiment typically proceed as appropriate for an even number of additional cities; if the number of cities is to be odd, the upgrade proceeds as described, but one of the city connections is not used. The upgrade from FIG. 15A to 15B is achieved by removing the add/drop links for each of the unidirectional architectures and then adding additional fabric 1520 to effectively upgrade each OADM 1512 to a wavelength cross connect comprising the additional fabric 1520 and the original OADM 1512. In the specific example shown, the additional fabric 1520 includes 1:2 couplers 1508, 1×2 WREs 1510, and a 1:3 coupler 1514.

It is straightforward to verify that with the connections indicated in FIG. 15B, the combination of the additional fabric 1520 with the OADM 1512 for each of the unidirectional architectures acts equivalently to a 3×3 cross connect with certain limitations. For the first upgraded unidirectional architecture 1502', the inputs to the 3×3 cross connect include the add signal $T_L^{(a)}$ and signals $C_1^{(in)}$ and $C_3^{(in)}$ incoming from the first and third cities respectively; the outputs include the drop signal $T_L^{(d)}$ and signals $C_2^{(out)}$ and $C_4^{(out)}$ outgoing to the second and fourth cities respectively. The 3×3 cross connect comprised by the second upgraded unidirectional architecture 1504' is similarly capable of routing wavelength components of incoming signals $T_R^{(a)}$, $C_2^{(in)}$ and $C_4^{(in)}$ to outgoing signals $T_R^{(d)}$, $C_1^{(out)}$, and $C_3^{(out)}$.

It is noted that by combining two unidirectional architectures in this way, there are still certain city connections that are prohibited. If the cities are organized into two nonintersecting sets {i} and {j} so that $C_{\{i\}}^{(in)} \rightarrow C_{\{j\}}^{(out)}$ with the first unidirectional architecture and $C_{\{j\}}^{(in)} \rightarrow C_{\{i\}}^{(out)}$ for the second architecture, then transmission among cities within either of the sets {i} and {j} is prohibited. Of course, this constraint may be overcome in embodiments where the sets {i} and {j} overlap and/or more than two unidirectional architectures are used with different organizations of the cities.

Figure 16:
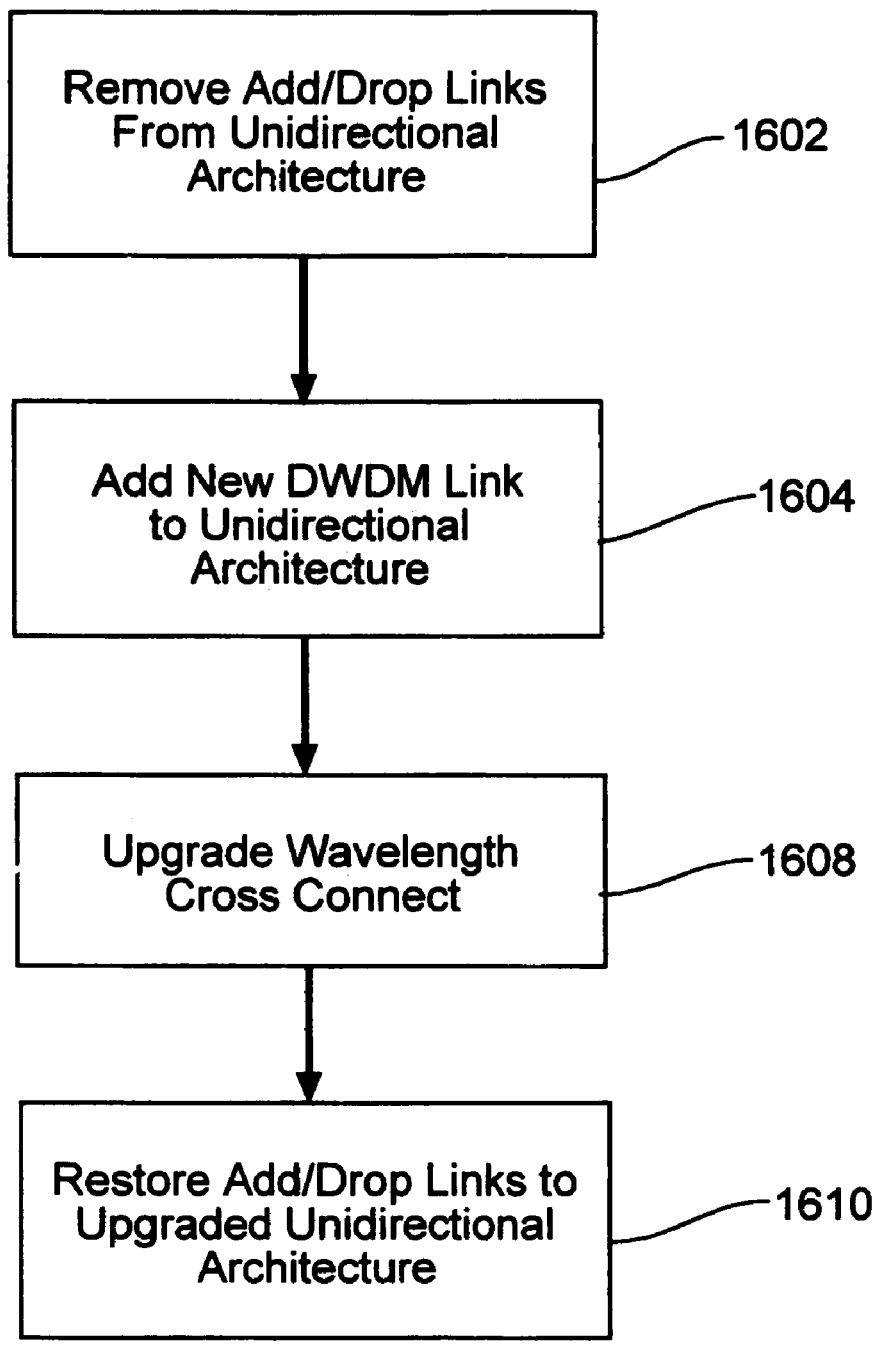
FIG. 16 is a flow diagram summarizing embodiments of methods for performing upgrades of multi-city unidirectional architectures.

The embodiments shown in FIGS. 15A and 15B are examples of configurations in which an upgrade is achieved by routing signals for additional cities through a fabric that is comprised by a wavelength cross connect. Such a fabric need not necessarily comprise an OADM structure. Improved signal partitioning may be achieved by adding the further constraint that city pairs (say (1,2), (3,4), (5,6), . . . ) have their through traffic exchanged between dedicated DWDM links, such as may be provided with OADMs. FIG. 16 summarizes with a flow diagram an embodiment of a method that may be used to upgrade unidirectional architectures that satisfy this additional constraint without affecting the through traffic for the various city pairings. At block 1602, the add and drop links are removed from the unidirectional architecture. A new DWDM link is added to the unidirectional architecture at block 1604 to accommodate the new cities; in one embodiment, such a DWDM link comprises an OADM. At block 1608, a wavelength cross connect that interconnects the dedicated DWDM links is upgraded to accommodate the added DWDM links. It will be evident that because the links between city pairs are dedicated, this may be done without affecting the through traffic. Finally, at block 1610, the add and drop links are restored to the upgraded unidirectional architecture.

Figure 17A:
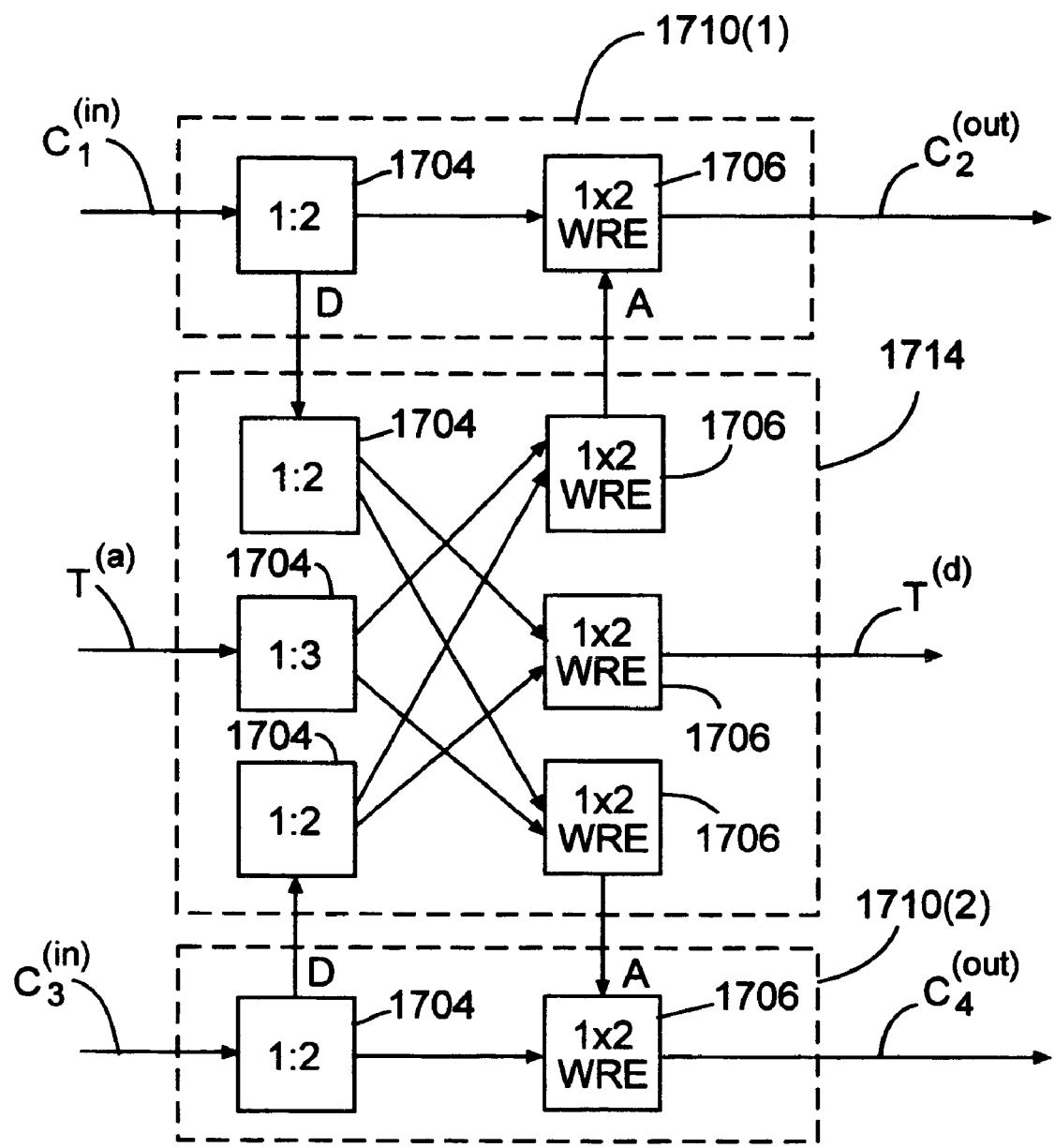
FIGS. 17A-17D provide schematic illustrations of intermediate stages in an upgrade from a two-city to a three-city unidirectional architecture with shared add/drop capability using OADMs.

FIGS. 17A-17D provide an example of an upgrade of a unidirectional architecture from four cities to six cities using the method summarized in FIG. 16. For simplicity, only a single unidirectional architecture is shown, it being understood that generally at least another unidirectional architecture will be provided to transmit signals in the reverse directions. FIG. 17A shows a unidirectional architecture for four cities in which spectral bands from incoming signals $C_1^{(in)}$ and $C_3^{(in)}$ may be routed to outgoing signals $C_2^{(out)}$ and $C_4^{(out)}$. Dedicated DWDM links, shown as OADMs 1710 having a 1:2 coupler 1704 and a 1×2 WRE 1706, are provided between $C_1^{(in)}$ and $C_2^{(out)}$ and between $C_3^{(in)}$ and $C_4^{(out)}$.

The individual dedicated DWDM links are connected with a no-loopback 3×3 wavelength cross connect 1714. The no-loopback aspect of the cross connect 1714 does not affect the performance of the architecture since the loopback configurations correspond to those already accommodated by the dedicated DWDM links. The inputs to the cross connect 1714 are the add signal $T^{(a)}$, which is shared for the unidirectional architecture, and equivalents of $C_1^{(in)}$ and $C_3^{(in)}$ provided by the drop ports of the respective OADMs 1710. The outputs of the drop ports are the drop signal $T^{(d)}$ and signals that are provided to the add ports of each of the OADMs 1710. The architecture for the wavelength cross connect 1714 is shown as a broadcast and select architecture but other architectures may be used in alternative embodiments.

Figure 17B:
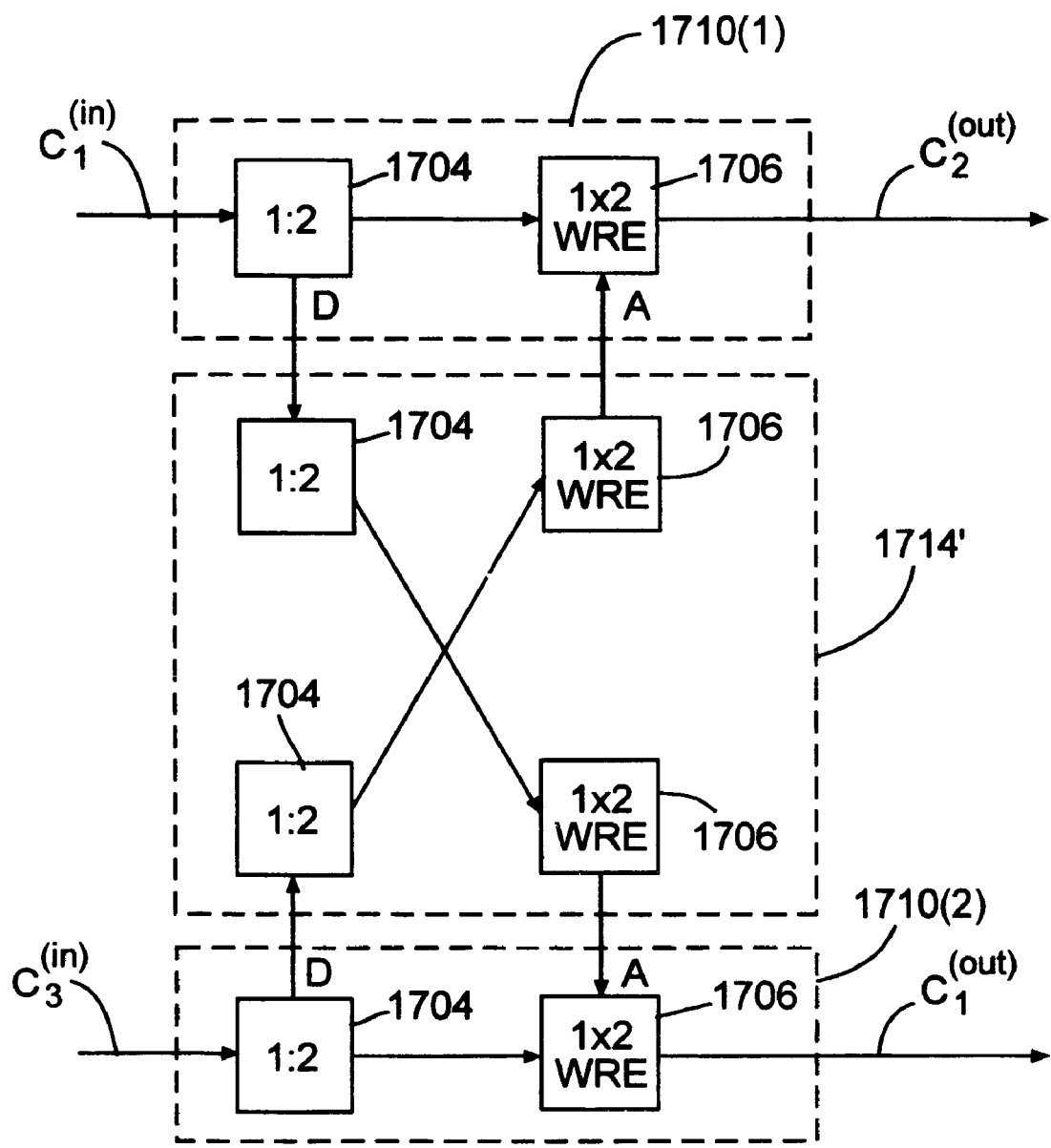
Figure 17C:
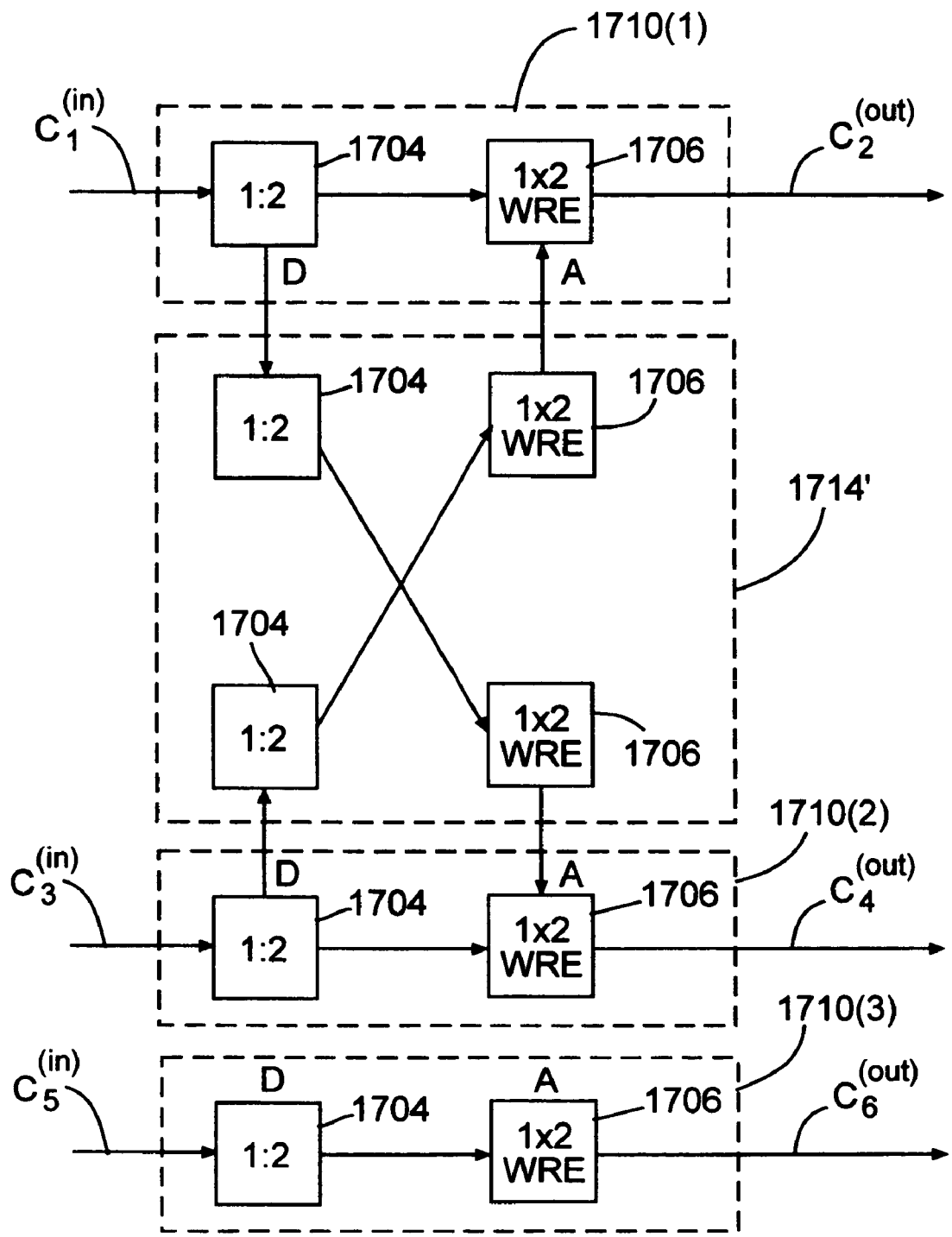

After removing the add and drop links in accordance with block 1602 of FIG. 16, the architecture appears as in FIG. 17B. One of the 1:2 couplers 1704 and one of the 1×2 WREs 1706 that were used for adding or dropping spectral bands have been removed to produce a modified wavelength cross connect 1714'. The modified wavelength cross connect 1714' retains the functionality for transmitting spectral bands as desired among the four cities. FIG. 17C simply illustrates the effect on the unidirectional architecture of adding the additional DWDM link in accordance with block 1604 of FIG. 16. This DWDM link comprises a new OADM 1710(3) that is used for through traffic from $C_5^{(in)}$ to $C_6^{(out)}$.

Figure 17D:
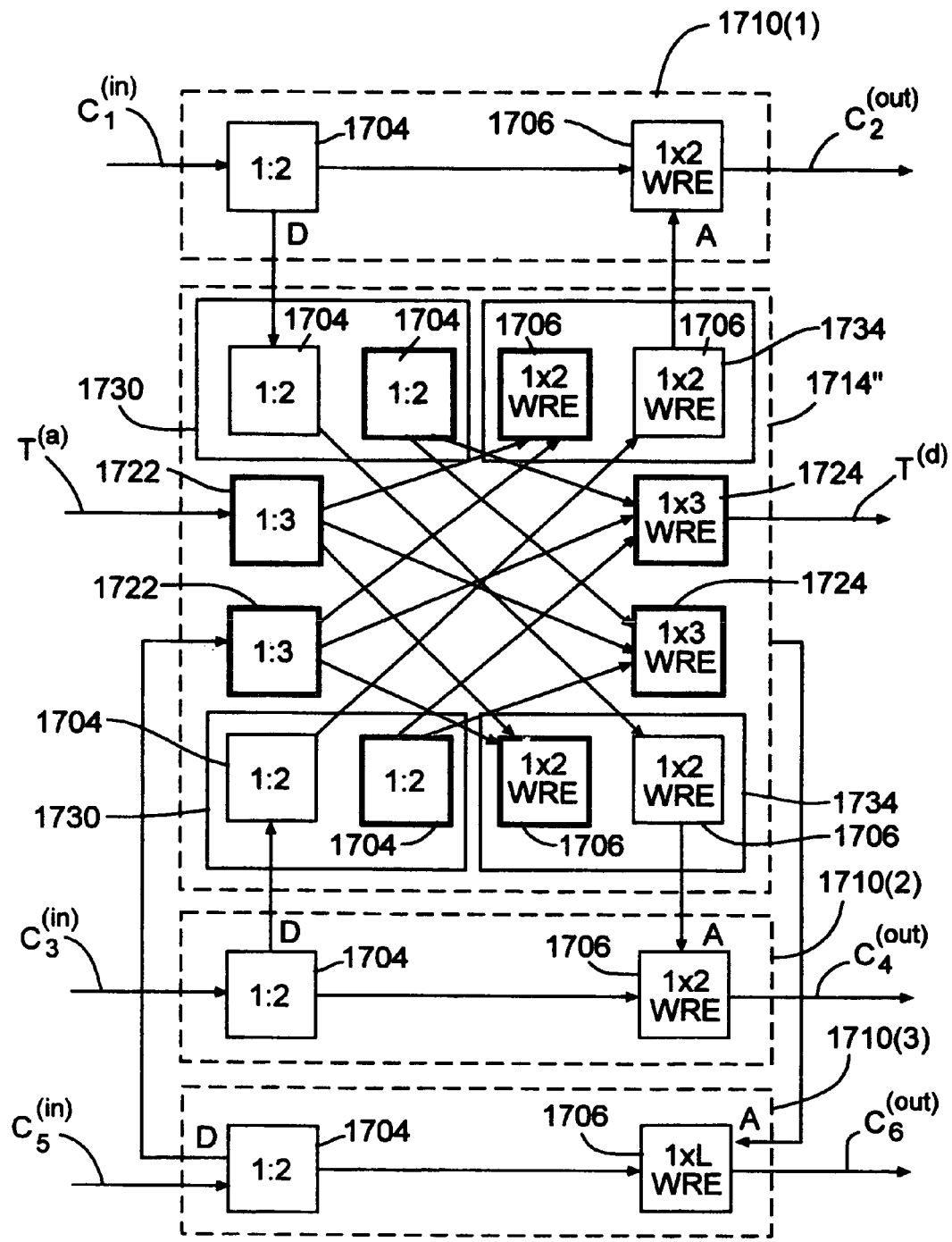

From the architecture shown in FIG. 17C, it is possible to upgrade the wavelength cross connect 1714' to a no-loopback 4×4 wavelength cross connect 1714", shown in FIG. 17D, without interfering with existing traffic. This is done by adding additional components to the cross connect, the additional components being shown in bold in the figure for convenience only. Once the additional components have been added, links are added with the new OADM 1710(3) and restored with the add and drop links in accordance with block 1610 of FIG. 16. In most embodiments, the type of architecture used for the upgraded wavelength cross connect will be the same as the architecture used for the non-upgraded cross connect.

Thus, in the illustration, the no-loopback 4×4 wavelength cross connect 1714" is configured using a broadcast-and-select architecture so that each incoming signal encounters a 1:3 coupler and each outgoing signal is transmitted from a 1×3 WRE. In instances where these structures directly interact only with the add/drop signals or with the new-city signals, they may be added directly. Examples of such structures include the 1:3 optical couplers 1722 and 1×3 WREs 1724 shown in bold—these 1:3 optical couplers 1722 will receive the add signal $T^{(a)}$ and an equivalent to the input signal from the added city $C_5^{(in)}$, and these 1×3 WRE 1724 will propagate the drop signal $T^{(d)}$ and a signal back to the new OADM 1710(3) to be used in producing the output signal to the added city $C_6^{(out)}$. These elements may, of course, be configured as single components or may comprise multiple components that exchange light. In instances where the cross-connect structures do interact with the previous signals, they may be structured in composite form to avoid interfering with those previous signals. Examples of such structures include the 1:3 optical couplers 1730, which receive signals form the previous OADMs 1710(1) and 1710(2), and the 1×3 WREs 1734 that provide signals back to the previous OADMs 1710(1) and 1710(2). In these instances, the structures are formed by increasing the capacity of the structures that were included in the non-upgraded cross connect: the capacity of a 1:2 combiner 1704 is increased by connecting it in a cascade arrangement with a second 1:2 combiner 1704 to produce a 1:3 combiner 1730; similarly, the capacity of a 1×2 WRE 1706 is increased by connecting it in a cascade arrangement with a second 1×2 WRE 1706 to produce a 1×3 WRE 1734. This cascaded arrangement for the 1×3 WRE 1714 corresponds to the upper-left-most architecture shown in FIG. 6A.

This method may be continued to upgrade the architecture further to accommodate additional city signals. In particular, it is generally possible to upgrade the capacity of the wavelength cross connect by adding additional components and, in particular, by using cascade arrangements of couplers and WREs to produce the desired upgraded components.

h. Distribute and Combine with OADM Cascading

Figure 18A:
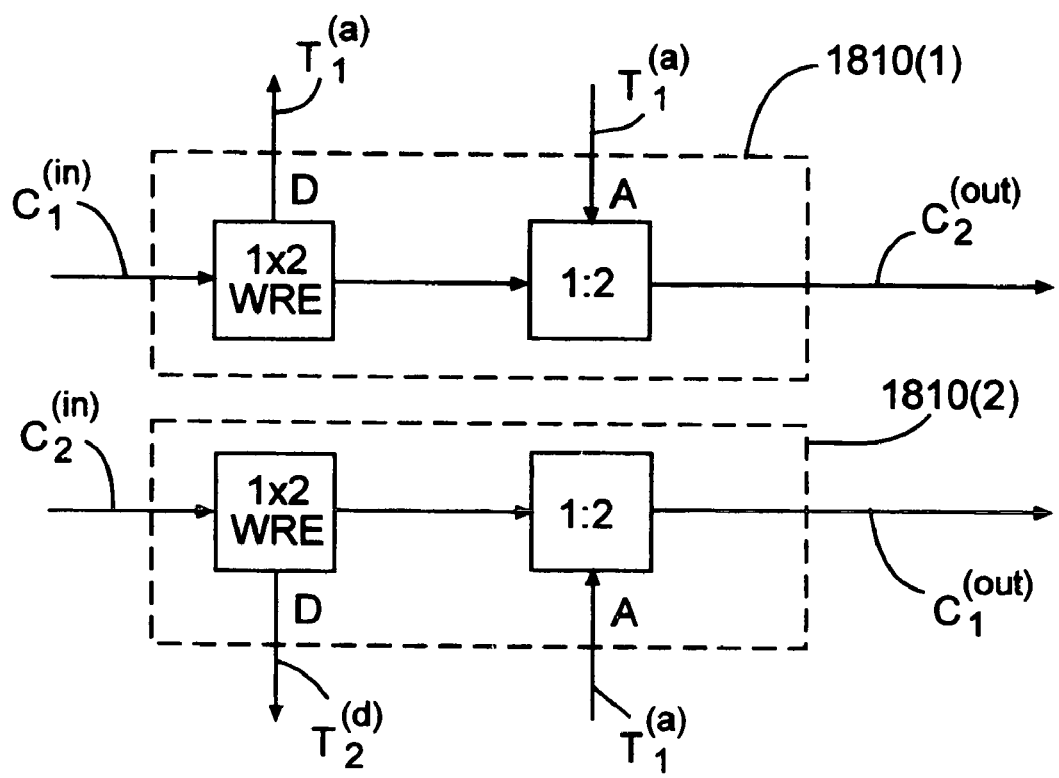
FIGS. 18A-18E provide schematic illustrations of intermediate stages in an upgrade from a two-city to a three-city no-loopback distribute-and-combine architecture with full add/drop capability using an OADM arrangement.
Figure 18B:
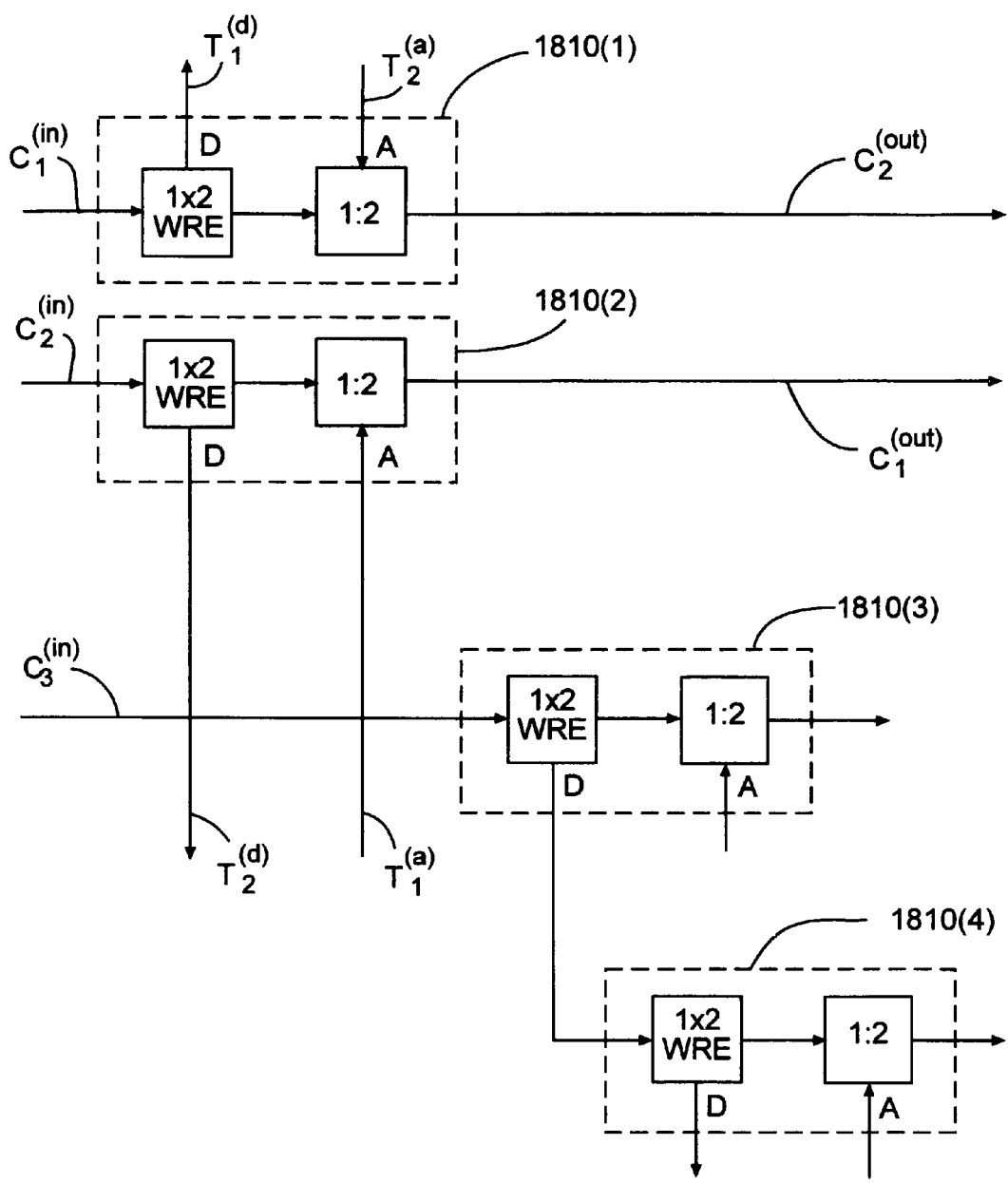
Figure 18C:
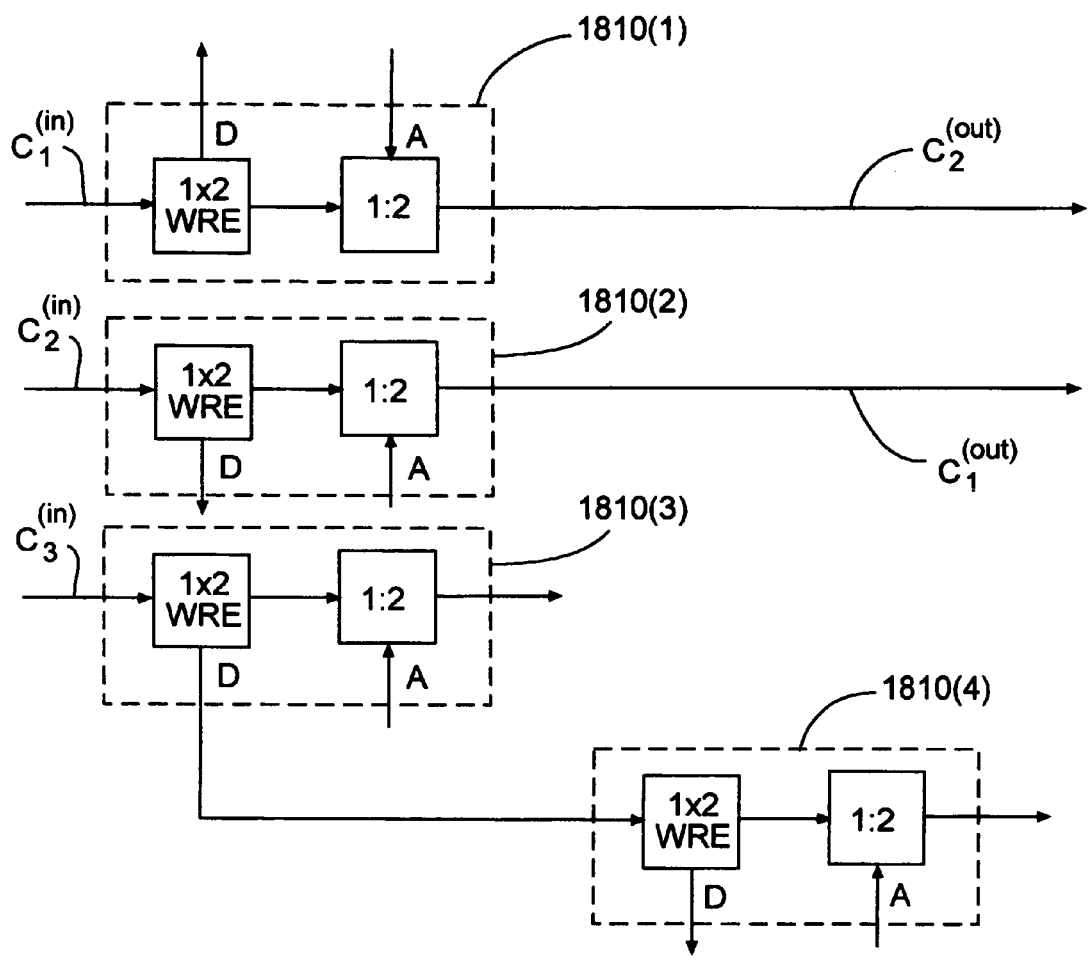

FIGS. 18A-18E are used to illustrate another set of multicity embodiments that use OADM structures, but permit full add/drop capability rather than using shared add/drop capacity. These embodiments are illustrated by showing how they may be used to perform a multi-city upgrade, with the illustration focusing initially on an upgrade from a two-city application to a three-city application. The two-city application shown in FIG. 18A is very similar to the application shown in FIG. 15A and uses a pair of OADMs 1810 to direct traffic between two cities. To emphasize the point made previously that the architectures illustrated herein may be used in either direction, the architecture shown in FIG. 18A directs light in the opposite direction through the OADMs 1810 than in the illustration of FIG. 15A. For example, while the OADMs in both figures are shown as consisting of a 1:2 coupler and a 1×2 WRE, FIG. 18A shows the input signals $C_i^{(in)}$ being received at the 1×2 WRE end of the OADM 1810 and the output signals $C_i^{(out)}$ being transmitted from the 1:2 coupler end of the OADM 1810. Also, to emphasize the full add/drop nature of the embodiments to be discussed, the add and drop signals $T_i^{(a)}$ and $T_i^{(d)}$ are labeled with indices i that correspond to the city indices rather than with the shared "L" and "R" indices used in FIG. 15A.

Applications that accommodate more than two cities sometimes use embodiments in which OADM structures are cascaded for each of the incoming city connections. Such cascading is effectively used to distribute the spectral bands (in a similar manner in which such bands are distributed in the distribute-and-select architectures described in the Bortolini applications) so that they may subsequently be combined to form the desired output signals. Thus, in FIG. 18B, a pair of cascaded OADMs 1810(3) and 1810(4) is added to accommodate the new third-city input signal $C_3^{(in)}$. The OADMs are cascaded so that the drop port of the first OADM 1810(3) is in optical communication with the second OADM 1810(4). The OADMs are displaced on the page merely for convenience in representing the signal connections; such displacements have no physical significance.

Links to the add and drop signals $T_i^{(a)}$ and $T_i^{(d)}$ are disconnected to produce the intermediate architecture shown in FIG.

Figure 18D:
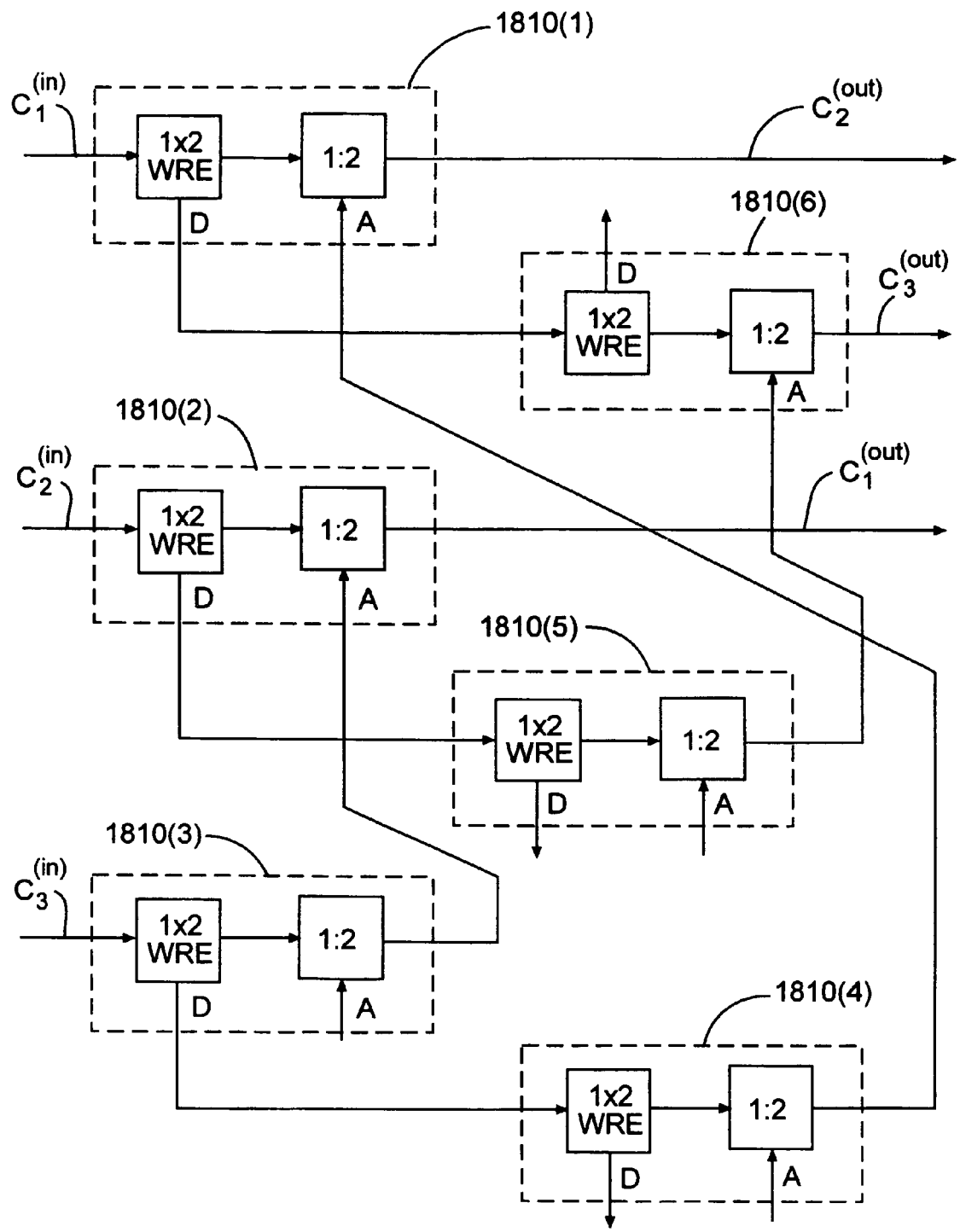

18C. This permits the add and drop ports of the original OADMs 1810(1) and 1810(2) to be placed in optical communication with other OADMs. In particular, as shown in FIG. 18D, the drop ports for each of the original OADMs 1810(1) and 1810(2) are placed in communication with new OADMs 1810(5) and 1810(6) in a cascaded arrangement. As a result, each input optical signal may be associated with a cascaded OADM structure. The add ports for the original OADMs 1810(1) and 1810(2) each receive one of the outputs from the new OADMs 1810(3) and 1810(4) so that spectral bands included on $C_3^{(in)}$ may be included on $C_1^{(out)}$ and $C_2^{(out)}$ if desired. In addition, the output of a first of the new OADMs cascaded with the original OADMs is placed in optical communication with the add port of the second; the new city output $C_3^{(out)}$ is transmitted from the output of that second OADM. Specifically, in the illustration, the output of OADM 1810(5) is placed in optical communication with the add port of OADM 1810(6) and $C_3^{(out)}$ is transmitted from the output of OADM 1810(6); alternatively, however, the output of OADM 1810(6) could be placed in optical communication with the add port of OADM 1810(5), with $C_3^{(out)}$ being transmitted from the output of OADM 1810(5).

Figure 18E:
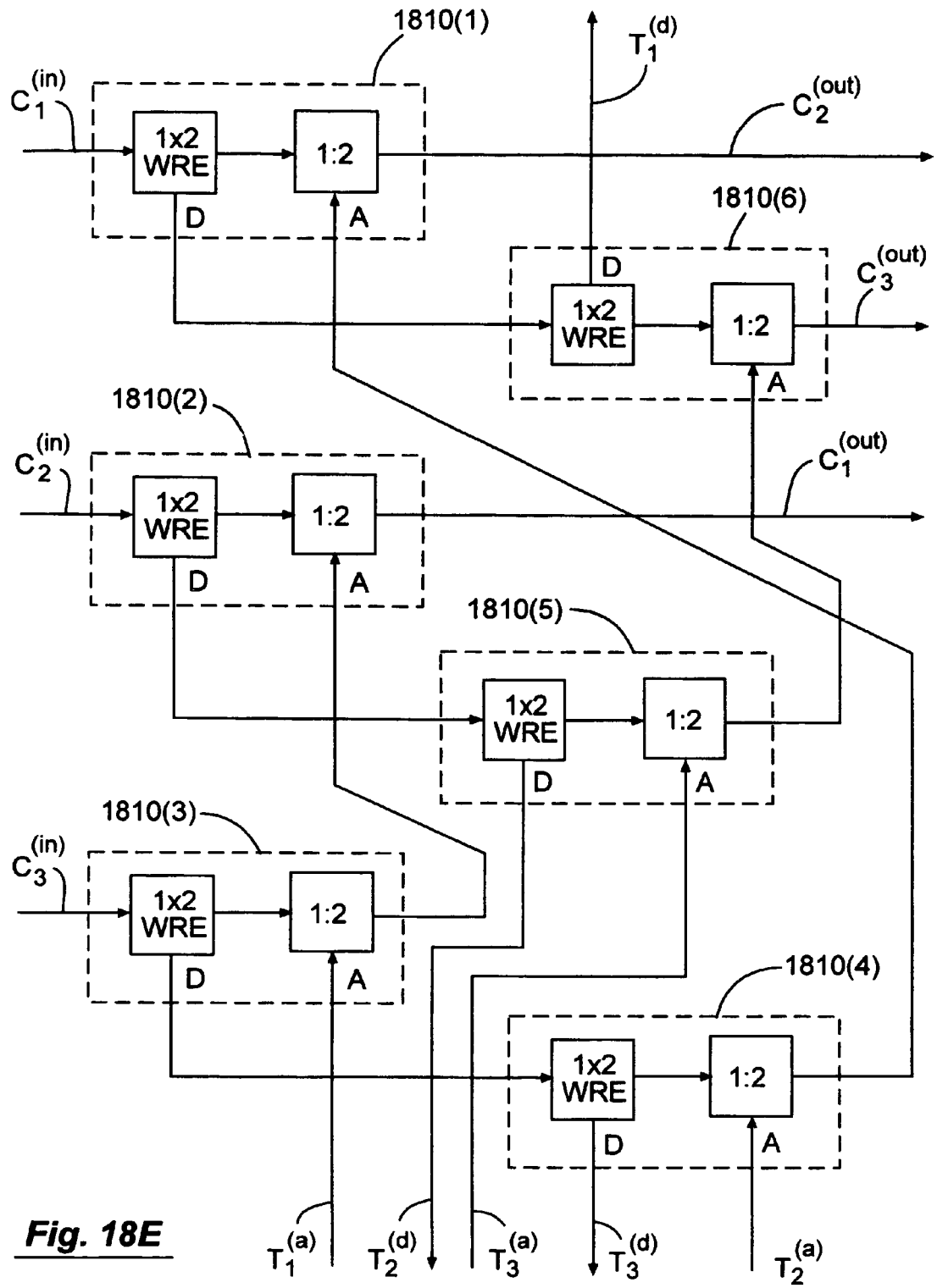

The upgrade may be completed by restoring connections for the add and drop signals as shown in FIG. 18E. One OADM in each of the OADM structures associated with each of the input signals has a drop port that may be put in optical communication with the associated drop signal: thus, the drop port of OADM 1810(6), which is part of the cascaded OADM structure associated with $C_1^{(in)}$, is put in optical communication with $T_1^{(d)}$; the drop port of OADM 1810(5), which is part of the cascaded OADM structure associated with $C_2^{(in)}$, is put in optical communication with $T_2^{(d)}$; and the drop port of OADM 1810(4), which is part of the cascaded OADM structure associated with $C_3^{(in)}$, is put in optical communication with $T_3^{(d)}$. In addition, as a result of following the method outlined, a number of OADMs have open add ports for connection with the add signals. Each such add port is in communication, perhaps through other OADMs, with a corresponding city output signal $C_i^{(out)}$. Thus, the add port of OADM 1810(3), which communicates with $C_1^{(out)}$ through OADM 1810(2), is put in optical communication with $T_1^{(a)}$; the add port of OADM 1810(4), which communicates with $C_2^{(out)}$ through OADM 1810(1), is put in optical communication with $T_2^{(a)}$; and the add port of OADM 1810(5), which communicates with $C_3^{(out)}$ through OADM 1810(6), is put in optical communication with $T_3^{(a)}$.

The resulting structure of the three-city application shown in FIG. 18E permits certain observations regarding the distribute and combine architecture that is implemented by such embodiments and make clear how the architecture may be adopted more generally for $N_C$-city applications. The distribute and combine architecture is evident by examining the components of the OADMs 1810, namely the 1×2 WREs and 1:2 optical couplers. Ignoring the overlaid OADM structure of the architecture, each city input signal $C_i^{(in)}$ in the three-city application encounters a cascaded arrangement of 1×2 WREs that act effectively as 1×3 WREs. The action of such effective 1×3 WREs on the three city input signals is to distribute their spectral bands among nine intermediate signals. Three of the nine intermediate signals, one originating from each of the three city input signals $C_i^{(in)}$, are used as the drop signals $T_i^{(d)}$. The spectral bands from the remaining six intermediate signals are combined in pairs with corresponding add signals by the arrangement of optical couplers to provide the city output signals $C_i^{(out)}$. It is straightforward to verify from FIG. 18E that the optical coupler arrangement results in each $C_i^{(out)}$ comprising spectral bands from all $C_{j(\neq i)}^{(in)}$ and from $T_i^{(a)}$, i.e. $C_1^{(out)}$ may include spectral bands from $C_2^{(in)}$, $C_3^{(in)}$, and $T_1^{(a)}$; $C_2^{(out)}$ may include spectral bands from $C_1^{(in)}$, $C_3^{(in)}$, and $T_2^{(a)}$; and $C_3^{(out)}$ may include spectral bands from $C_1^{(in)}$, $C_2^{(in)}$, and $T_3^{(a)}$. As such, the distribute and combine architecture shown in the illustrated embodiment does not provide for loopbacks to the same city.

The same principles for a distribute and combine architecture apply for an arbitrary number of cities $N_C$ in the application. Each of the $N_C$ city input signals $C_i^{(in)}$ is distributed among $N_C$ intermediate signals with a 1×$N_C$ WRE to produce a total of $N_C^2$ intermediate signals. Of these, $N_C$ are dropped as signals $T_i^{(d)}$. Each city output signal $C_i^{(out)}$ is produced by using 1:$N_C$ optical couplers to combine optical components from a corresponding add signal $T_i^{(a)}$ and noncorresponding city input signals $C_{j(\neq i)}^{(in)}$. In some embodiments, particularly those for which upgrades are contemplated, the 1×$N_C$ WREs are configured as a set of cascaded 1×2 WREs and the 1:$N_C$ optical couplers are configured as a set of cascaded 1:2 optical couplers.

Figure 19A:
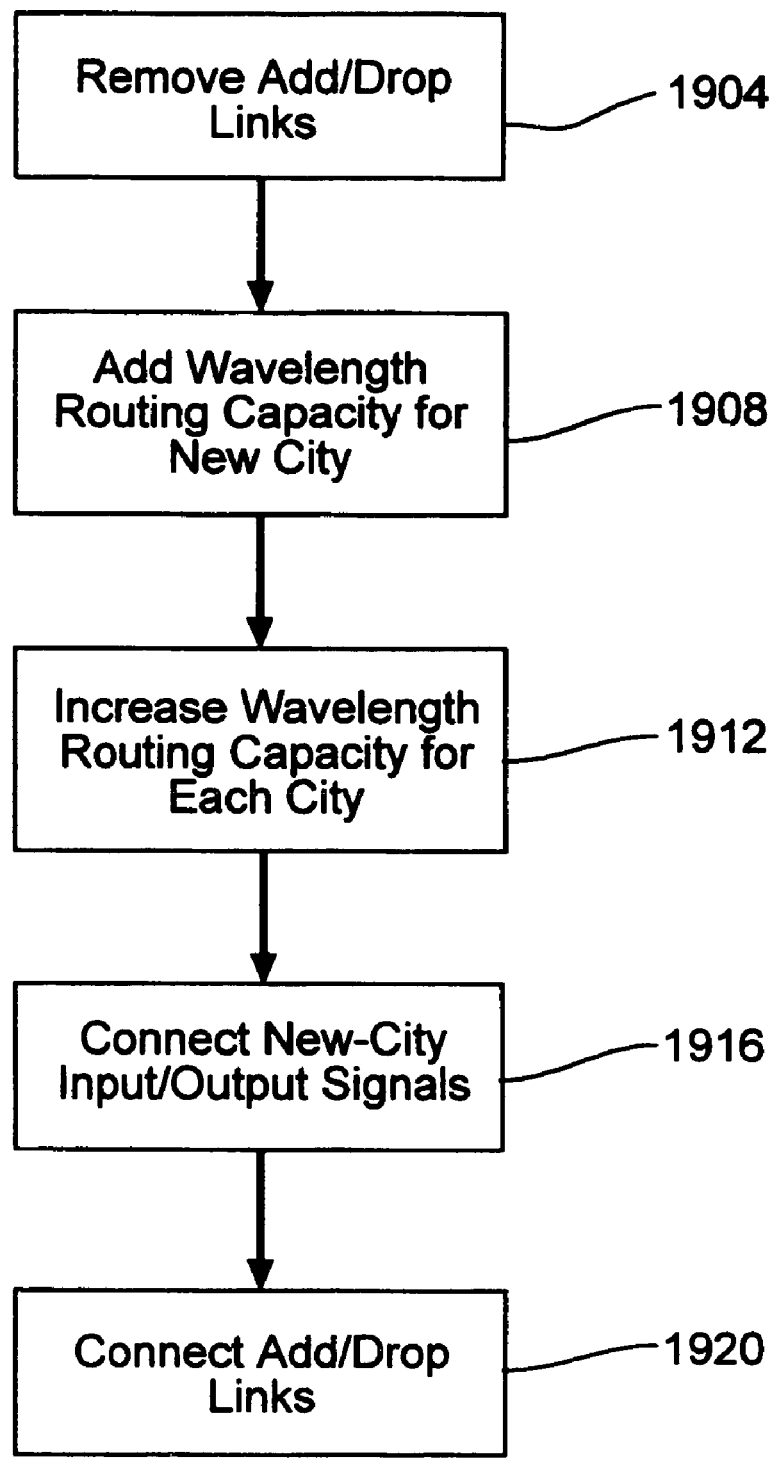
FIGS. 19A and 19B are flow diagrams summarizing embodiments of methods for performing upgrades of multi-city distribute-and-combine architectures.
Figure 19B:
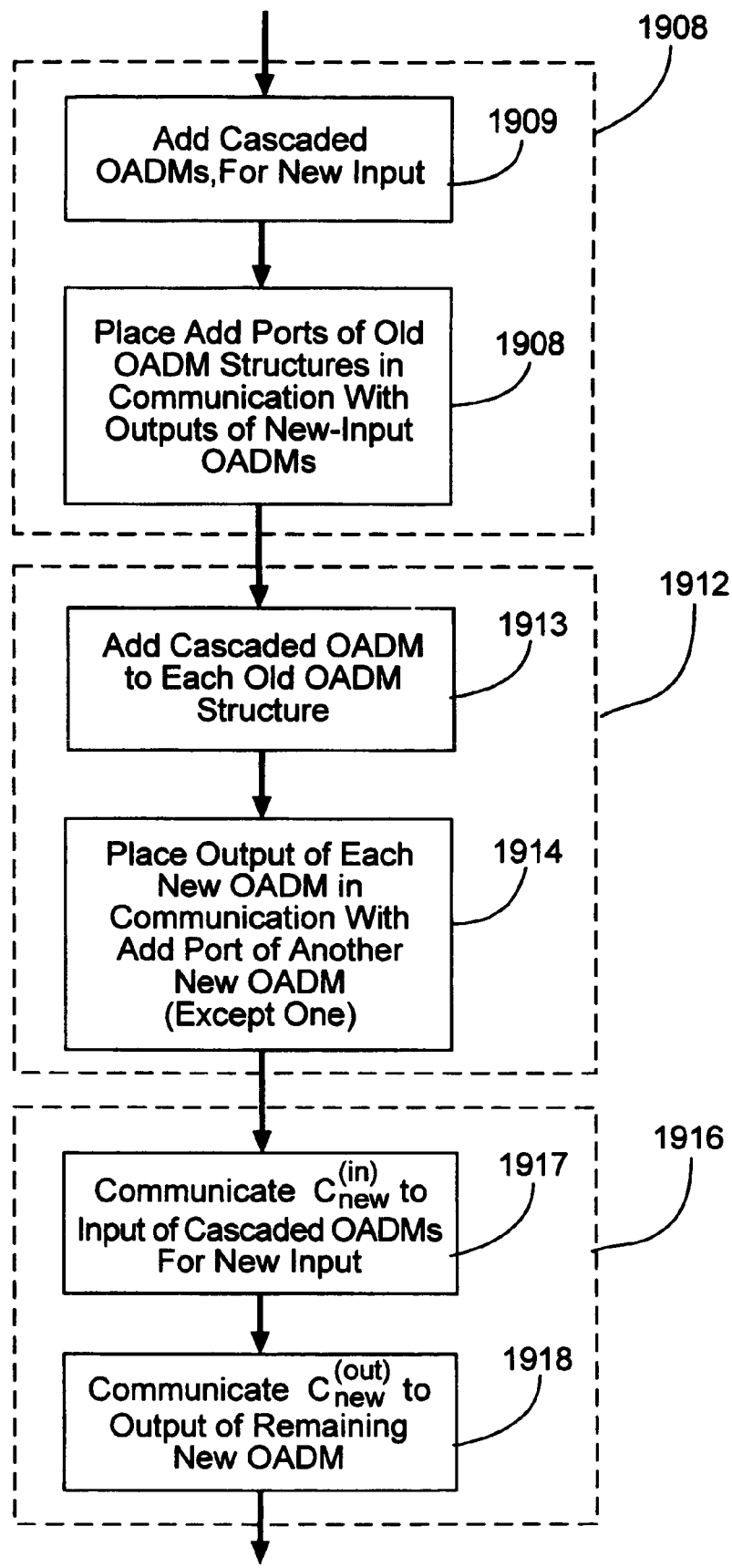

An embodiment for upgrading such a distribute and combine architecture with full add/drop capability to accommodate an additional city in the application is shown with the flow diagram in FIG. 19A. At block 1904, the add and drop links are removed from the architecture. Additional wavelength routing capacity to accommodate the new city is added at block 1908. Such additional wavelength routing capacity may be added with cascaded WREs, particularly for embodiments in which still further upgrades are contemplated. At block 1912, the wavelength routing capacity associated with each of the existing cities is increased. In one embodiment, the wavelength routing capacity is provided by cascaded WREs so that increasing the wavelength routing capacity comprises adding an additional WRE to the cascade. At block 1916, the input and output signals for the new city $C_{new}^{(in)}$ and $C_{new}^{(out)}$ are connected and at block 1920 the add and drop The method used to upgrade from two cities to three as shown in FIGS. 18A-18E may also be used to upgrade from three cities to four, and progressively to larger city architectures. In some embodiments, such upgrades may be simplified by using cascaded arrangements for both the component WREs and optical couplers as described above. In other embodiments, the method uses cascaded OADMs as shown in FIGS. 18A-18E; in cases where the OADMs consist comprise a 1×2 WRE and a 1:2 optical coupler, the use of cascaded OADMs may be equivalent to the use of cascaded component WREs and optical couplers. FIG. 19B thus illustrates an embodiment that may be viewed as a special case of the embodiments illustrated in FIG. 19A, and in which cascaded OADMs are used to achieve the distribute and combine architecture.

In FIG. 19B, the addition of wavelength routing capacity at block 1908 is achieved by adding an arrangement of cascaded OADMs for the new-city input at block 1909. Generally, the arrangement of cascaded OADMs will include at least $N_C-1$ OADMs. The add ports of the old OADM structures are then placed in optical communication with the outputs of the new OADMs at block 1910. Since the add links were dropped at block 1904 in FIG. 19A, each of the old cascaded arrangements of OADMs will have an open add port that was previously in optical communication with one of those links; thus, each output from the new OADMs will generally be connected with a free add port available in each of the old cascaded arrangements. The increase in wavelength routing capacity for each city provided at block 1912 is achieved by adding an additional cascaded OADM to each of the old OADM structures at block 1912. At block 1914, these new OADMs are interconnected optically. This may be done, for example, by placing the output of each of the new OADMs in optical communication with an add port of another of the new OADMs, leaving one of the outputs of the new OADMs free to accommodate connection with the city output signal for the new city $C_{new}^{(out)}$. Placing the new-city input and output signals $C_{new}^{(in)}$ and $C_{new}^{(out)}$ in optical communication with the upgraded architecture is performed respectively at blocks 1917 and 1918. The new-city input signal $C_{new}^{(in)}$ is placed in optical communication with the input of the new arrangement of cascaded OADMs and the new-city output signal $C_{new}^{(out)}$ is placed in optical communication with the remaining output of the new OADMs.

Having described several embodiments, it will be recognized by those of skill in the art that various modifications, alternative constructions, and equivalents may be used without departing from the spirit of the invention. In particular, a number of examples have been provided illustrating discrete principles. Alternative embodiments may include elements in arrangements that use multiple of those principles. Accordingly, the above description should not be taken as limiting the scope of the invention, which is defined in the following claims.

What is claimed is:

1. A method for routing optical traffic, the method comprising:
   distributing with a configurable wavelength link architecture spectral bands received on a first plurality of input optical signals among a first plurality of output optical signals, wherein the configurable wavelength link architecture comprises a first plurality of wavelength routing elements, each such wavelength routing element adapted for receiving an input optical signal comprising a plurality of subsets of spectral bands, selectively routing the subsets of spectral bands between a first optical signal and different ones of a plurality of second optical signals according to a configurable state of such wavelength routing element, wherein a mapping of the spectral bands comprised by the first plurality of input optical signals to the first plurality of output optical signals is determined by the states of the first plurality of wavelength routing elements; and
   upgrading a capacity of the configurable wavelength link architecture to distribute spectral bands received from a second plurality of input optical signals among a second plurality of output optical signals,
   wherein:
   each such input optical signal is received from one of a plurality of separated optical transmission systems and a corresponding output optical signal is directed to such one of the plurality of separated optical transmission systems;
   the second plurality of input optical signals includes the first plurality of input optical signals; and
   the second plurality of output optical signals includes the first plurality of output optical signals.

2. The method recited in claim 1 wherein such upgrading is performed without disrupting distribution of the spectral bands received on the first plurality of input optical signals among the first plurality of output optical signals.

3. The method recited in claim 1 further comprising distributing with the configurable wavelength link architecture the spectral bands received on the second plurality of input optical signals among the second plurality of output optical signals.

4. The method recited in claim 1 wherein the configurable wavelength link architecture comprises a wavelength cross connect.

5. The method recited in claim 1 wherein the configurable wavelength link architecture includes a protection fabric.

6. The method recited in claim 5 wherein upgrading the capacity of the configurable wavelength link architecture comprises:
   sequentially bypassing each of a plurality of working fabrics of the configurable wavelength link architecture onto the protection fabric and upgrading the bypassed working fabric;
   upgrading the protection fabric; and
   adding additional working fabric to the configurable wavelength link architecture.

7. The method recited in claim 1 wherein the configurable wavelength link architecture further comprises a plurality of optical couplers each disposed to intercept one of the first plurality of input optical signals and to transmit an equivalent of such one of the first plurality of input optical signals to each of the first plurality of wavelength routing elements, wherein each of the first plurality of wavelength routing elements is disposed to receive equivalents corresponding to each of the first plurality of input optical signals and to transmit the respective one of the first plurality of output optical signals depending on the state of such wavelength routing element.

8. The method recited in claim 1 wherein no spectral band received from any one of the separated optical transmission systems is routed back to that separated optical transmission system.

9. The method recited in claim 1 wherein the configurable wavelength link architecture further comprises a second plurality of wavelength routing elements disposed to transmit the first plurality of output optical signals, wherein outputs of each of the first plurality of wavelength routing elements are in optical communication with an input to at least one of the second plurality of wavelength routing elements.

10. The method recited in claim 9 wherein no spectral band received from any one of the separated optical transmission systems is routed back to that optical transmission system.

11. The method recited in claim 9 wherein pairs of the first plurality of wavelength routing elements and pairs of the second plurality of wavelength routing elements are provided by optical add/drop multiplexers.

12. The method recited in claim 1 wherein the configurable wavelength link architecture comprises a plurality of optical add/drop multiplexers, each of which is disposed to receive a pair of the input optical signals and to transmit a pair of the output optical signals.

13. The method recited in claim 1 further comprising distributing with the configurable wavelength link architecture at least one spectral band received on at least one add signal among at least one of the output optical signals.

14. The method recited in claim 13 further comprising distributing with the configurable wavelength link architecture at least one spectral band received on at least one of the input optical signals onto at least one drop signal.

15. The method recited in claim 14 wherein the at least one add signal comprises a plurality of add signals and the at least one drop signal comprises a plurality of drop signals.

16. The method recited in claim 15 wherein each add signal is associated with a respective one of the plurality of separated optical transmission systems and each drop signal is associated with a respective one of the plurality of separated optical transmission systems.

17. The method recited in claim 16 wherein the configurable wavelength link architecture further comprises a plurality of optical add/drop multiplexers, each disposed to exchange spectral bands between the input optical signal received from a respective one of the separated optical transmission systems and the add signal and drop signal associated with the respective one of the separated optical transmission systems.

18. The method recited in claim 16 wherein, for each respective one of the plurality of separated optical transmission systems, spectral bands from the input optical signal received from such each respective one of the plurality of separated optical transmission systems are dropped directly onto the drop signal associated with such each respective one of the plurality of separated optical transmission systems and spectral bands from the add signal associated with such each respective one of the plurality of separated optical transmission systems are added directly to the output optical signal directed to such each respective one of the plurality of separated optical transmission system.

19. The method recited in claim 16 wherein, for each respective one of the plurality of separated optical transmission systems, the drop signal associated with such each one of the plurality of separated optical transmission systems comprises an equivalent to the input optical signal received from such each respective one of the plurality of separated optical transmission systems.

20. The method recited in claim 19 wherein the output optical signal directed to such each respective one of the plurality of separated optical transmission systems comprises spectral bands selected from the add signal associated with such each respective one of the plurality separated optical transmission systems and from equivalents to input optical signals received from separated optical transmission systems other than such each respective one of the plurality of optical transmission systems.

21. The method recited in claim 14 wherein the at least one drop signal comprises spectral bands selected from the first plurality of input optical signals.

22. The method recited in claim 21 wherein the configurable wavelength link architecture is configured to permit each output optical signal to include spectral bands selected from the at least one add signal.

23. The method recited in claim 1 wherein the configurable wavelength link architecture comprises a first plurality of optical add/drop multiplexers.

24. The method recited in claim 23 wherein upgrading the capacity of the configurable wavelength link architecture comprises adding an optical wavelength cross connect in optical communication with add and drop ports on at least one of the first plurality of optical add/drop multiplexers.

25. The method recited in claim 23 wherein upgrading the capacity of the configurable wavelength link architecture comprises:
removing links to add and drop signals from the configurable wavelength link architecture;
adding wavelength routing capacity to the configurable wavelength link architecture to accommodate at least one additional separated optical transmission system;
increasing wavelength routing capacity for each of the plurality of separated optical transmission systems;
connecting input and output optical signals for the at least one additional separated optical transmission system to the configurable wavelength link architecture; and
restoring links to the add and drop signals from the configurable wavelength link architecture.

26. The method recited in claim 25 wherein adding wavelength routing capacity to the configurable wavelength link architecture comprises:
adding a second plurality of optical add/drop multiplexers in a cascaded arrangement to the configurable wavelength link architecture; and placing add ports of the first plurality of optical add/drop multiplexers in optical communication with outputs of the second plurality of optical add/drop multiplexers.

27. The method recited in claim 25 wherein increasing wavelength routing capacity for each of the plurality of separated optical transmission systems comprises:
adding a second plurality of optical add/drop multiplexers to the configurable wavelength link architecture, wherein each of the second plurality of optical add/drop multiplexers is added in a cascaded arrangement with one of the first plurality of optical add/drop multiplexers; and
placing outputs of the second plurality of optical add/drop multiplexers in optical communication with add ports of the second plurality of optical add/drop multiplexers.

28. The method recited in claim 1 wherein the configurable wavelength link architecture is configured so that spectral bands on input optical signals received from a subset of the plurality of separated optical transmission systems may not be included on output optical signals directed to a separated optical transmission system within the subset.

29. The method recited in claim 28 wherein the configurable wavelength link architecture comprises a plurality of DWDM links optically interconnected with a wavelength cross connect.

30. The method recited in claim 29 wherein upgrading the capacity of the configurable wavelength link architecture comprises:
removing links to add and drop signals from the configurable wavelength link architecture;
adding at least one additional DWDM link;
upgrading the capacity of the wavelength cross connect; and
restoring links to the add and drop signals from the configurable wavelength link architecture.

31. The method recited in claim 30 wherein the plurality of DWDM links comprise a plurality of optical add/drop multiplexers.

32. A wavelength link architecture for distributing spectral bands received on a plurality of input optical signals among a plurality of output optical signals, wherein each such input optical signal is received from one of a plurality of separated optical transmission systems and a corresponding output optical signal is directed to such one of the plurality of separated optical transmission systems, the wavelength link architecture comprising:
an optical wavelength cross connect having a plurality of input ports, a plurality of output ports, and a first plurality of wavelength routing elements, each such wavelength routing element adapted for receiving input optical signals, each comprising a subset of wavelength components, selectively routing the subsets of wavelength components to a first optical signal from different ones of a plurality of second optical signals according to a configurable state of each such wavelength routing element,
wherein:
the optical wavelength cross connect is adapted to receive cross-connect-input optical signals at the input ports and to transmit cross-connect-output optical signals from the output ports;
the optical wavelength cross connect further comprises a plurality of optical couplers each disposed to couple one of the cross-connect-input optical signals with a plurality of equivalents of such one of the cross-connect-input optical signals, wherein the first optical signal for each of the first plurality of wavelength routing elements corresponds to one of the cross-connect-output optical signals and the second optical signals for such each of the first plurality of wavelength routing elements correspond to equivalents of each of the cross- connect-input optical signals; and a mapping of the spectral bands comprised by the plurality of input optical signals to the plurality of output optical signals is determined by the states of the first plurality of wavelength routing elements.

33. The wavelength link architecture recited in claim 32 wherein the optical wavelength cross connect further has a protection fabric.

34. The wavelength link architecture recited in claim 32 wherein the optical wavelength cross connect is adapted so that no spectral band received from any one of the separated optical transmission systems is routed back to that separated optical transmission system.

35. The wavelength link architecture recited in claim 32 wherein the optical wavelength cross connect further comprises a second plurality of wavelength routing elements disposed to transmit the cross-connect-output optical signals, wherein outputs of the first plurality of wavelength routing elements are in optical communication with an input to at least one of the second plurality of wavelength routing elements.

36. The wavelength link architecture recited in claim 35 wherein the optical wavelength cross connect is adapted so that no spectral band received from any one of the separated optical transmission systems is routed back to that separated optical transmission system.

37. The wavelength link architecture recited in claim 35 wherein pairs of the first plurality of wavelength routing elements and pairs of the second plurality of wavelength routing elements are provided by optical add/drop multiplexers.

38. The wavelength link architecture recited in claim 32 wherein the optical wavelength cross connect includes a plurality of optical add/drop multiplexers, each of which is disposed to receive a pair of the input optical signals and to transmit a pair of the output optical signals.

39. The wavelength link architecture recited in claim 32 further comprising at least one add optical connection adapted to add at least one spectral band from at least one add signal to at least one of the cross-connect-input signals.

40. The wavelength link architecture recited in claim 39 further comprises at least one drop optical connection adapted to distribute at least one spectral band from at least one of the plurality of input optical signals onto a drop signal.

41. The wavelength link architecture recited in claim 40 wherein the at least one add signal comprises a plurality of add signals and the at least one drop signal comprises a plurality of drop signals.

42. The wavelength link architecture recited in claim 41 wherein each add signal and each drop signal is associated with one of the plurality of separated optical transmission systems.

43. The wavelength link architecture recited in claim 42 further comprising a plurality of add/drop multiplexers, each disposed to exchange spectral bands between the input optical signal received from a respective one of the separated optical transmission systems and the add signal and drop signal associated with the respective one of the separated optical transmission systems.

44. The wavelength link architecture recited in claim 42 further comprising:

a plurality of drop wavelength routing elements each associated with one of the separated optical transmission systems and disposed to drop spectral bands from the input optical signal received from such one of the separated optical transmission systems onto the drop signals associated with such one of the separated optical transmission systems; and a plurality of add optical couplers each associated with one of the separated optical transmission systems and disposed to add spectral bands from the add signal associated with such one of the separated optical transmission systems onto the output optical signal transmitted to such one of the separated optical transmission systems.

45. The wavelength link architecture recited in claim 40 wherein the at least one add signal corresponds to at least one of the cross-connect-input optical signals and the at least one drop signal corresponds to at least one of the cross-connect-output optical signals.

46. The wavelength link architecture recited in claim 32 further comprising a plurality of DWDM links optically interconnected with the optical wavelength cross connect.

47. The wavelength link architecture recited in claim 46 wherein the plurality of DWDM links comprise a plurality of optical add/drop multiplexers.

48. The wavelength link architecture recited in claim 47 wherein an add port of at least one of the plurality of optical add/drop multiplexers is in optical communication with one of the cross-connect-output optical signals and a drop port of the at least one of the plurality of optical add/drop multiplexers is in optical communication with one of the cross-connect-input optical signals.

49. The wavelength link architecture recited in claim 48 wherein at least one of the plurality of input optical signals corresponds to one of the cross-connect-input optical signals and at least one of the plurality of output optical signals corresponds to one of the cross-connect-output optical signals.

50. The wavelength link architecture recited in claim 48 wherein at least one of the plurality of input optical signals is in optical communication with an input port of the at least one of the plurality of optical add/drop multiplexers and at least one of the plurality of output optical signals is in optical communication with an output port of the at least one of the plurality of optical add/drop multiplexers.

51. The wavelength link architecture recited in claim 47 wherein:

each of the input optical signals is in optical communication with an input port of one of the optical add/drop multiplexers;

each of the output optical signals is in optical communication with an output port of one of the optical add/drop multiplexers;

an add port of each of the optical add/drop multiplexers is in optical communication with one of the cross-connect-output optical signals; and a drop port of each of the optical add/drop multiplexers is in optical communication with one of the cross-connect-input optical signals.

52. A wavelength link architecture comprising:

a plurality of optical couplers, wherein each of the plurality of optical couplers is adapted to receive an input optical signal from one of a plurality of separated optical transmission systems, and each of the plurality of optical couplers reproduces a plurality of output optical signals equivalent to the input optical signal received from the one of the plurality of separated optical transmission systems; and a plurality of wavelength routing elements, each such wavelength routing element adapted for receiving input optical signals, each comprising a subset of wavelength components, selectively routing the subsets of wavelength components to a first optical signal from different ones of a plurality of second optical signals according to a configurable state of such wavelength routing element, wherein the wavelength routing elements are in optical communication with the optical couplers and each wavelength routing element receives at least one of the plurality of output optical signals from at least one the optical couplers.

53. The wavelength link architecture recited in claim 52 wherein at least one of the output optical signals includes spectral bands selected from at least one of the input optical signals and from an add signal.

54. The wavelength link architecture recited in claim 52 wherein at least one of the output optical signals is transmitted as a drop signal.

55. The wavelength link architecture recited in claim 52 wherein:
   a first output optical signal is transmitted as a drop signal and a second output optical signal is exchanged with at least one of the wavelength routing elements; and
   each of the wavelength routing elements is disposed to receive an add signal associated with the output optical signal corresponding to the first optical signal for such each of the wavelength routing elements.

56. The wavelength link architecture recited in claim 52 wherein, for each of the separated optical transmission systems, the input optical signal from such separated optical transmission system has no wavelength component in common with the output optical signal transmitted to such separated optical transmission system.

57. A wavelength link architecture for distributing spectral bands received on a plurality of input optical signals among a plurality of output optical signals, wherein each such input optical signal is received from one of a plurality of separated optical transmission systems and a corresponding output optical signal is directed to such one of the plurality of separated optical transmission systems, the wavelength link architecture comprising:
   means for receiving the plurality of input optical signals;
   means for transmitting the plurality of output optical signals; and cross-connect means for selectively routing wavelength components between a plurality of cross-connect-input optical signals and a plurality of cross-connect-output optical signals, wherein the cross-connect means comprises a first plurality of wavelength routing means, each such wavelength routing means adapted for receiving input optical signals, each comprising a subset of wavelength components, selectively routing the subsets of wavelength components to a first optical signal from different ones of a plurality of second optical signals according to a configurable state of such wavelength routing means,
   wherein:
   the cross-connect means is in optical communication with the means for receiving the plurality of input optical signals and the means for transmitting the plurality of output optical signals;
   the cross-connect means further comprises a plurality of optical coupling means each disposed to couple one of the cross-connect-input optical signals with a plurality of equivalents to such one of the cross-connect-input optical signals, wherein the first optical signal for each of the first plurality of wavelength routing elements corresponds to one of the cross-connect-output optical signals and the second optical signals for such each of the first plurality of wavelength routing means correspond to equivalents to each of the cross-connect-input optical signals; and
   a mapping of the spectral bands comprised by the plurality of input optical signals to the plurality of output optical signals is determined by states of the first plurality of wavelength routing means.

58. The wavelength link architecture recited in claim 57 wherein the cross-connect means further comprises a second plurality of wavelength routing means disposed to transmit the cross-connect-output optical signals, wherein outputs of the first plurality of wavelength routing means are in optical communication with an input to at least one of the second plurality of wavelength routing means.

59. The wavelength link architecture recited in claim 57 further comprising means for distributing at least one spectral band from at least one of the plurality of input optical signals onto a drop signal.

60. The wavelength link architecture recited in claim 57 further comprising means for adding at least one spectral band from at least one add signal to at least one of the cross-connect-input optical signals.

61. The wavelength link architecture recited in claim 57 further comprising a plurality of means for exchanging spectral bands between one of the input optical signals and a drop signal and add signal associated with the separated optical transmission system from which the one of the input optical signals is received.

62. The wavelength link architecture recited in claim 57 further comprising:
   a plurality of drop wavelength routing means for dropping spectral bands from one of the input optical signals onto a drop signal associated with the separated optical transmission system from which the one of the input optical signals is received; and
   a plurality of means for adding spectral bands from an add signal associated with one of the separated optical transmission systems onto the output optical signal transmitted to the one of the separated optical transmission systems.

63. The wavelength link architecture recited in claim 57 further comprising a plurality of means for adding and dropping spectral bands to through-traffic optical signals in optical communication with the cross-connect means.

64. The wavelength link architecture recited in claim 63 wherein at least one of the plurality of input optical signals is in optical communication with an input port of one of the plurality of means for adding and dropping spectral bands to through-traffic optical signals and at least one of the plurality of output optical signals is in optical communication with an output port of one of the plurality of means for adding and dropping spectral band to through-traffic optical signals.

65. The wavelength link architecture recited in claim 63 wherein:
   each of the input optical signals is in optical communication with an input port of one of the means for adding and dropping spectral bands to through-traffic optical signals;
   each of the output optical signals in is optical communication with an output port of one of the means for adding and dropping spectral bands to through-traffic optical signals;
   an add port of each of the means for adding and dropping spectral bands to through-traffic optical signals is in optical communication with one of the cross-connect-output optical signals; and a drop port of each of the means for adding and dropping spectral bands to through-traffic optical signals is in optical communication with one of the cross-connect-input optical signals.

66. A wavelength routing element comprising:
a plurality of interconnected component wavelength routing elements, each such component wavelength routing element adapted for receiving an input optical signal comprising a plurality of subsets of wavelength components, selectively routing the subsets of wavelength components between a first optical signal at a first port and different ones of a plurality of second optical signals at a plurality of second ports according to a configurable state of such component wavelength routing element.

67. The wavelength routing element recited in claim 66 wherein an output of a first of the component wavelength routing elements is in optical communication with an input of a second of the component wavelength routing elements.

68. The wavelength routing element recited in claim 66 wherein the first optical signals for each of the component wavelength routing elements are optically combined with an optical arrangement to form a single optical signal.

69. The wavelength routing element recited in claim 68 wherein at least one of the second ports for each of the component wavelength routing elements is not in optical communication with any optical signal.

* * * * *